(12) United States Patent
Raymond et al.

(10) Patent No.: US 7,443,592 B2
(45) Date of Patent: Oct. 28, 2008

(54) VISUAL EFFECT APPARATUS FOR DISPLAYING INTERLACED IMAGES USING BLOCK OUT GRIDS

(75) Inventors: Mark A. Raymond, Littleton, CO (US); Seth Weiss, Cherry Hills Village, CO (US)

(73) Assignee: Genie Lens Technologies, LLC, Golden, CO (US)

( * ) Notice: Subject to any disclaimer, the term of this patent is extended or adjusted under 35 U.S.C. 154(b) by 184 days.

(21) Appl. No.: 11/467,753

(22) Filed: Aug. 28, 2006

(65) Prior Publication Data

US 2008/0019029 A1 Jan. 24, 2008

Related U.S. Application Data

(60) Continuation-in-part of application No. 11/422,695, filed on Jun. 7, 2006, and a continuation-in-part of application No. 11/386,326, filed on Mar. 22, 2006, now Pat. No. 7,242,525, which is a division of application No. 11/257,191, filed on Oct. 24, 2005, now Pat. No. 7,057,823, which is a division of application No. 11/182,290, filed on Jul. 15, 2005, now Pat. No. 7,038,854, which is a division of application No. 10/925,179, filed on Aug. 23, 2004, now Pat. No. 6,943,953, which is a continuation-in-part of application No. 10/230,751, filed on Aug. 29, 2002, now Pat. No. 6,781,761.

(51) Int. Cl.
*G02B 27/10* (2006.01)
*G03B 21/60* (2006.01)

(52) U.S. Cl. .................. 359/619; 359/455; 359/623; 359/900

(58) Field of Classification Search ................ 359/618, 359/619, 622, 623, 454–456, 742, 743, 599, 359/804, 440, 900
See application file for complete search history.

(56) References Cited

U.S. PATENT DOCUMENTS

| 1,006,769 A | 10/1911 | Merrill |
| 3,119,195 A | 1/1964 | Braunhut |
| 4,541,727 A | 9/1985 | Rosenthal |
| 5,003,915 A | 4/1991 | D'Amato et al. |

(Continued)

FOREIGN PATENT DOCUMENTS

JP 11-049175 * 2/1999

*Primary Examiner*—William C Choi
*Assistant Examiner*—Jack Dinh
(74) *Attorney, Agent, or Firm*—Kent A. Lembke; Marsh Fischmann & Breyfogle LLP

(57) ABSTRACT

A container for producing a graphical image. The container includes a container wall with front and rear portions. A label is included that extends about the circumference of the container with an inner surface contacting an exterior surface of the rear portion of the container wall and contacting an exterior surface of the front portion of the container wall. The label includes a block out grid made up of alternating block out lines and transparent viewing gaps on the outer or inner surface of the label. The view gaps provide a line of sight to subset of the segments of an interlaced image provided on or proximate to the rear portion of the container wall when the block out grid is positioned near the front portion of the container wall. The label may be used to create an air gap between the block out grid and the interlaced image.

15 Claims, 40 Drawing Sheets

U.S. PATENT DOCUMENTS

| | | |
|---|---|---|
| 5,098,302 A | 3/1992 | Sekiguchi |
| 5,181,471 A | 1/1993 | Sillars |
| 5,457,515 A | 10/1995 | Quadracci et al. |
| 5,494,445 A | 2/1996 | Sekiguchi et al. |
| 5,642,226 A | 6/1997 | Rosenthal |
| 5,676,401 A | 10/1997 | Witkowski et al. |
| 5,695,346 A | 12/1997 | Sekiguchi |
| 5,753,344 A | 5/1998 | Jacobsen |
| 5,847,808 A | 12/1998 | Goggins |
| 5,908,590 A | 6/1999 | Yoshimi et al. |
| 5,924,870 A | 7/1999 | Brosh et al. |
| 5,967,032 A | 10/1999 | Bravenec et al. |
| 6,060,003 A | 5/2000 | Karszes |
| 6,073,854 A | 6/2000 | Bravenec et al. |
| 6,148,724 A | 11/2000 | Hart et al. |
| 6,414,794 B1 | 7/2002 | Rosenthal |
| 6,581,972 B2 * | 6/2003 | Nojima et al. .................. 283/81 |
| 6,886,280 B2 | 5/2005 | Spodek et al. |
| 6,943,953 B2 | 9/2005 | Raymond |

\* cited by examiner

VISUAL EFFECT APPARATUS FOR DISPLAYING INTERLACED IMAGES USING BLOCK OUT GRIDS

CROSS-REFERENCE TO RELATED APPLICATIONS

This application is a continuation-in-part of U.S. patent application Ser. No. 11/386,326, filed Mar. 22, 2006, now U.S. Pat. No. 7,242,525, which is a divisional application of U.S. patent application Ser. No. 11/257,191, filed Oct. 24, 2005, now U.S. Pat. No. 7,057,823, which is a divisional application of U.S. patent application Ser. No. 11/182,290, filed Jul. 15, 2005, now U.S. Pat. No. 7,038,854, which is a divisional application of U.S. patent application Ser. No. 10/925,179, filed Aug. 23, 2004, now U.S. Pat. No. 6,943,953, which is a continuation-in-part of U.S. patent application Ser. No. 10/230,751, filed Aug. 29, 2002, now U.S. Pat. No. 6,781,761, and this application is also a continuation-in-part of U.S. patent application Ser. No. 11/422,695, filed Jun. 7, 2006. Each of these applications and patents are incorporated herein by reference in their entirety.

BACKGROUND OF THE INVENTION

1. Field of the Invention

The present invention relates, in general, to optical illusions and devices designed to display motion or animation from still images, and, more particularly, to an assembly or apparatus for use in packaging and on consumer and other products for producing images, such as animated images or images appearing to have motion, from a set of interlaced images.

2. Relevant Background

There is an increasing demand for creative packaging to achieve product differentiation and "shelf appeal" to separate one retail product from another. However, as many products become similar in quality in the mind of consumers, there is a concurrent need to remain cost competitive such that consumers do not choose another product simply based on cost. As a result, product differentiation typically needs to be achieved with minimum or even no added cost for a packaged product to be widely adopted by the packaging and retailing industries.

For years, lenticular lenses have been used to produce eye-catching graphics for packaging, displays, stadium cups, postcards, printed goods, and other products (e.g., products for which shelf appeal is important or desired) by facilitating the viewing of "interlaced images." Elaborate graphics are sometimes produced with lenticular graphic labels using 3-dimensional (3D) and animation. Lenticular lenses are well known for use in optical systems to produce various types of unique optical effects such as animation, e.g., for allowing a viewer to view a short video clip, a portion of an animated cartoon, and the like. Lenticular lens devices generally include a transparent sheet having a planar surface on one side and a series of parallel longitudinal ridges on the other side that have circular surfaces or ribs creating a system of convex lenses or lenticular lenses. An image is typically printed on the planar surface opposite the lenses or a print sheet or medium may be disposed on the planar surface. This image is typically an "interlaced image" that contains a number of alternating image lines or segments. Each set of image segments corresponds to a subset or portion of an image, e.g., each set of spaced apart segments may by a thin slice or portion of a frame of a video clip or frame of a cartoon or the like. The image lines or segments are so optically related with respect to the lenses as to be alternately visible upon positional change of the viewer with respect to the lenses. When viewed from one position, one set of image segments (e.g., one frame of a video clip) are visible so as to display the first composite image or frame. When viewed from a second position, a second set of the image segments in the interlaced image are visible so as to display the second composite picture. This process can be continued to allow a viewer to see each portion or frame present in the interlaced image, e.g., to see a complete video clip.

The production of lenticular lenses is well known and described in detail in a number of U.S. patents, including U.S. Pat. No. 5,967,032 to Bravenec et al., which is incorporated herein by reference in its entirety. In general, the production process includes selecting segments from visual images to create a desired visual effect and interlacing the segments (i.e., planning the layout of the numerous images to produce the interlaced images). Lenticular lenses or lens sheets are then mapped to the interlaced or planned segments, and the lenticular lenses are fabricated according to this mapping. The lenticular lenses generally include a transparent web that has a flat side or layer and a side with optical ridges and grooves formed by lenticules (i.e., lenses) arranged side-by-side with the lenticules or optical ridges extending parallel to each other the length of the transparent web. To provide the unique visual effects, ink (e.g., four color ink) is applied to or printed directly on the flat side of the transparent web to form a thin ink layer, and this printed image or interlaced image is viewable through the transparent web of optical ridges.

While providing many desirable optical effects, lenticular lens devices have often been limited in their adoption. This may be due to actual added manufacturing or material costs or due to the perception that such devices add cost and are only useful for higher end promotional campaigns (e.g., for use in stadium cups at sporting events) or novelty items. Hence, there remains a need for packaging assemblies, products with graphic display assemblies or elements, and methods of producing labels, other packaging elements, and optical illusion or display devices that provide desirable graphic effects at acceptably low added cost per packaged product or per display device.

SUMMARY OF THE INVENTION

Embodiments of the present invention provide optical effects or illusions by combining the use of block out grids (e.g., an ink layer providing a plurality of block out lines forming a block out grid) and an interlaced image. The block out grids may be provided as part of a wraparound label or otherwise as part of packaging for a container, and the label and/or portions of the container between the block out grid and interlaced image provide a "lens" or lens assembly to create the desired optical effect. The block out grids are used as a substitute for lenticular lenses or lenticular arrays in the embodiments or examples of the invention described herein that utilize such lenticular lenses or arrays to focus a viewer's line of sight selectively onto an interlaced image. For example, the embodiments in which block out grids may be used in place of lenticular lenses include at least the embodiments of the invention in which a container's sidewall(s) and its interior (with or without contents) is provided as part of the lens thickness or otherwise used to provide optical effects.

Block out grids have been used in the past to view interlaced images to achieve animation or motion and/or to provide three dimensional (3D) effects. In general, block out grids are formed or created with a block out film or grid, e.g., a layer of ink in a grid pattern including a plurality of block out lines that are spaced apart. The block out lines or bars of the block out film or grid are generally selected to have a width and to be spaced apart a distance so as to provide a line of sight to one segment or slice of an interlaced image through each space. For example, the width of the grid lines may be selected to be about the width of each subset of the interlaced image (i.e., the interlaced image width) less the width of one slice or segment of the interlaced image. For example, an interlaced image may include five frames of a video clip with each frame being sliced or segmented into a subset of 10 (or some other number of) images. In this case, the block out line or bar may be the width of 9 of the image segments or slices and the space between adjacent block lines or distance to the next line may have a width of 1 of the image segments or slices. Of course, other numbers of images, thicknesses of block out lines or stripes, and spaces between lines may be used to practice the invention.

In prior block out grids, a block out grid is printed or attached to one side of a substrate of transparent material (such as glass or plastic or the like) with the interlaced image being attached to the other or reverse side of the substrate. To achieve desirable results, the substrate had to be relatively thick, such as 0.125 inches or more thick, and, as a result, block out grids have typically been limited in use to flat displays where the rigidity of the substrate is acceptable. However, such a thick substrate is not generally useful or desirable for a label or decal or other packaging for consumer products. To address this need, the present invention provides a number of embodiments in which a block out grid can be provided on a container sidewall, as part of a container sidewall, on or as part of a label or other packaging to view an interlaced image. As will become apparent, the block out grid may be used in the place of a lenticular lens array to effectively view interlaced images and achieve desirable optical effects that increase shelf appeal of products.

In one embodiment, the present invention addresses the above problems by providing a lenticular lens systems with a lenticular lens array or block out grid fabricated as part of the container to be integral with one of the container walls. In other words, the container itself is used to construct a lenticular lens array or block out grid to focus on a selected portion of the container in which a printed image is positioned. In one embodiment, the lenticular lens array is integrally formed in a front portion of a clear container wall to focus on a rear portion of the container wall with the lenticules on an exterior surface of the container. In another embodiment, the lenticular lens array is replaced with a block out grid that is provided proximate to the front portion of the clear wall container to focus on the rear portion of the container wall. The block out grid may be formed integrally with the container wall, printed onto the interior or exterior surface of the front portion of the container wall, attached to or near the exterior or interior surface of the front portion of the container wall. A label or other image presentation element is attached to the container so as to precisely position a printed image adjacent the rear portion of the container upon which the lenticular lens assembly is focusing. The lenticular lens assembly or block out grid can be configured to produce a graphical image from the printed image at a number of locations within the container or, in some cases, outside the container. In one embodiment, the graphical image is displayed so as to appear to be floating within liquid contents of the container, such as water or other clear or translucent liquid, in the center of the container. The space or distance in the container between the lens array (or block out grid) and the rear portion of the container is selected to facilitate focusing a powerful lens on the rear portion to enable a wider or more coarse lens array (or block grid) that has space to carry more data and/or more images, which creates a greater overall visual effect.

In other embodiments, the present invention addresses the above problems by providing packaged containers (or packaging systems) in which a focusing gap (or "air gap") is provided between a lenticular lens array or block out grid and a corresponding interlaced image. The focusing gap is useful for allowing the focal length to be significantly larger without large increases in lens thicknesses, which is desirable to allow standard packaging processes, such as attaching of wrap around labels, to be used to apply the lenticular lens arrays or block out grids. For example, some embodiments of the invention include a container with a recessed surface in its side wall. A wrap around label is then attached to the side wall of the container to produce enhanced graphics. The wrap around label includes an image portion or element that is attached to the container within the recessed surface. The label further includes a lens portion or element that includes a lenticular lens array (or set of lenses) or a block out grid. The lens element or portion of the label is then applied to the side wall of the container so as to extend over the recessed surface and the previously positioned image element. In this manner, a gap filled with air (or other fluids) is formed between the lenses or block out grid and the printed image such that focusing can be effectively achieved through the material and thickness of the lens element and air and size of the focusing gap. As a result, much coarser lens arrays can be used with very thin labeling materials to achieve high quality graphics, e.g., 20 to 70 LPI (or coarser) lens arrays can be provided in 3 to 5 mil or thinner plastic sheets to achieve good imagery with an air gap of 0.5 inches or less (and often less than 3/16 inch gap is utilized).

In a more particular embodiment using block out grids, a method is provided for fabricating a container that is useful for displaying an interlaced image. The method includes providing a container having a container wall with a first portion and a second portion that is spaced apart from the first portion (e.g., "front" and "rear" portions of a container side wall or the like). The container wall is typically formed of substantially transparent material or at least the first and second portions are formed of such material or are otherwise relatively transparent. A label is provided that also is formed of substantially transparent material or that has portions that are transparent. The method further includes providing, e.g., printing, attaching, or the like, a block out grid on a first portion of the label and an interlaced image on a second portion of the label. The block out grid includes lines that block passage of light (e.g., elongate stripes or bars of black or other-colored ink), and these block out lines are spaced apart by viewing gaps that allow at least some light to pass through the label and more typically, are formed to be substantially transparent and to have a shape similar to the segments of the interlaced image (e.g., similar or matching height and width). The label is applied to the container wall such that the interlaced image is positioned proximal to the second portion of the container wall and the block out grid is positioned proximal to the first portion of the container wall. In the fabricated container, at least a portion of the interlaced image is viewable through the block out grid. For example, all slices or segments of the interlaced image associated with one frame of a video clip or image may be viewable through the viewing gaps at one time or, more accurately, at one viewing angle. Generally, the block out lines or bars are wider than the viewing gaps so as to cover or block sight of all segments except the ones in the frame being viewed through the viewing gaps (e.g., 5 to 10 times or more the width of the viewing gap), with the viewing gap often being about the width of one of the interlaced image segments.

In an air gap or focusing gap embodiment, a packaged container is provided for producing or displaying a graphical image. A container is provided that has a side wall that defines an interior space. A surface that is recessed from the side wall (or a recessed surface on the side wall) is provided in the container. An interlaced image is positioned proximate to the recessed surface (e.g., an interlaced image formed from slices of frames of a movie clip or 3D image with widths and numbers or frequency selected to match a particular lenticular lens array such as less than about 70 LPI or the like). A lens element is positioned on the side wall so as to extend across the recessed surface adjacent or proximate to the interlaced image and so as to leave or create a focusing gap between the lens element and the interlaced image. The lens element, at least adjacent the interlaced image, includes a block out grid having a plurality of elongate viewing gaps that are at least partially transparent to light and that are sandwiched between adjacent pairs of block out lines (which are less transparent to light than the viewing gaps, e.g., selected from the range of translucent to opaque or substantially opaque). As a result, portions of the interlaced image can be viewed through the viewing gaps and across the gap between the lens element and the interlaced image. In some cases, the recessed surface has a depth in the range of about 5 mils to about 1.5 inches and the lens element is formed of plastic that is less than about 10 mils thick. The side wall of the container may be circular and the lens element may be provided in or as a wrap around label that is attached to the exterior of the container side wall (for example, to enclose or completely cover the recessed surface).

DETAILED DESCRIPTION OF EMBODIMENTS OF THE INVENTION

Figure 1:
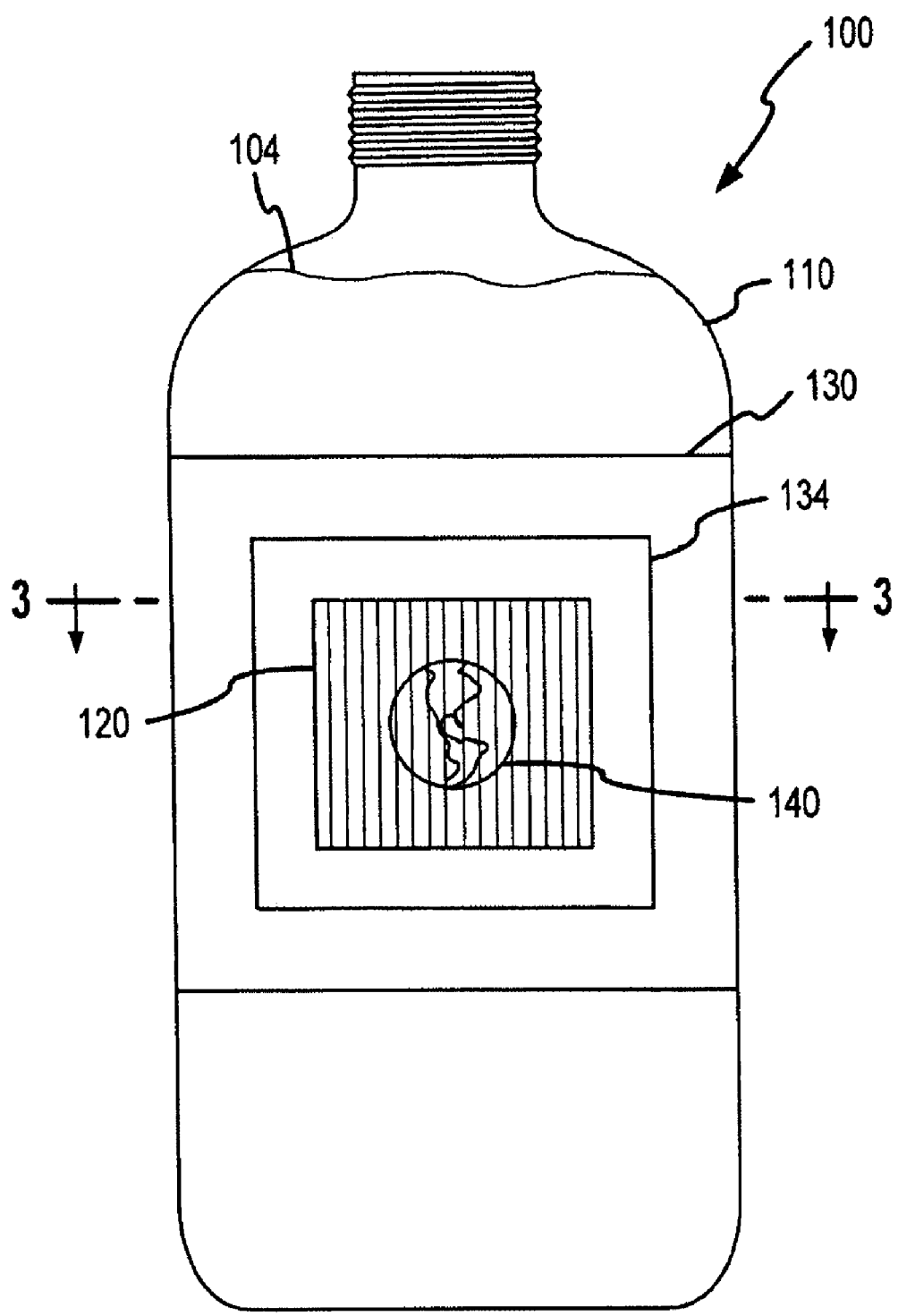
FIG. 1 is a front view of a container, i.e., a bottle for water and the like, showing an image viewable through a lenticular lens array formed in the front portion of the container wall (i.e., as a one-piece unit or integral or contiguous with the container wall) with the printed image provided on the inside of a label wrapped around the container and placed (or registered) adjacent the rear portion of the container wall.

Many of the embodiments described herein utilize a lenticular lens system or array in combination with a container's or object's sidewalls and contents to achieve desired optical effects with an interlaced image. In some cases, an air gap is created between a lens system, e.g., a lens array provided on a wraparound label, and an interlaced image. The present invention is also directed to providing an alternative way of displaying or allowing viewing of an interlaced image that does not require a lenticular lens array. Specifically, an alternative method of providing animation and 3D imagery with an interlaced image is to substitute a block out grid (or block out assembly or system) for the lenticular lens array or plurality of lenticular lenses. Block out grids typically are considered less useful or desirable than lenticular lens in producing optical effects and imagery. However, the combination of block out grids with the additional "lens" thickness or optical characteristics of a clear or substantially transparent sidewall or portion of a container or other object or with an air gap has proven to provide significantly enhanced results, which make the use of a block out grid more desirable for viewing an interlaced image. For example, clear or transparent-walled containers provide a useful geometry, such as cylindrical containers, for generating effective animation and 3D optical effects when an interlaced image is viewed through a block out grid and a container when it is full of a clear to translucent liquid or when it is empty (e.g., only contains air).

A significant number of animation frames, for example, can be provided in an interlaced image that is paired with a block out grid. The block out grid is generally a grid or assembly of spaced apart lines or bars that may be provided by printing (or a decal or the like) in black or another color of ink (e.g., a line or bar formed of ink or other material to block light such as an opaque or substantially opaque ink). The width of the bars or lines in the block out grid (and, therefore, of the space or gap between adjacent bars or lines) is selected such that one or about one frame in the interlaced image is visible through the block out grid at one time or, more accurately, from a particular viewing angle or point of view. When the viewer moves or the container that includes the block out grid is moved, the viewer is able to see additional frames in the interlaced image through the block out grid and the lens system provided by the geometry and physical characteristics of the container or other object upon which the block out grid and interlaced image are mounted or positioned (such as by printing directly on the container sidewalls, by placing labels or decals on the container, or the like).

The following description begins by describing embodiments in which a lenticular lens array or plurality of lenticules or lenses are provided integrally with a container sidewall or with a label such as a wraparound label. The description continues by discussing embodiments in which an air gap is created between the lenticular lenses and the interlaced image to enhance optical effects (e.g., to achieve desirable effects with a thinner lens substrate or web). As mentioned above, the present invention also includes substituting a block out grid for the lenticular lens arrays or lenticules shown in the embodiments of 1-47 (e.g., use block out grids instead of lenticular lenses in the integral lens embodiments, in the wraparound and other label embodiments, and/or in the "air gap" embodiments). Therefore, the description of the embodiments of FIGS. 1-47 are intended to be read with an understanding that the lens arrays such as array 120 of FIG. 1, lenticules 1640 of FIG. 16, and lens portion 2820 of FIG. 28 may be replaced with block out grids to practice the invention. With this in mind, the use of block out grids in representative embodiments is described more fully after the discussion of FIGS. 1-47.

Figure 2:
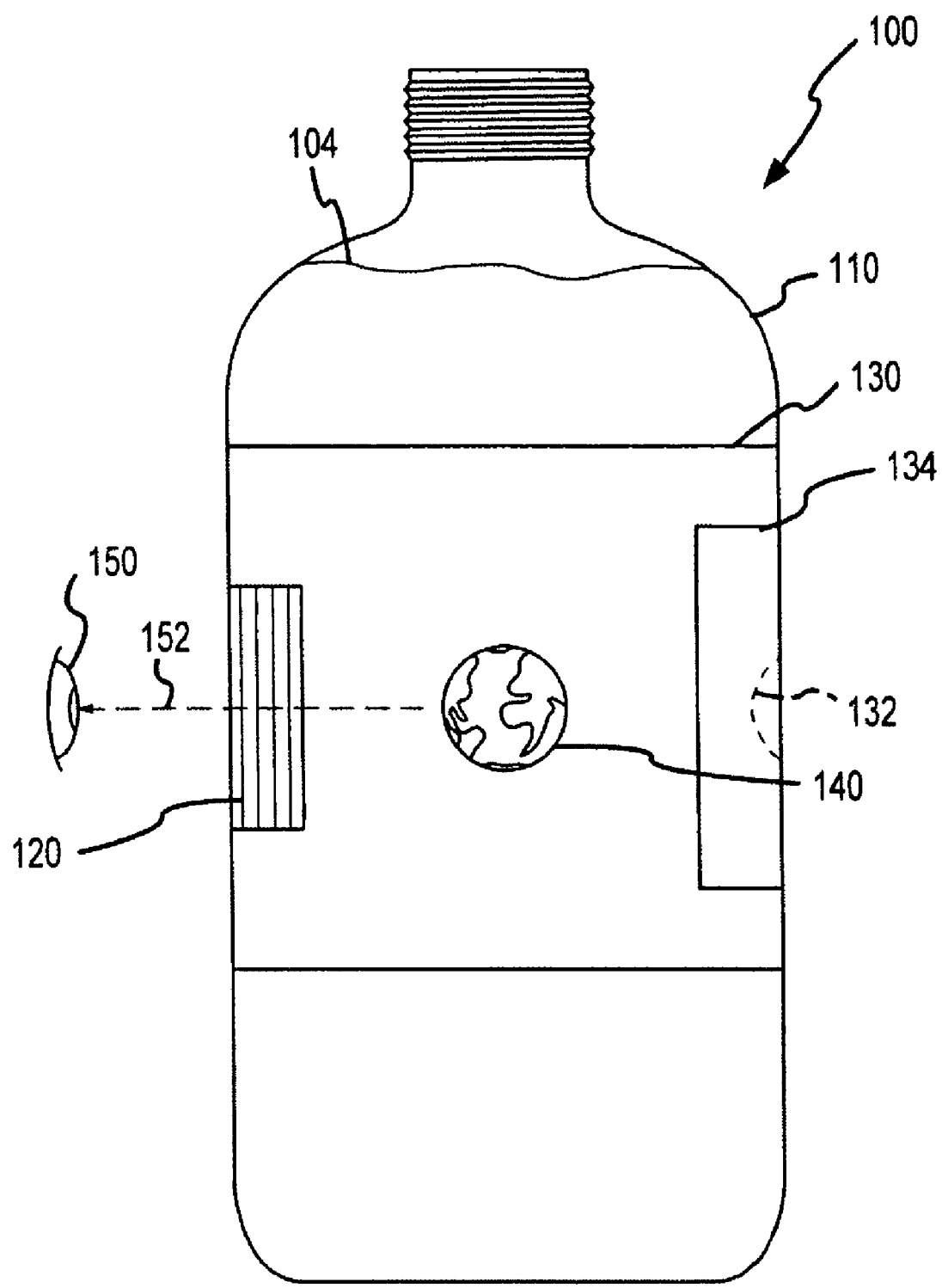
FIG. 2 is a side view of the container of FIG. 1 showing the image created in the center of the bottle (i.e., "floating" in the container contents) by the combination of the front lenticular lens array and the rear printed image on the label.

FIGS. 1 and 2 illustrate a container 100 utilizing a lenticular lens system of the present invention to produce a floating 3D image 140. As shown, the container 100 is provided with a standard shape utilized for typical plastic bottles used for distributing water or other beverages. As such the container 100 includes a clear or translucent container wall 110 having a substantially cylindrical shape for containing liquid 104. The container wall 110 is typically formed of glass or more typically of a plastic such as polyvinyl chloride (PVC), polypropylene, polyethylene, polyester (such as PET, APET, PETG, and the like) or other plastic used by the packaging or container industry. The container 100 may be formed by blow molding, injection molding, or any other technique useful for producing containers and adapted (as necessary) for the glass or plastic material used to fabricate the container 100.

According to an important aspect of the invention, a lenticular lens array 120 is provided in a front portion of the container wall 110. The lenticular lens array 120 is formed integral with the container wall 110, typically in the same molding or other fabrication process and of the same material. The lenticular lens array 120 is configured with numerous lenticules or lenses formed by ridges or ribs that extend parallel to each other and to a longitudinal axis of the container 100. The lenticules of the lens array 120 are configured in frequency (lenticules per inch) and shape (such as width and radius) based on the material of the container wall 110 (and array 120), based on the liquid contents 104 of the container 100, and the curvature of the container wall 110 to focus on the rear portion of the container wall 110. The space or distance (i.e., the inner diameter of the container) allows a coarser configuration for lens array 120 to be used while still providing a large quantity of data in the printed image 132. The lenticular lens array 120 can have a wide variety of dimensions (such as a height and "width") selected based on the size of the container 100 and the size of the printed image 132 and shapes (such as a square, a rectangular, a triangle, a circle, an oval, or any other useful shape for viewing the image 132).

With the lenticular lens array 120 focusing on the rear portion of the container wall 110, a graphical image 140 can be produced within the container so as to "float" in the liquid 104 or elsewhere by providing a printed image 132 at the focal point. In this regard, a label or printed image presentation element 130 is provided with a printed image 132 on the inner surface of the label 130, i.e., the portion abutting the rear portion of the container wall 110, which is shown in FIG. 2. The label 130 is shown to be wrapped around the container wall 110 so as to cover the lens array 120 and the rear portion of the container wall 110. The label 130 fabricated from a clear material such as plastic so as not to interfere or block light from passing through the lens array 120, which allows a viewer 150 to see as shown by a sight line 152 the graphical image 140 which is produced by the lens array 120 and the printed image 132.

The label 130 includes a data area or backdrop portion 134 in which a printed image 132 is provided, and in some embodiments, the data area 134 includes additional images, such as text, for viewing or may provide a background color(s) useful for emphasizing or highlighting the printed image 132. The printed image 132 is positioned relative to the rear portion of the container (i.e., the focal point of the lenticular lens array 120) to map or register the interlaced printed image 132 with corresponding lenticules or portions of the lenticular lens array 120 to effectively produce the graphical image 140 to the viewer 150. The image 132 may be printed using known techniques for printing images or data to achieve graphics such as 3D, animation, or action and for use with lenticular lenses or lenticular materials but the invention is not limited to a specific technique. For example, the image 132 may be printed upon the interior or reverse side of label 130 via web or offset press operations to form an ink layer with corresponding interlaced images in conjunction with the appropriate mathematics of the lens materials and configuration of array 120. The mathematics preferably not only matches the lens materials but also the distortion caused by the curvature of the container wall 110 and integral array 120 and of the liquid 104 in the container 100. In the case of a bottle or other conical shaped container 100, the lens or lenticules of the array 120 "open up" and create a new mathematical pitch. This pitch is predetermined before the labels 130 and plates are made and printing occurs so that the printing can be performed with more accuracy and to facilitate registering the label 130 and printed image 132 with the lenticular lens array 120.

Figure 3:
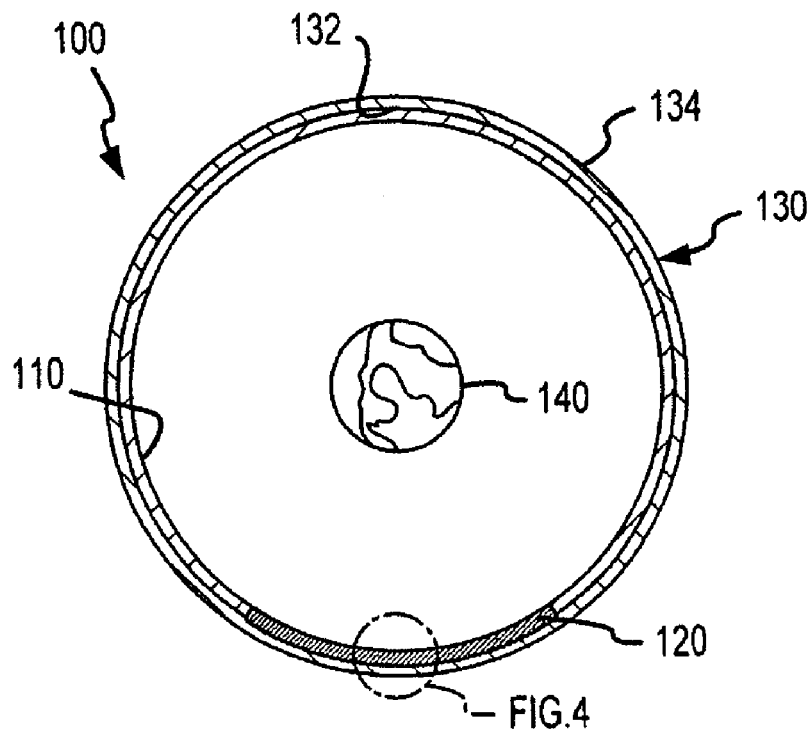
FIG. 3 is sectional view of the container of FIG. 1 looking downward on the container wall showing the lenticular lens array and the label with a registered printed portion.

FIG. 3 shows a sectional view of the container 100. As shown, the lenticular lens array 120 is integral with the container wall 110 with vertically extending lenticules forming a rough exterior surface at the front portion of the container wall 110. Generally, the lenticular lens array 120 has the same overall thickness as the wall 110 and is configured to have a focal point substantially coinciding with the rear portion of the container wall 110 adjacent the printed image 132 of the label 130. The label 130 is shown to wrap around the entire periphery of the container wall 110 as is common practice in the beverage industry (such as in the bottled water industry), but in some embodiments (not shown), the label 130 may extend for only a portion of the periphery of the container wall 110 as long as the printed image 132 is positioned adjacent an exterior surface of the rear portion of the container wall 110 that coincides with the focal point (or points) of the lenticular lens array 120.

The fabrication of standard lenticular material sheets, i.e., those not formed as part of a container wall 110, is well known by those skilled in the printing arts and such knowledge may be utilized at least in part in designing the molding or arrangement of the lenticular lens array 120 (in combination with the use of the design formulas discussed with reference to FIGS. 10-13). For example, lenticular material fabrication is described in U.S. Pat. No. 5,967,032 to Bravenec et al. and U.S. Pat. No. 5,753,344 to Jacobsen, which are incorporated herein by reference. Additionally, the method of laying out or arranging inserts (or labels 130) for a conical container similar in some ways to container 100 is illustrated in FIG. 1 of U.S. Pat. No. 5,908,590 to Yoshimi et al., which is incorporated herein by reference, which is directed to producing labels for foamed resin containers.

Figure 4:
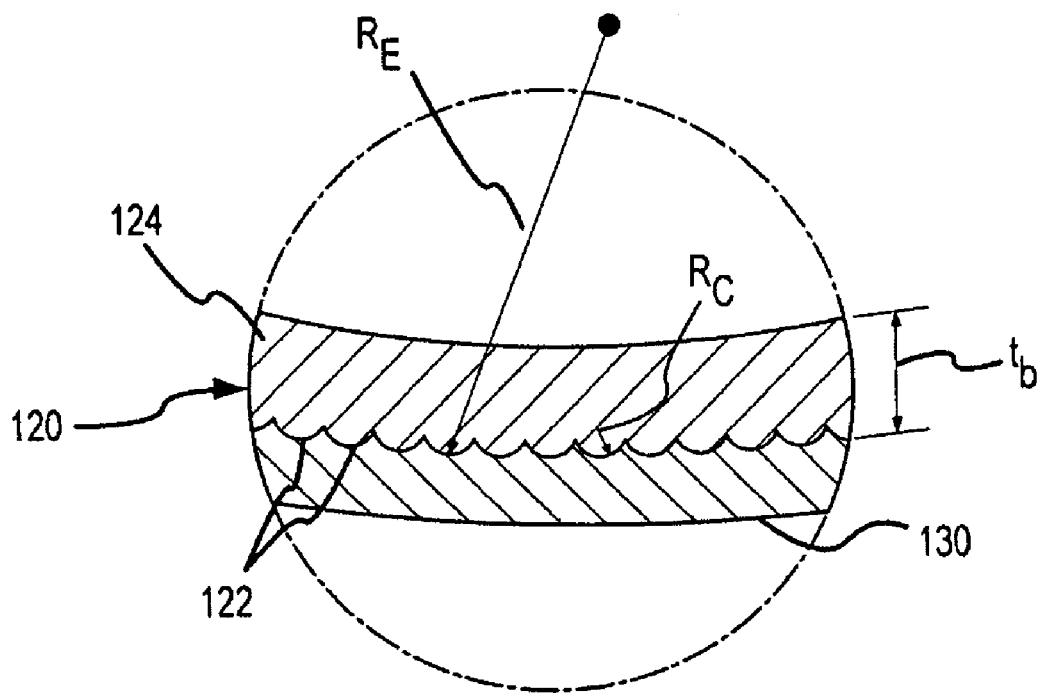
FIG. 4 is an enlarged view of part of the sectional view of FIG. 3 illustrating in more detail the lenticular lens array formed integrally with the container wall.

FIG. 4 illustrates a portion of the cross-section of the lenticular lens array 120 and label 130 shown in FIG. 3. As shown, the label 130 is wrapped about the container wall 110 so as to contact the ridged outer surface of the lenticular lens array 120. Typically, the label 130 is fabricated from a very thin sheet of clear plastic to minimize distortion through the array 120. The lenticular lens array 120 includes a plurality of optical ridges or lenses 122 (extending vertically as shown or horizontally) and a transparent lens layer or web 124. The fabrication and/or design of the lenticular lens array 120 is discussed in detail (including using mathematical formulas of the invention in the design processes) with reference to FIGS. 10 and 11, and for now, it is adequate to understand that the array 120 has an overall thickness, $t_B$, that affects focusing of the array 120 and typically is substantially equivalent to a thickness of the container wall 10 (although in some cased the array 120 may be slightly thicker or thinner to provide a desired optical effect and/or provide a desired structural strength). Optical results of the array 120 are also determined by other physical characteristics of the array 120 including the material of the array 120, the frequency of the lenticules or ridges 122 (typically measured in lenticules per inch (LPI)), the curvature of the array 120 as determined by the curvature, $R_E$, of the container wall 110, and the radius (or width) of the lenticules or lens, $R_C$, and the relationships between these characteristics or design parameters. Additionally, the resulting optical effect is determined in part by the liquid 104 (or lack of liquid) in the container 100 and the distance from the lens array 120 to the rear portion of the container wall 110 (and the printed image) which is approximately the inner diameter of the container 100 at the location of the array 120 and the printed image 132.

Figure 5:
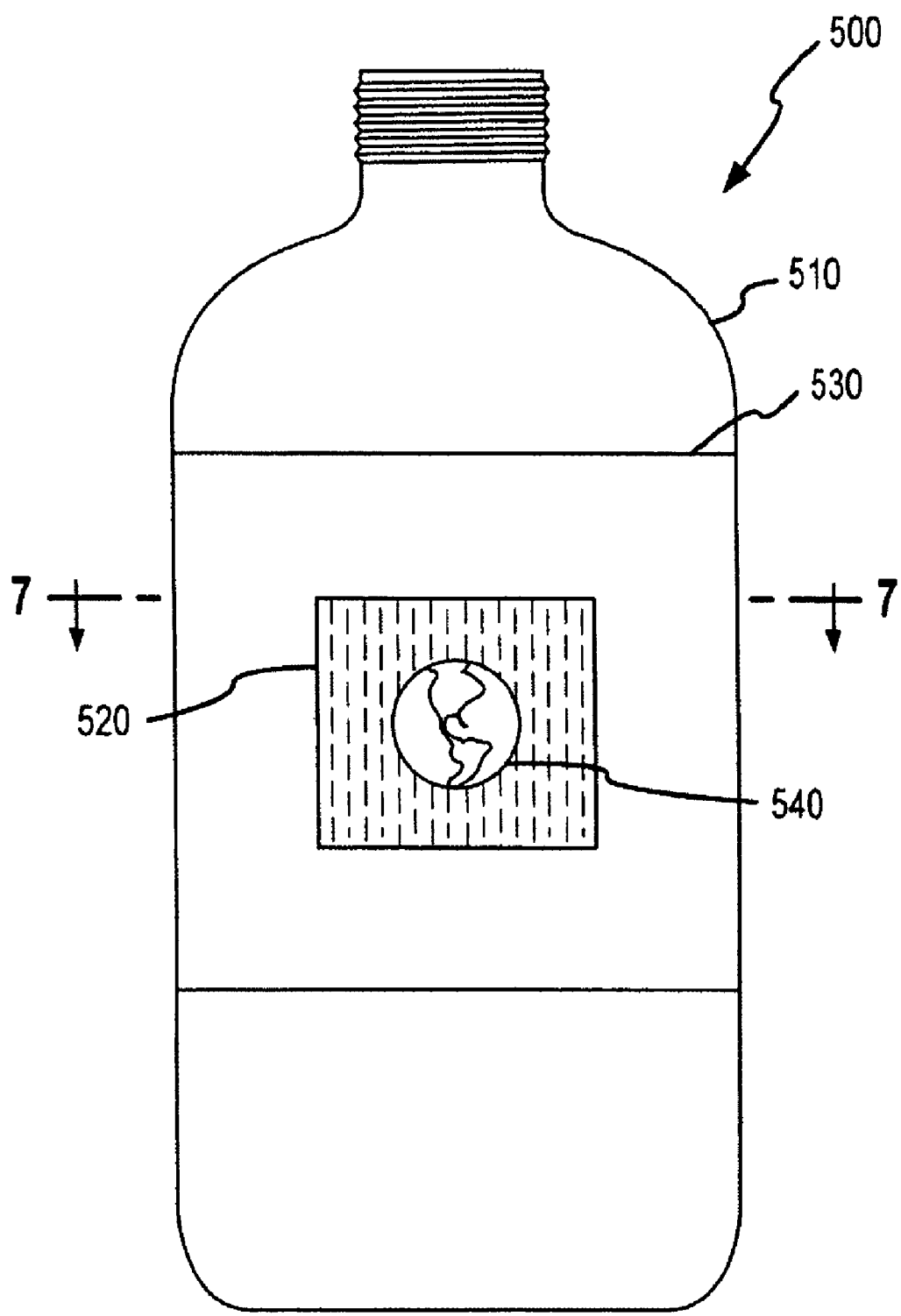
FIGS. 5, 6, and 7 are similar to FIGS. 1-3 and show another embodiment of a container fabricated according to the invention utilizing a lenticular lens array formed integrally with the rear wall of the container adjacent a printed portion of a label installed externally to the container and function in combination to focus an image on the rear wall of the container.
Figure 6:
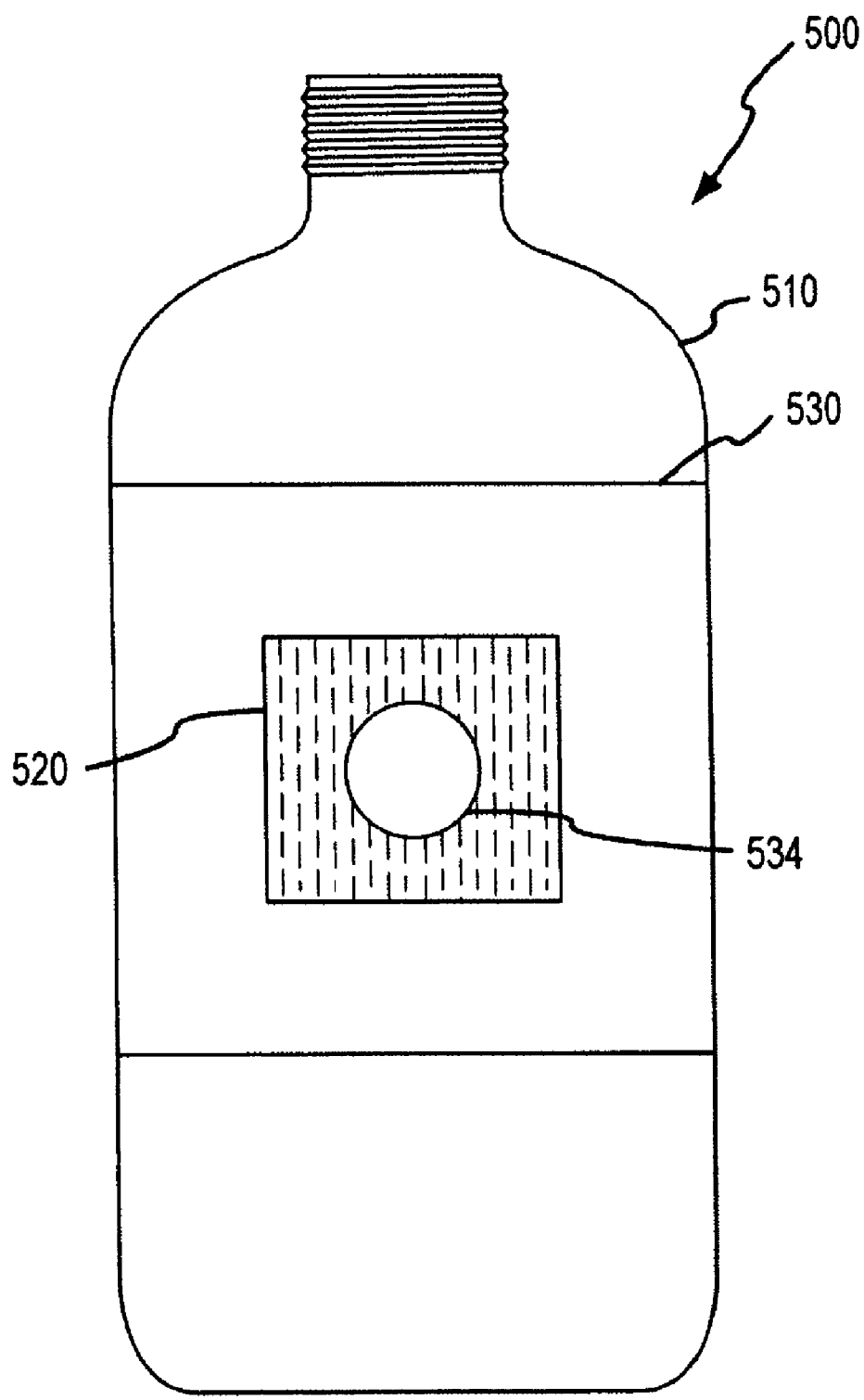
Figure 7:
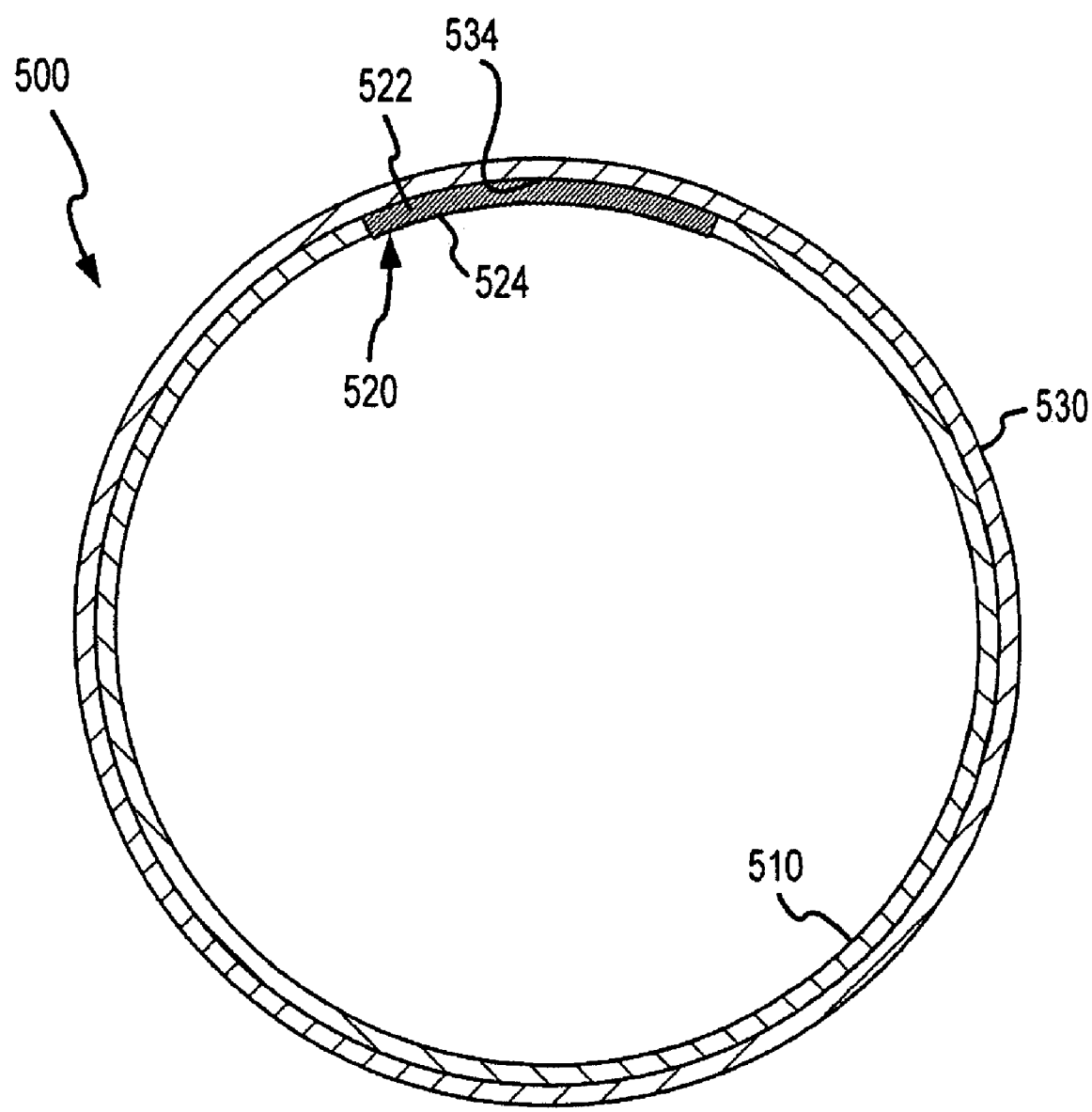

FIGS. 5-7 illustrate another container including another lenticular lens system of the invention, i.e., a system in which the lenticular lenses are provided integral with a portion of a container wall that is printed with data or a printed image (interfaced image) or abuts a label or presentation element having such data or printed image. As shown, the container 500, e.g., a plastic water or soda bottle, a soap or other similar container, or a glass bottle, jar, and the like, includes a container wall 510. A lenticular lens array 520 is formed integral to a rear portion of the container wall 510 and includes a plurality of lenticules or ridges on an inward facing side 524 and a flat layer 522 facing the exterior portion of the container 500. The lenticule surface 524 is configured to focus on the flat surface 522 (or the interface between the flat surface or layer 522 and the abutting label or presentation element 530). The label 530 is wrapped around or attached to the exterior surface of the container wall 510 so as to at least partially cover the lenticular lens array 520 and more importantly, to map or register a printed image 534 to the lenticules of the array 520 so as to create graphical image 540 as viewed through the front portion of the container wall 510. The mathematics used in configuring the lenticular lens array 520 are similar to that used in creating flat lenticular material or sheets with compensation for the curvature of the container wall 510 and integral lenticular lens array 520 (note, however, this is a closing or pinching of the lenticular surface 522 rather than an opening as experienced with the lenticular lens array 120 of FIG. 1). The specific location of the array 520 is not limiting to the invention as long as the printed image 534 is placed behind it on or adjacent a corresponding container wall 510 location. Similarly, the size and shape of the array 520 (as well as the orientation of the lenticules) can be varied widely to practice the invention with the array 520 typically being selected to have a size and shape that is larger than or the same size as the printed image 534.

Figure 8:
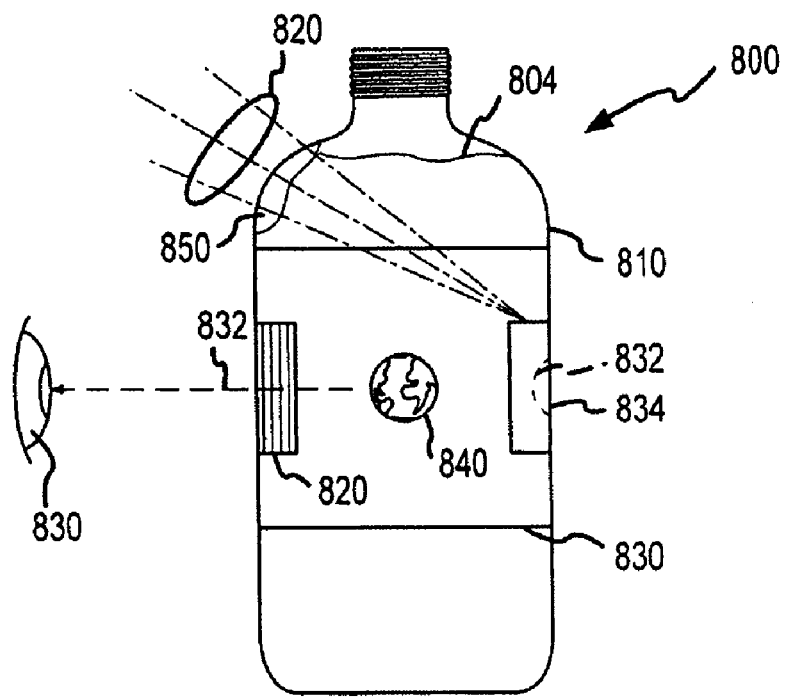
FIG. 8 is side view of another embodiment of a container similar to the container of FIGS. 1-4 including a lenticular lens system that further includes a light collecting lens in an upper portion of the container wall configured for focusing light on the printed side of the label element adjacent the rear wall of the container.

FIG. 8 illustrates another embodiment of a lenticular lens system that is useful for enhancing the clarity and effectiveness of the created graphical image. The illustrated container 800 includes a lenticular lens system similar to that used in container 100 of FIG. 1 with a lenticular lens array 820 in a front portion of a container wall 810 containing water or other liquid 804 and a label or presentation element 830 with a background or data area 834 with a printed image (interface printing layer) 832 abutting the exterior of the rear portion of the container wall 810. The system of the container 800 is enhanced by the addition of a light collection lens (such as a Fresnel lens or other useful lens configuration) 850 which is formed integrally with the container wall 810 at a location or position useful for collecting light and directing or focusing the collected light 820 onto the rear portion of the container wall 810 and more preferably on the portion of the container wall 810 abutting the data area 834 and even more preferably on the portion of the container wall 810 abutting or adjacent the printed image 832. In this manner, the graphical image 820 produced for viewing by the viewer 830 along line of sight 832 is typically more vivid with better color reproduction and image or effect clarity.

Figure 9:
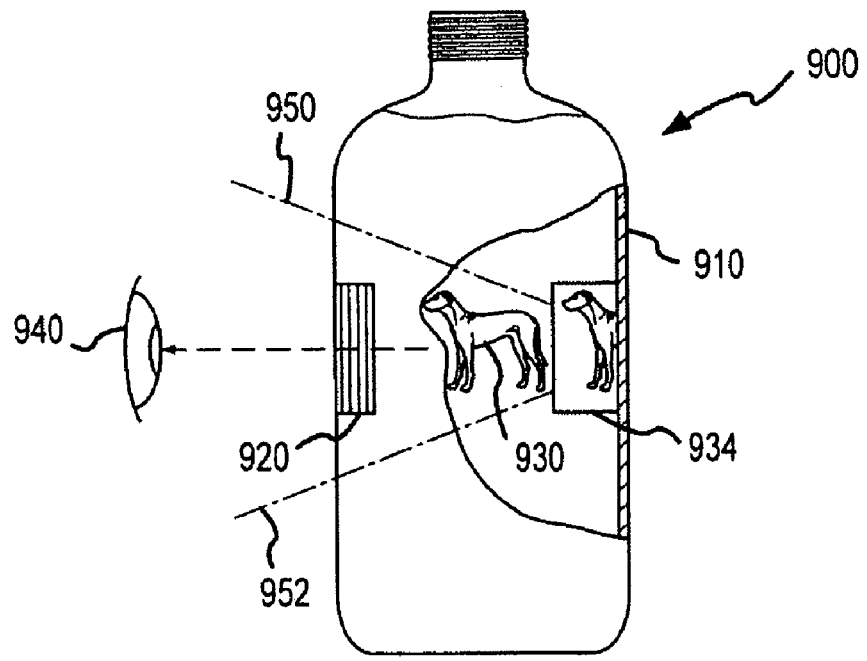
FIG. 9 is yet another embodiment of a container, such as a glass bottle, with a lenticular lens system that includes a front lens array and a printed image integral to the rear container wall (e.g., printed on the external portion of the container rear wall or formed within the wall itself during fabrication)

FIG. 9 illustrates a container 900 in which a label is not utilized but instead data and/or interlaced images are printed directly on an exterior surface (or within) a container wall. Such a container 900 may be fabricated from plastic or glass (such as a liquor bottle for distributing vodka and other alcoholic beverages that are relatively clear or translucent). As shown, the container 900 includes a frontal lenticular lens array 920 with lenticules facing outward or forming an external surface and focusing on a rear portion of the container wall 910 having a data portion with a interlaced printed image 934 (which is typically, but not necessarily, printed on the external surface of the container wall 910). As a result of light (shown by lines 950 and 952), the array 920, and the printed image 934, a viewer 940 is able to see the graphical image 930, which in this embodiment is shown to be displayed or created in the middle of the container 900 to be "floating" in the container 900.

Figure 10:
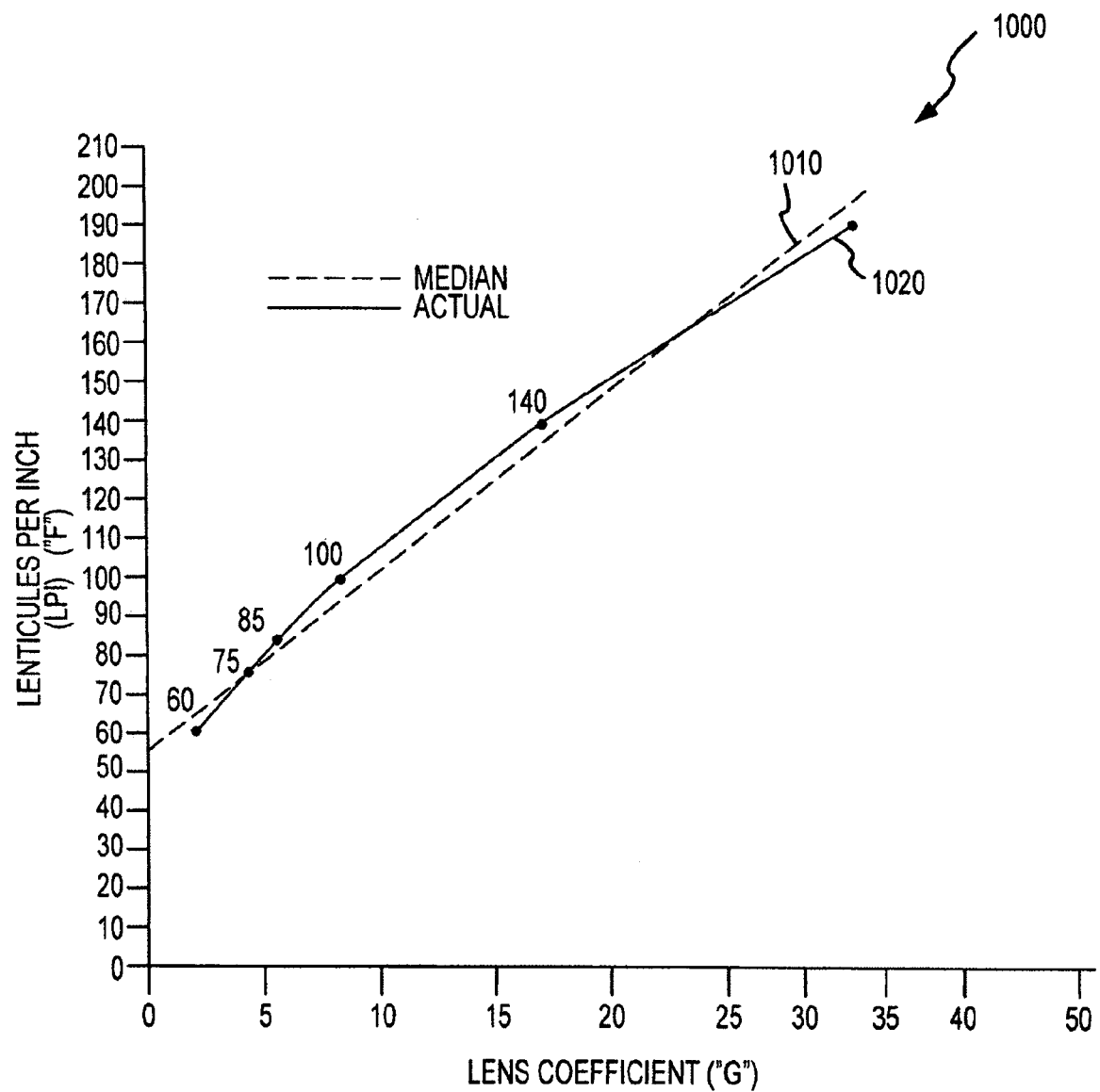
FIGS. 10 and 11 are graphs illustrating, for two exemplary viewing angle and lens radius combinations in a lenticular lens array, a relationship between lenticule frequency as measured in lenticules per inch and the lens coefficient as calculated by a process of the invention used in fabricating lenticular lens systems and as measured in fabricated lens systems.
Figure 11:
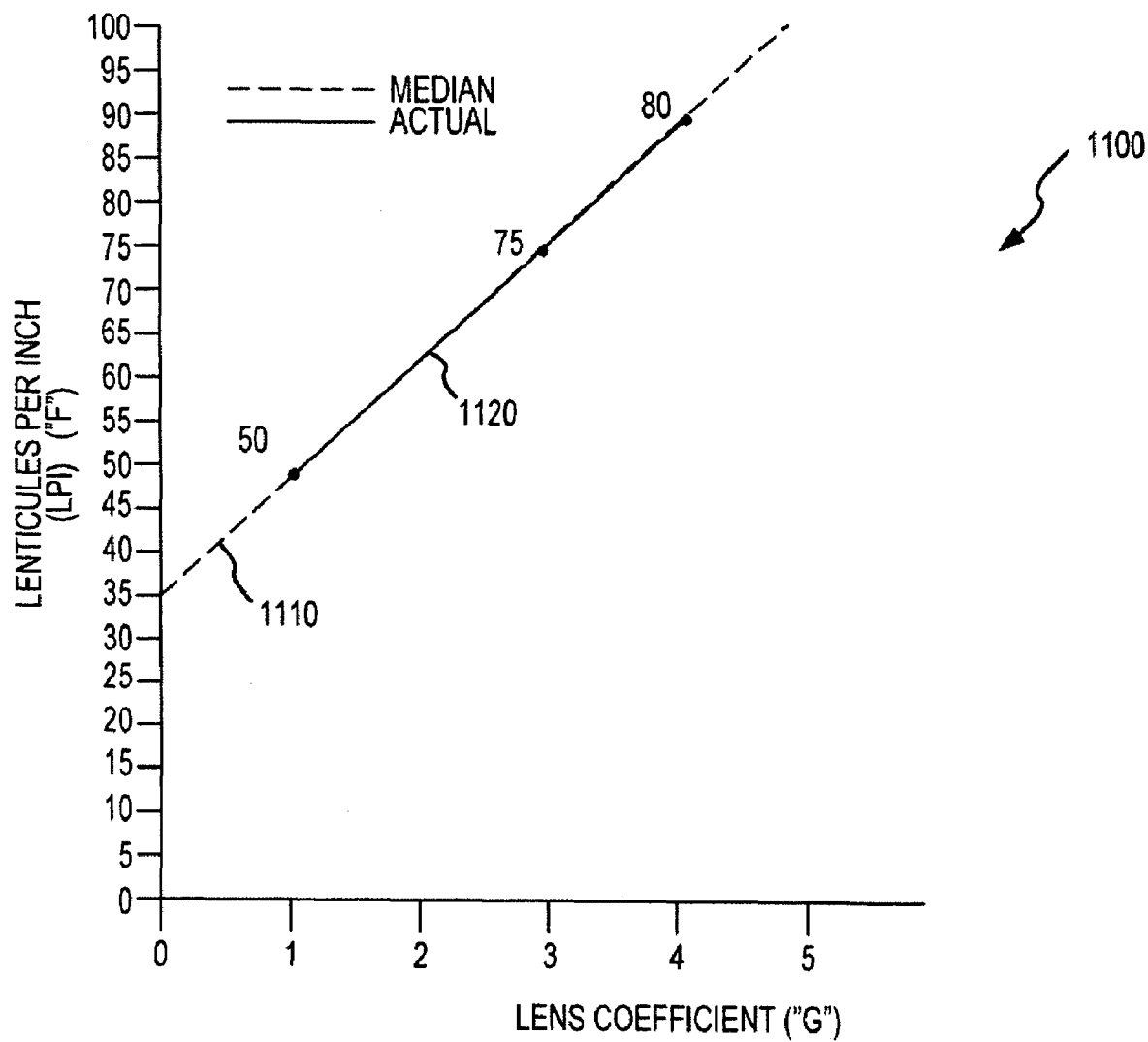

As stated earlier, the method of fabricating the containers with lenticular lens systems can be any of a number of molding or other techniques known within the container or packaging industry. Preferably, however, the lenticular lens array is fabricated to focus on the rear portion of the container (adjacent a printed image on the wall or on a label registered to the lenticules of the array), and such focusing depends on the interactions of a number of array characteristics or design parameters, on the container itself, and the contents of the container. Further, there is a relatively wide arrangement of container designs with differing wall thicknesses, materials, and inner diameters. For example, the wall thickness of the container can exceed 100 mils in some glass containers or be less than 10 mils in many disposable containers, such as PET or other plastic containers used for water, soap, and other products. However, to control costs and maintain strengths, it is typically desirable to match the thickness of the lens, $t_B$, to the container wall 10, while the other array 120 parameters can be varied to provide a desired result once a thickness, $t_B$, container size and curvature, and material are known and the design process of the invention provides a method of determining useful values for the array 120 characteristic or design parameters. In this regard, the following discussion along with reference to FIGS. 10 and 11 provides a description of how fabrication and design of a lenticular lens array for a system and container of the invention can be performed efficiently and accurately through the use of the disclosed mathematical formulas and processes.

Referring first to FIG. 4, there is a direct relationship between the lenticule lens array thickness (or container wall thickness), $t_B$, the lenticule frequency (e.g., LPI), and both the amount and quality of data and the overall graphic quality and effect provided by the lenticular lens system. In general, as lens thickness increases, $t_B$, the size of the lenticule (as indicated by the width or radius, $R_C$, of the lens ridge 122) gets larger. Hence, the thicker the lenticule ridge 122 the more data that can be placed under the lenticule 122 on the printed image 132 and the better overall 3D, animated, or other effect can be achieved in graphical image 140. According to one aspect of the invention, a mathematical or formulaic process is used to create or design the lenticular lens array 120 and is adapted such that the lens thickness, $t_B$, lenticule frequency (LPI), radius, $R_C$, and other array and system parameters such as viewing angle and array/container curvature work in unison to create a desired lens, with selected parameters being set to obtain a desired result (such as better 3D effects or better animation) and then adjusting other parameters to support the preset characteristics (such as curvature, liquid optical properties, material of the container, and size of the container for separation between the lens array 120 and the rear portion of the container wall 110). Significantly, by placing the lenticular lens array 120 on the front portion of the container wall 110 and the interlaced printed image 132 on the rear portion of the container wall 110, the thickness of the lens, $t_B$, can be significantly reduced due to the increased focal length (i.e., container inner diameter) while still obtaining more effective 3D, animation, and other higher data effects than similar sized lenticular material in which the image is adjacent the lenticules 122 and web 124.

In general, it is desirable to minimize the use of excess materials for the lens array 120 in most plastic container applications. To provide a desirable or effective graphic effect in these applications, it is desirable to use the most effective or powerful lenticular lens array configuration as possible with a given container wall thickness. In practice, such lens arrays generally have viewing angles of 45 degrees or more and more radical lens radii, $R_C$, of 4 to 8 degrees. Many popular and functional lens array configurations that can be used for array 120 that are good for 3D and animation have viewing angles in the 47 to 50 degree range with lens radii in the 4 to 6 degree range, and many manufactured lenticular materials have viewing angles of about 48 degrees with 5 degree lens radii, which are readily manufactured and are compatible for existing printing technologies. These ranges are provided for exemplary purposes and not as a limitation as these parameters may readily be altered to practice the invention as long as the parameters of the array discussed below are selected to substantially comply with the following mathematical relationships and dependencies.

In the past, lenticular lens design has involved a relatively large amount of guesswork with success depending on a designer's or manufacturer's prior experience and knowledge. The design problem is compounded for the lens arrays (such as array 120) included in container walls as the arrays are made of a number of materials that must be calibrated or matched to the curve or shape of the container wall (and integral array). In practice, the thickness of the container wall (and hence of the lens, $t_B$) is known or set and the material of the lens array and container wall is preselected, which provides a known refractive index for the lens array. The refractive index of a material relates to the rate at which the material can bend white light, with the higher the index the less thickness is required to bend the light (which is desirable in most container applications to control material costs). While numerous materials may be utilized to fabricate containers, most plastic containers are made of PET, which has a similar refractive index to APET and PETG, and hence, the following examples employ PET as the container wall and lens array material.

The following symbols are used: "A" for the refractive index of the polymer or the glass of the container wall and lenticular lens array; "B" for the thickness of the lens array (i.e., $t_B$); "C" for the radius of the top of an individual lens (i.e., $R_C$); "D" for the viewing angle of the array; "E" for the curvature of the container (i.e., $R_E$); "F" for the frequency of the lenticules typically provided in units of LPI; and "G" for the lens coefficient (which was determined by inventors to be the ratio of F/B). Also, in the following example, parameters or design variables A, C, D, and E are presumed constant and known. The established goal for these design examples are to calculate or determine a working lens frequency for a PET container that has a viewing angle, D, of about 48 degrees, a 4 to 6 degree radius, C, and a thickness, B, of 10.4 mils (e.g., a common container thickness).

In order to determine a useful lenticule frequency, F, a "lens coefficient", G, is calculated to determine the mathematical relationship between existing lens arrays in the marketplace that perform well in lenticular printing applications. In theory, there should be a close or nearly exact mathematical relationship between a calculated or designed lens array and an actual lens array that when graphed would present itself as nearly a straight line or median in which the thickness of the lens, B, required in the lens material at a particular frequency, F, could be determined and/or more importantly, the frequency, F, could be determined that would be necessary to complete a lens array within the restraints of a given or existing container wall thickness and design.

The coefficient, G, is provided by the ratio of F/B (or G multiplied by B equals F). If the thickness, B, is 10.4 mils and G can be determined to be 11.53 from working or existing lens arrays with about the desired viewing angles, D, and lens radius, C. Hence, in this example, the lenticule frequency, F, is 120 LPI (i.e., 11.53 multiplied by 10.4). In this example, G is obtained from the graph 1000 shown in FIG. 10 which shows the graphing of the relationship of frequency, F, to lens coefficient, G, as determined from an actual relationship in a fabricated lens array as shown by curve 1010 from which a straight line relationship of the lens coefficient, G, is obtained with median line 1020. The graph 1000 is based on a known or existing lens array with a viewing angle of 48 degrees and a 4 to 6 degree lens radius, C, along with a constant refractive index for the material of the lens array, A, and a known curvature of the container, E. The actual curve 1010 was prepared based on the measurements of frequency, F, of 60, 75, 85, 100, 140, and 200 LPI with corresponding thicknesses, B, of 28.5, 18.3, 14, 12, 8, and 6 mils, which led to lens coefficients, G, as graphed of 2.1, 4.09, 5.66, 8.33, 17.50, and 33.30.

FIG. 11 illustrates a similar graph 1100 showing the relationship between the lenticule frequency, F, and the lens coefficient, G. A determination of the relationship between lenticule frequency, F, and lens coefficient, G, as measured in a fabricated lens array configured to have of the a viewing angle, D, of 34 degrees and a lens radius, C, of 4 degrees with a fixed refractive index (for PET), A, and fixed curvature of the container and lens-array, E, is shown by line 1120. A median line 1110 is then provided or determined for use in later verifications of the calculated or formula derived values of lenticule frequency. The examples provided in FIGS. 10 and 11 illustrate that for a particular container configuration a lens array can be configured to have an effective lens frequency, F, to achieve desirable results as a number of design parameters are set by the container (such as lens array thickness, B, the refractive index of the container wall and array material, A, and the curvature of the container, E), others can be selected with readily predicted and useful results (such as lens radius, C, and viewing angle, D, combinations), which allows determination of the lenticule frequency, F, based on a known thickness, B, and a known or determinable lens coefficient, G, that is directly related to the frequency, F.

Figure 12:
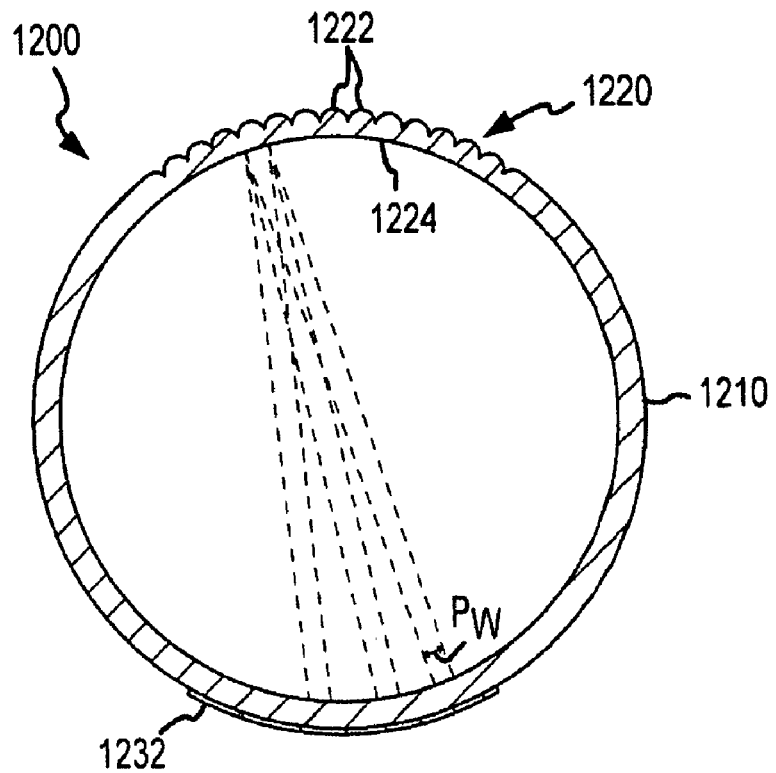
FIG. 12 shows a sectional view similar to FIG. 3 that is enlarged and simplified (e.g., with significantly reduced lenticule frequency) to more clearly shown the use of exterior lenses to achieve effective image coverage in curved containers.

FIG. 12 provides an enlarged cross-sectional view of a container 1200 with an optical system of the invention. As shown, a lenticular lens array 1220 is provided integral with a front portion of the container wall 1210. The lens array 1220 is positioned with lenticules 1222 on an exterior surface of the container 1200 and a "flat" lens layer 1224 positioned on an interior surface of the container 1200. A printed image, such as an interlaced image, 1232 is positioned on an exterior surface of a rear portion of the container wall 1210. The printed image 1232 is mapped to the lenticules 1222 such that particular portions of the data in the image 1232 are matched to one or more of the lenticules or optical ridges 1222. The printed image 1232 may be printed directly on the container wall 1210 or positioned against the exterior surface of the container wall 1210 as part of label attached with adhesives, such as for a label that only covers a portion of the container circumference (such as on soap containers and beer or liquor bottles), or with standard wraparound labeling techniques, such as used with labels that extend about an entire container circumference (such as with bottled water containers).

The lenticules 1222 are shown significantly larger than would be used in practice and at a much lower frequency for to simplify illustration of the effects of container and lens array physical characteristics on the optical effect created by the optical system. A typical embodiment can include lenticules 1222 at a frequency of about 5 to 10 LPI or more with almost a flat lens having a relatively narrow viewing angle, but the specific embodiment may vary based on a number of parameters (such as radius of the container, thickness of the lens 1222, thickness of the container wall 1210, and other physical features). For example, with greater angles of curvature of the exterior surface of the container wall 1210, the mass or thickness of the lenticular lens array 1220 (i.e., thicknesses of lens layer 1224 and lens ridges 1222) may be decreased to achieve a particular graphic result. This results because as the radius is increased in smaller circumference containers 1200 each lens 1222 is not focusing on a flat surface but instead on a convex or inwardly curved surface (i.e., the interior surface of the rear portion of the container wall 1210 adjacent the printed image 1232) as shown by the print width, $P_W$. The print width, $P_W$, is increased on the container wall 1210 due to the convex interior surface that expands the surface area of the general focus of each lenticule 1222, which, in essence, allows a lenticule 1222 to focus more easily over a greater distance (the inner diameter of the container 1200) due to the curvature of the container wall 1210.

Overall, the lenticule frequency or LPI and the lens radius can be decreased as the radius of the container 1200 is decreased (or angle of curvature is increased). Likewise, as the radius of the container 1200 increases (i.e., the distance between the lens array 1220 and the printed image 1232 increases) the lenses 1222 may be more flattened (with smaller lens radii) but still provide effective focusing on the printed image 1232 due to the space (i.e., as measured approximately by the inner diameter of the container 1200). The inner space of the container when combined with the container curvature make it possible to employ a relatively thin, course lens array 1220 to obtain a desired effect. For example, this type of array 1220 can be used to obtain 3D colored patterns.

In one preferred embodiment, the printed image 1232 (and other printed images shown in other figures) can include a first and a second interlaced image. In this embodiment, the lenticular lens array 1220 is mapped to the printed image 1232 such that the first interlaced image is visible when the container 1200 is full of a particular liquid (such as beer, soda, soap, water, and the other translucent or clear liquids) and the second interlaced is visible when the container 1200 is empty (or only filled with air). Such a configuration is obtainable by accounting for the effect of the container contents on light (e.g., the index of refraction and other characteristics of the contents and the distance the light must travel through the contents as measured approximately by the inner diameter of the container 1200). Such a two-image embodiment is useful for facilitating contests in which an initial decorative image is provided by the first interlaced image (or advertises the contest) and an after-use image is provided by the second interlaced image indicating winning and losing containers 1200 (such as with "Try Again" or "WINNER" text or other text and/or images).

Figure 13:
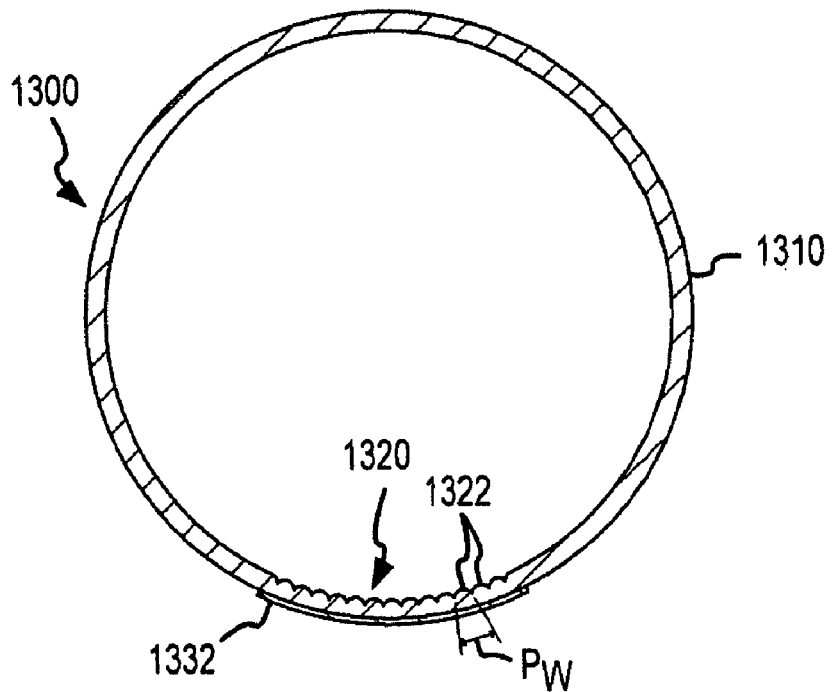
FIG. 13 shows a sectional view similar to FIG. 12 of an inside-the-container embodiment in which the lenticules of the lens array are positioned inside the container to focus on a printed image positioned on an external surface of the wall of the container or printed directly on the exterior surface.

FIG. 13 illustrates a cross section of container 1300 with inside-the-container embodiment of a lenticular lens system (again enlarged with a significantly reduced lenticule frequency than typically would be implemented in practice for ease of illustration of the concepts of the invention). As shown, a lens array 1320 is provided integral with a rear portion of the container wall 1310 with a lenticular surface of optical ridges 1322 positioned contiguous with the interior surface of the container wall 1320. A printed image 1332 is provided, such as with a label (not shown) or with direct printing, on the exterior surface of the container wall 1310 adjacent to and mapped to the lenticules 1322. The curvature of the lens array 1320 (and corresponding container wall 1310) results in each of the lenticules 1322 focusing on the printed image 1332 with a print width, $P_W$, that is larger than would be achieved with a flat lenticular lens sheet.

As with container 1200, the lenticule frequency can be decreased and/or the thickness of the lens array 1320 decreased for containers 1300 with smaller radii (or with lens arrays with greater angles of curvature) but to a lesser degree than container 1200. More importantly, because there is no distance between the lens array 1320 and the printed image 1332, a more direct and known relationship exists between the design or characteristics of the lens array 1320 and a resulting graphic effect. For example, as the curvature of the lens array 1320 increases (inverse relationship to the radius of the container wall 1310), the thickness of the lens array 1320 (or container wall 1310 in embodiments where these thicknesses are approximately equivalent) required for a particular graphical effect is reduced and/or the lenticular frequency can be reduced.

In either of the embodiments shown in FIGS. 12 and 13, it is often useful to adjust label printing or print image pitch or frequency to obtain a desired graphical effect and/or mapping of interlaced image to lenticules in the arrays 1220, 1320. In practice, the printing pitch provided in the printed image 1232, 1332 is adjusted whether provided on an inner surface of a label or whether printed directly on an exterior surface of the container wall 1210, 1310, and such an adjustment during container manufacture has not been performed prior to the use of the lenticular lens systems described herein. The printing pitch adjustments are performed differently for the two configurations of FIGS. 12 and 13. In the exterior lens arrangement of container 1200, as the curvature of the lens array 1220 is increased (such as due to a decreasing radius of container wall 1210) the print width, $P_W$, is decreased or shrunk to match the lenticule placement and shape (assuming a constant lenticule frequency). In contrast, in the interior lens arrangement of container 1300, as the container radius gets smaller and the lens array 1320 gets a greater curvature, the printing width, $P_W$, is increased or made wider to better fill each lenticule 1322 focusing on the printed image 1332.

The effect of contents, such as water or other liquids, will be different in each container 1200, 1300 and should be considered in designing the lenticular lens system for each container 1200, 1300. In container 1200, the addition of a liquid results in a magnification, e.g., a magnification of 1.5 to 3.0 or more for typical containers, that varies with the properties of the liquid and the container size. Hence, the printed image 1232 preferably is engineered for the expected magnification to obtain a desired graphical effect by ensuring the data strips of the printed image 1232 line up or are mapped to the lens ridges 1222 with proper dimensions, which is especially important in embodiments of the printed image 1232 which contain a first and a second interlaced image with the first image visible in the presence of the magnification and the second image exclusively visible in the absences of such magnification. In container 1300, the addition of the liquid magnifies the image in a one-way fashion from the rear portion of the container wall 1310 to the front portion of the container wall 1310. The magnification effect is lessened but still needs to be taken into account in engineering the printed image 1332 to obtain a desired effect. In the container 1300, the created graphical image will basically be the same in the presence and absence of the liquid but will be magnified or enlarged in the presence of the liquid. Hence, in some embodiments, the printed image 1332 is configured such that the created graphical image is sized based on the front portion of the container wall 1310. For example, in some embodiments, the printed image 1332 is configured to fill all or some portion of the front portion of the container wall 1310 with a graphical image or effect when the container 1300 is filled with liquid and magnification is taking place and to fill a reduced portion of the front portion of the container wall 1310 when the liquid is removed from the container 1300.

Figure 14:
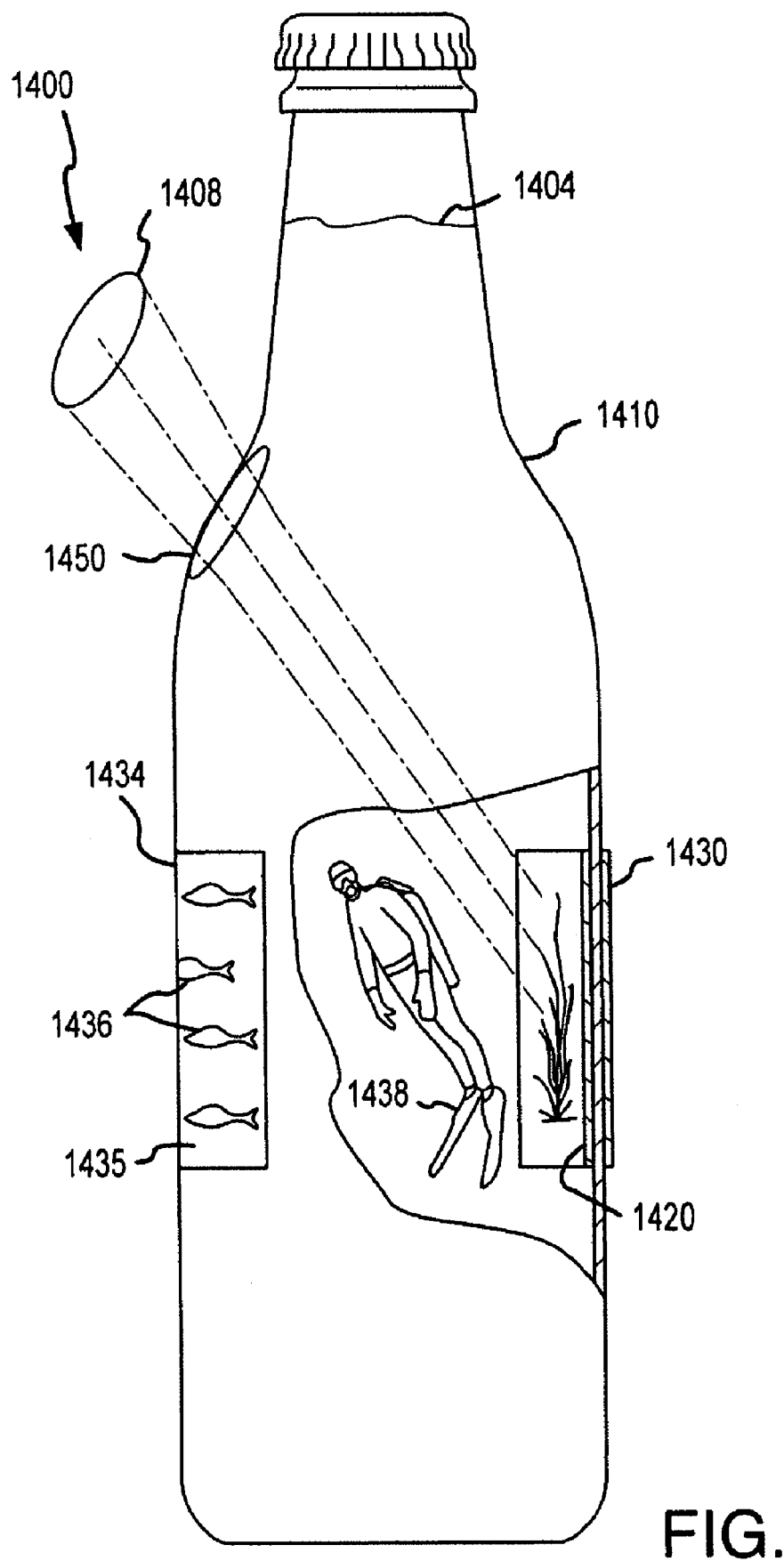
FIG. 14 illustrates yet another lenticular lens system in a container (such as a clear glass bottle, e.g., a beer bottle and the like) in which the lenticules of the lens array are positioned inside the container, a light focusing lens is provided to direct light toward the lenticules and/or the printed image behind the lenticules, and an additional printed image is provided on the front portion of the container to provide forefront images or objects to enhance the 3D or other image effects obtained by the lens system.
Figure 15:
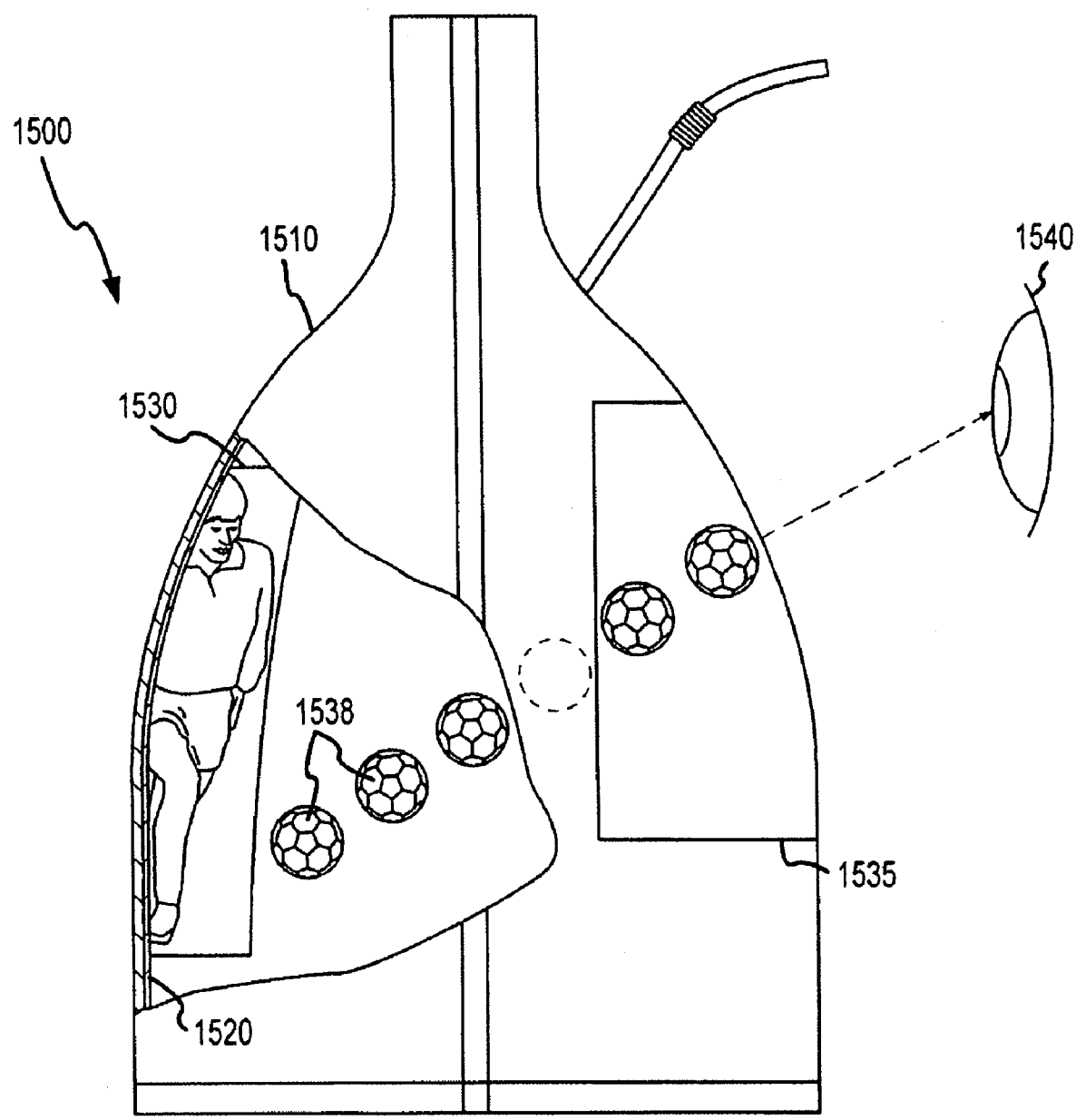
FIG. 15 illustrates a flexible beverage container (such as common juice pouches or bags) with a partial cutaway to show that a lenticular lens system is provided in the container that provides a clear front window to allow light into the container and to provide a line of sight to a lens array with lenticules positioned inside the container with a printed image provided on the inside or interior wall of the container (typically, fabricated from a metallic material)

The number of specific arrangements of containers with lenticular lens systems having features of the invention (such as a lenticular lens array integral with a container wall) are expected to be very large and readily apparent to those skilled in the art who have read and understood the description of the invention and these numerous arrangements are believed to be within the scope of the invention. FIGS. 14 and 15 provide two more exemplary embodiments of containers with lens systems of the invention.

In FIG. 14, a container 1400 such as a glass or plastic beer or other beverage bottle is shown with a container wall 1410 retaining liquid 1404. A printed image 1430 is provided on the exterior surface of a rear portion of the container wall 1410. As shown, a lens array 1420 is provided on the interior surface of the rear portion of the container wall 1410 adjacent the printed image 1430. In the container 1400, the lens array 1420 has a thickness greater than the adjacent container wall 1410. In some embodiments of the lens systems or containers of the invention, the lenticules or optical ridges are fabricated or molded by providing additional material at the location of the lens array 1420. For example, the "flat" lens layer of the lens array 1420 may have a thickness substantially equivalent to the container wall 1410 and the additional material may be provided for the lenses such that the thickness of the lens array is the container wall thickness plus the thickness or radius of the optical ridges.

The lens system of container 1400 further includes a light-collecting lens 1450 for collecting and/or directing light rays 1408 toward the lenticular lens array 1420 and/or the printed image 1430. A "floating" graphical image 1438 is produced with 3D effects produced by the combination of the lens array 1420, the printed image 1430 and collecting lens 1450. To enhance the 3D or graphical effect achieved, the lens system of container 1400 includes a frontal image element 1434 (such as a label or printing directly on the container wall 1410) on the exterior surface of a front portion of the container wall 1410. The frontal image element 1434 includes forefront images 1436 and a transparent portion 1435 (in embodiments of direct printing the transparent portion can be eliminated). The forefront images 1436 enhance the 3D effect by providing images viewable at the outer surface of the container wall 14210 that when combined with the projected 3D image 1438 and the background images on the printed image 1430 produce a multi-layered graphical effect.

FIG. 15 illustrates another useful container 1500 in which a lens system of the invention can be incorporated to produce an image to a viewer 1540, such as an image with 3D and motion like a soccer player kicking a ball 1538 that moves through the container 1500 toward the viewer 1540. The container 1500 may be a flexible beverage container, such as those used for distributing juice beverages, with flexible or compressible container walls 1510 that are typically metallic and opaque. A clear window 1535 (such as a transparent or translucent plastic element) is provided in a front portion of wall 1510 to allow light to enter the container 1500 and provide a line of sight to the viewer 1540. The cutaway view shows that the lens system includes a printed image 1530 provided on the interior surface of the rear portion of the container wall 1510. Adjacent to and mapped to the printed image 1530 is a lenticular lens array 1520. In this embodiment, as opposed to those described in FIGS. 1-14, additional (and often differing) material is provided and attached to the wall 1510 rather than being provided integrally with the container wall 1510. Because the container walls 1510 are not blow or injection molded typically the temperatures occurring during manufacture are low enough to not be a concern in damaging the ink in the printed image 1530 or in damaging the lenticules in the lens array 1520, which can be attached with standard adhesives and practices.

While forming a lenticular lens array integral with a container wall provides many advantages, containers can be produced with other configurations to provide excellent quality images with non-integral lenticular lens arrays. The following paragraphs explain some of these differing designs for containers and for lenticular lens systems with reference to FIGS. 16-27. One such method involves forming a lens or lens array on a container by using a clear plastic in the form of a wrap or decal to form the top of the lens array. This structure could readily be formed on a decal or wrap surface by embossing or extruding the shape of the top of the lens (i.e., shaping the lenticules). Such wrap around and decal methods are very desirable from a cost and tooling point of view, as they allow application of a bottle wrap or decal on an already tooled container, e.g., a typical bottle or other often used glass or clear plastic container.

Interestingly, the lens top or the lenticular lens array in the label or decal would be relatively useless and not designed properly for application directly onto an interlaced printed piece if it were not for the thickness of the container and its walls and the mathematic that allows the formation of the lens array and the focal point designed for the particular container. In other words, the thickness of the decal or clear embossed wrap becomes part of the container wall and together these structures form a lens system that is effective in focusing on a focal point near a printed image provided on the container, such as on the wrap around label in a portion opposite the lens array or on the exterior or interior surface of the container wall (or even as an integral portion of the container wall).

Figure 16:
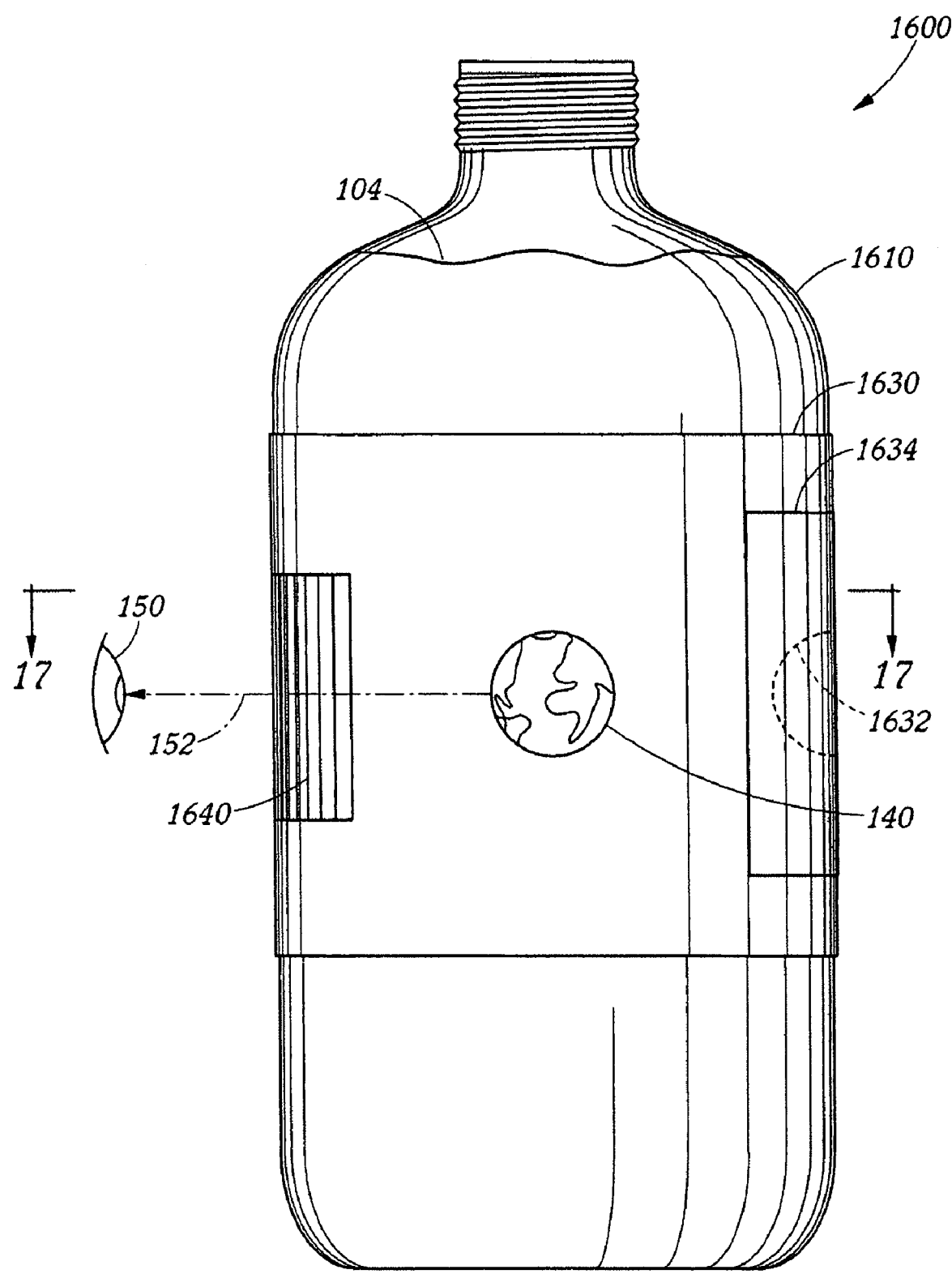
FIG. 16 is a side view similar to FIG. 2 illustrating another embodiment of a container according to the invention with a wrap around label with an integral lenticular lens array formed in a first portion on the exterior surface of the label with a printed image in a second portion of the label.
Figure 17:
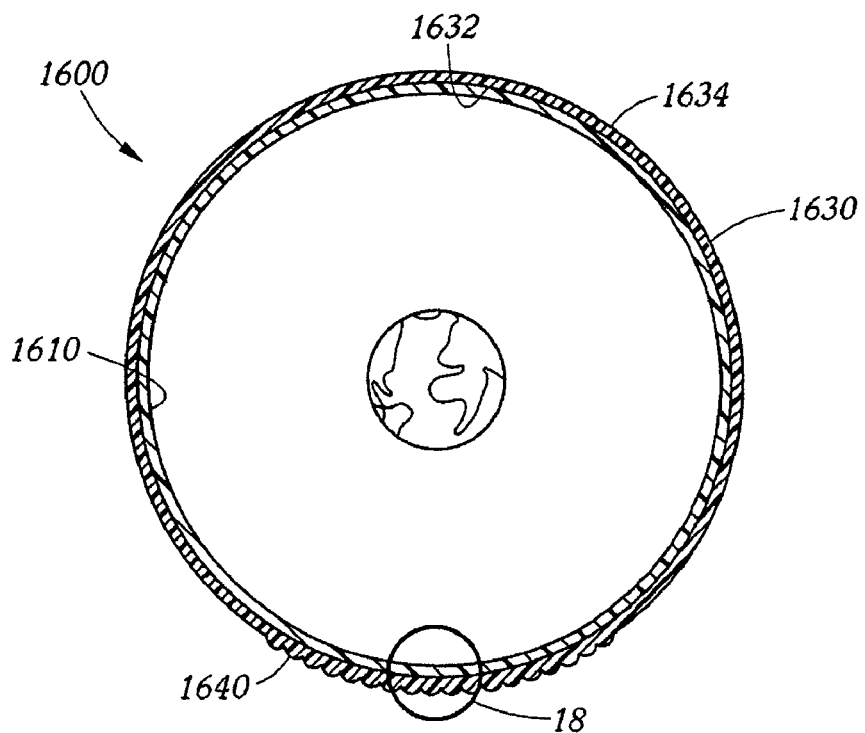
FIG. 17 is a sectional view of the container of FIG. 16 illustrating that the printed image is positioned opposite the lenticular lens array such that the container walls and any liquid in the container form the lens system.
Figure 18:
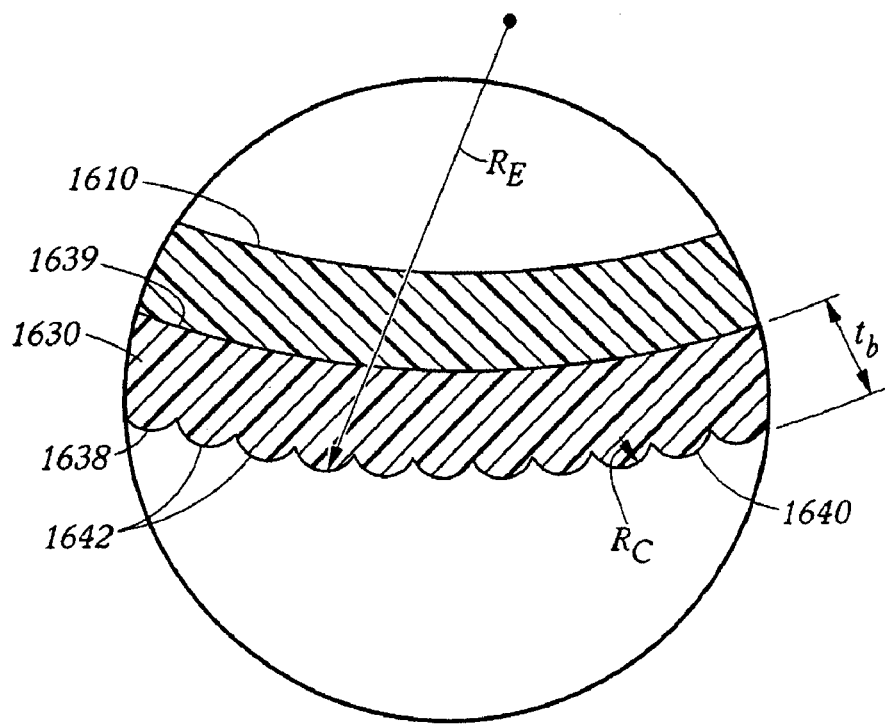
FIG. 18 is an enlarged view of part of the sectional view of FIG. 17 illustrating in more detail the lenticular lens array formed integrally with the wrap around label.

FIGS. 16-18 illustrate a container 1600 utilizing a lenticular lens system of the present invention to produce a floating image 140 visible to a viewer 150 using exemplary sight line 152. As shown, the container 1600 is provided with a standard shape, such as those used for water and other similar bottles, but the invention is broad enough to cover nearly any shape for which a wraparound label may be provided. The container 1600 includes clear or translucent walls 1610 for containing contents, such as a liquid, 104. The container wall 1610 is typically formed of glass or, more typically, of a plastic such as polyvinyl chloride (PVC), polypropylene, polyethylene, polyester (such as PET, APET, PETG, and the like), or any other plastic useful in the packaging industry.

In contrast to the container 100 of FIG. 1, the container 1600 does not include a lenticular lens array integral with the container wall but instead a lenticular lens array 1640 is provided as an integral portion of a wrap around label 1630. As shown, the lenticular lens array 1640 is configured with numerous lenticules or lenses 1642 of ridges or ribs formed in an exterior surface 1634 of the label 1630. The lenticules 1642 extend parallel to each other and, typically, to a longitudinal axis of the container 1600. As with the container 100, the lenticules 1642 of the lens array 1640 are configured in frequency (lenticules per inch) and shape (such as width and radius) based on the material of the container wall 1610 (and array 1640), based on the liquid contents 104 of the container 1600, and the curvature of the container wall 1610 to focus on the rear portion of the container wall 1610. The space or distance (i.e., the inner diameter of the container) allows a coarser configuration for lens array 1640 to be used while still providing a large quantity of data in the printed image 1632. The lenticular lens array 1640 can have a wide variety of dimensions (such as a height and "width") selected based on the size of the container 1600 and the size of the printed image 1632 and shapes (such as a square, a rectangular, a triangle, a circle, an oval, or any other useful shape for viewing the image 1632).

With lenticular lens array 1640 focusing on the rear portion of the container wall 1610, a graphical image 140 can be produced within the container 1600 so as to "float" in the liquid 104 or elsewhere by providing a printed image 1632 at the focal point of the lens structure or system. The label 1630 is fabricated from a clear or translucent material, such as a plastic, so as to not interfere with light passing through the lens array 1620. The wrap label 1630 together with the container walls 1610 (front and back in this embodiment) combine—along with the liquid 104 in some cases—to form the lens structure or system that generates the image 140.

The label 1630 includes a data area or backdrop portion 1634 in which a printed image 1632 is provided on an interior side or surface of the label 1630. When the label 1630 is placed on the container 1600, such as by heat shrinking or other application techniques well-known in the packaging arts, the printed image 1632 is positioned relative to the rear portion of the container 1600 (e.g., at the focal point of the lenticular lens array 1640, container walls 1610, and, if present, liquid 104) to map or register the interlaced printed image 1632 with corresponding lenticules 1642 or portions of the lenticular lens array 1640. As discussed previously, the image 1632 may be printed using known techniques for printing images or data to achieve graphics, such as 3D, animation, or action, and for use with lenticular lenses or lenticular materials. As with the container 100, the mathematics used for designing and printing the image 1632 are preferably not only selected to match the lens material and configuration in the label 1630 but also the distortion caused by the curvature of the container wall 1610 and array 1640 and of the liquid 104 in the container 1600.

FIGS. 17 and 18 more clearly show the construction of the wrap around label 1630 with the integral lens array 1640 and the fabrication of the container 1600. As shown, the label 1630 has an exterior or first surface 1638 and an interior or second surface 1639 opposite the first surface 1638. The lenticular lens array 1640 is formed on a portion of the exterior or first surface 1638 with a plurality of lenticules 1642 which are formed of valleys extending into the label thickness and ridges extending out from the label 1630. The lens array 1640 has a flat surface on the interior or second surface of the label 1630 that abuts the exterior surface of the container wall 1610. The label 1610 further includes the data area 1634 which includes the printed image 1632, which may be on the interior surface 1639 of the label 1630 as shown or on the exterior surface 1638 of the label 1630. Further, in some embodiments not shown, the printed image 1632 is printed directly onto the container wall 1610 on an interior or exterior surface so as to be positioned at the focal point of the lens array 1640.

Typically, the label 1630 is fabricated from a very thin sheet of clear plastic to minimize distortion through the array 1640. The lenticular lens array 1640 includes a plurality of optical ridges or lenses 1622 (extending vertically as shown or horizontally) and a transparent lens layer or web abutting the container 1610. Fabrication of such lens arrays (including using mathematical formulas of the invention in the design processes) is explained in detail with reference to FIGS. 10 and 11. Here it is useful again to understand that the array 1640 has a thickness, $t_b$, that affects focusing of the array 1640 and typically is substantially equivalent to a thickness of the label 1630 (although in some cases the array 1640 may be slightly thicker or thinner to provide a desired optical effect and/or provide a desired structural strength). Optical results of the array 1640 are also determined by other physical characteristics of the array 1640 including the material of the array 1640 and label 1630, the material of wall 1610, the frequency of the lenticules or ridges 1642 (typically measured in lenticules per inch (LPI)), the curvature of the array 1640 as determined by the curvature, $R_E$, of the container wall 1610, and the radius (or width) of the lenticules or lens, $R_C$, and the relationships between these characteristics or design parameters. Additionally, the resulting optical effect is determined in part by the liquid 104 (or lack of liquid) in the container 1600 and the distance from the lens array 1640 to the rear portion of the container wall 1610 (and the printed image 1632) which is approximately the inner diameter of the container 1600 at the location of the array 1640 and the printed image 1632.

A number of techniques can be used to produce the label 1630 and container 1600 including the label 1630. For example, a clear label wrap 1630 in some embodiments is used that is printed and embossed in line (or in separate processes) as with the lens array 1640 (embossing) and the printed material of data area 1634 and printed image 1632. The wraps currently used for bottled water, for instance, are printed and embossed in line and then "shrink wrapped" in their normal process around the bottle. In one case, the same printing press that prints the flexography inks is used to emboss the top of the lens array into the plastic using a heated or unheated pressure roller. In another case, the lenses or lenticules of the lens array 1640 applied in spots of the roll and only in the desired locations of each label 1630.

An important feature of the embossing or array fabrication technique is the calculation of the focal point of the lens array 1640 of the label 1630 in combination with the container wall(s) 1610 and the distortion created in the process of shrinking or applying the wrap 1630 to the container 1610 so that the printing matches the lens 1642 in the process. Additionally, the label 1630 must be designed and fabricated for a particular diameter container 1600 such that lens array 1640 lines up in the wrap application (or wrapped/applied condition) correctly to the printing on the wrap label 1630 when applied to the container wall 1610. The whole process can be done in line on the same equipment currently used for printing and applying the labels with an embossing station. This particular method would not only be efficient, but it would also be commercially feasible within a short period of time. The additional tooling would be minimal, and the wrap label 1630 can be adjusted in line and would involve only one process for application and quality control. In line operators adjust the printing and the lens application at the same time in the process. There would not be any additional cost in the manufacturing process except the die cost for the lens embossing station. Another embodiment involves obtaining the plastic label (this is commonly polypropylene) embossed or spot embossed or extruded (or performing these operations separately) prior to the printing of the wrap label 1630.

Figure 19:
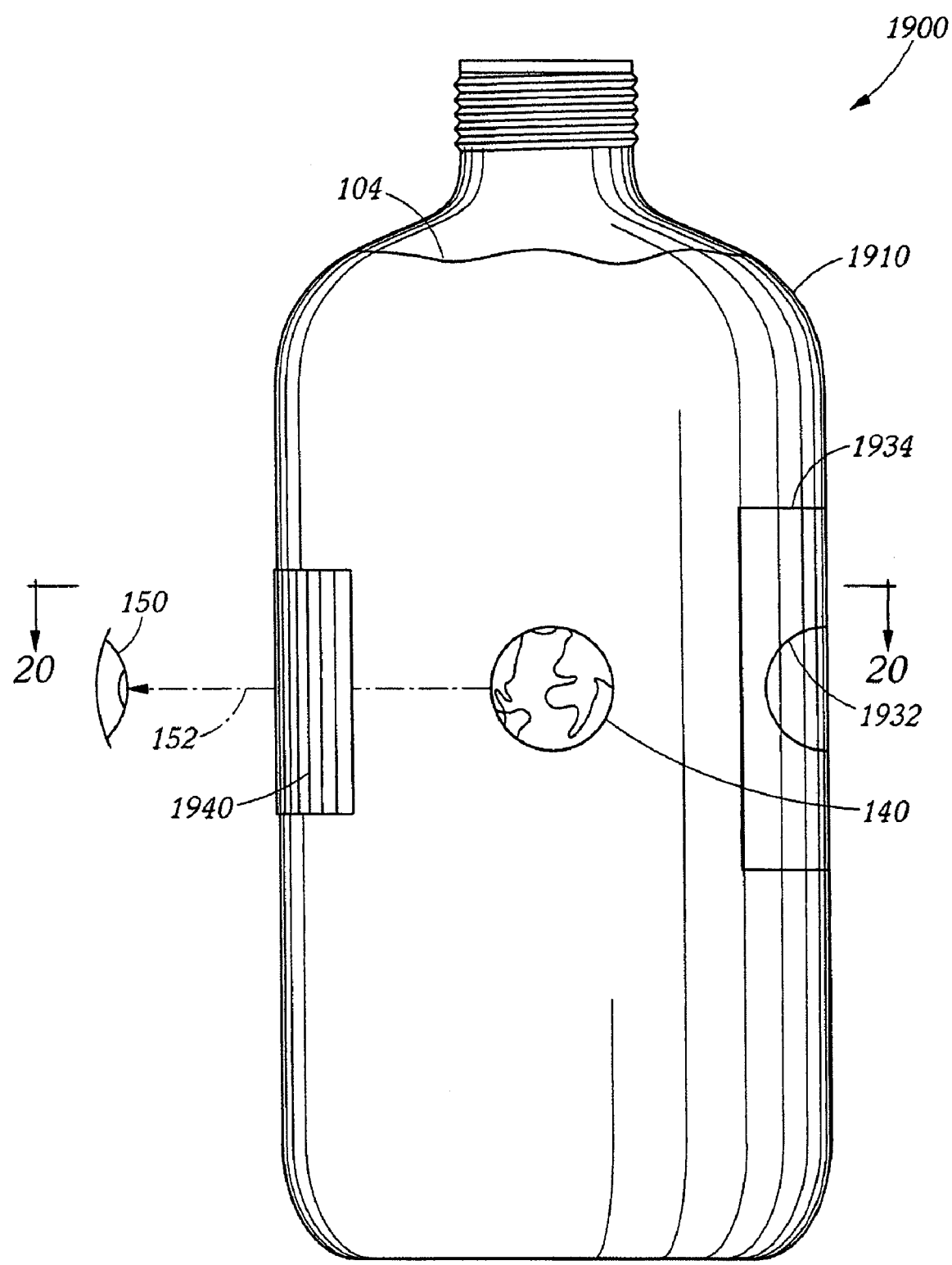
FIG. 19 is a side view similar illustrating yet another embodiment of a container that includes a lens system according to the invention that utilizes a lenticular lens decal combined with a transparent container to focus on an image printed directed on or within the container wall.
Figure 20:
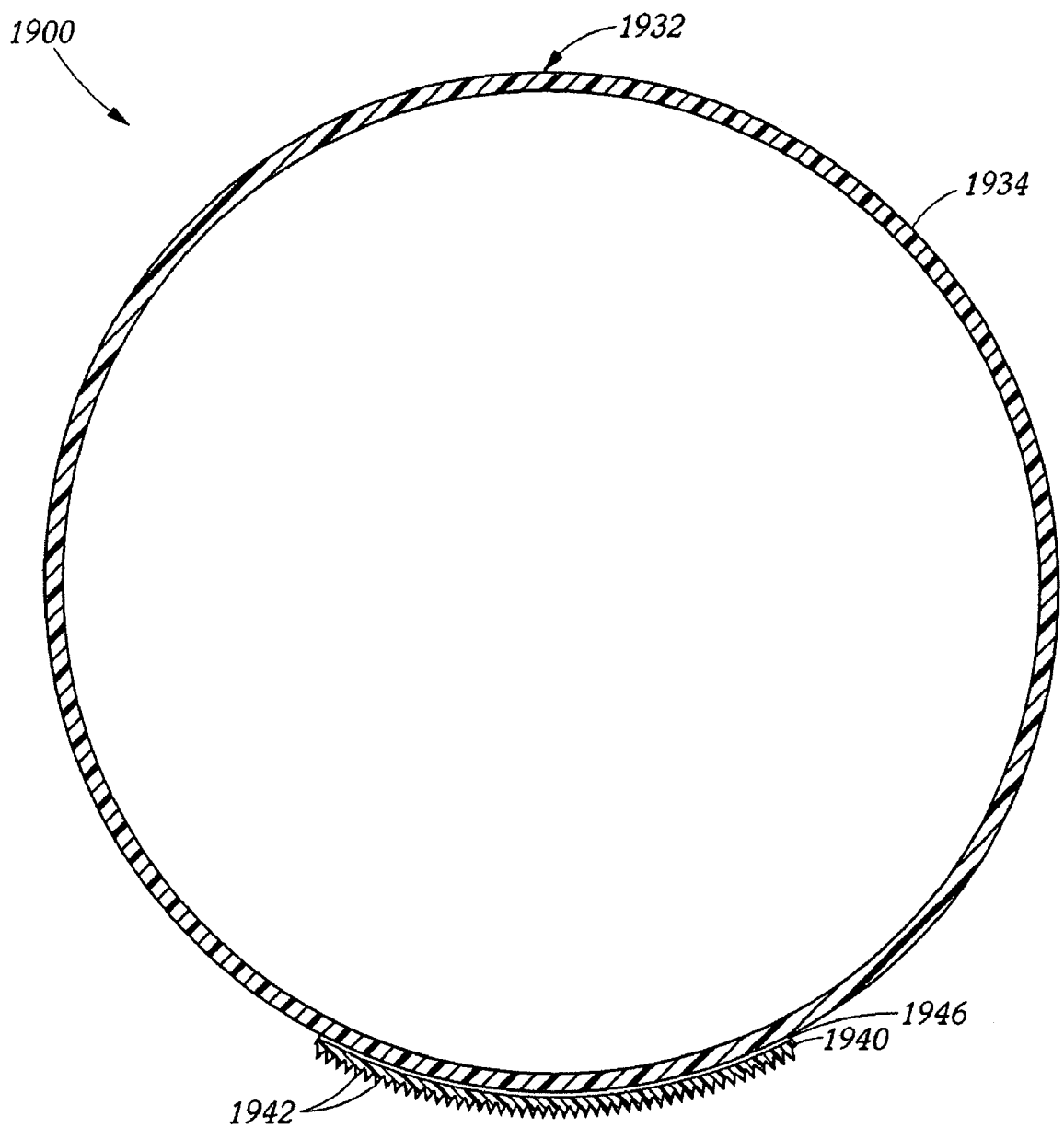
FIG. 20 is a sectional view of the container of FIG. 19.

FIGS. 19 and 20 illustrate another embodiment of a container 1900 according to the invention. As shown, the container 1900 differs from container 1600 in that a wrap around label is not used to provide and position a lens array and the printed image. Instead, the container 1900 includes container wall 1910 with a data area 1934 that is formed directly upon the container wall 1910. As shown, a printed image 1932 is printed upon an outer surface of the container wall 1910 in the data area 1934. Significantly, a lenticular lens array 1940 is provided in the form of a decal (i.e., an element that does not extend completely about the circumference of the container 1600). The array 1940 is positioned on the exterior surface of the container wall so as to be substantially opposite the data area 1934 and printed image 1932 (or such that the printed image is at the focal point of the lens array 1940).

As shown, the lenticular lens array 1940 includes a plurality of lenticules 1942 (such as or similar to the lenticules 1642 of array 1640 in FIG. 16) on its exterior surface, i.e., distal to the container wall 1910. A flat surface of the array 1940 is adjacent or proximal the container wall 1910, and the array 1940 is affixed to the container using an adhesive applied at the interface 1946 (or the array 1940 could be said to include an adhesive layer). The lenticular lens array 1940 is configured with lenticules 1942 having a frequency and other design characteristics (discussed above) such that the focal point of the lens system is at or about the printed image 1932, i.e., in this case, at the exterior surface of the container wall 1910 opposite the lens array 1940. In other embodiments, the printed image 1932 may be positioned on the inner surface of the container wall 1910 opposite the array 1940, and in these embodiments, the focal point would preferably be at or near the interior surface of the rear container wall 1910. The configuration of the lens array 1940 should take into account the thickness, shape, and materials of the lens array 1940, the adhesive 1946, the container walls 1910 (front and back), and any contents of the container 1900.

To form the container 1900, one method of application is for the thin lens array 1940 to have a hot melt glue, pressure sensitive adhesive, static electricity or any other method of application that allows the label 1940 to stay in place on the container wall 1910. This may be considered a "decal" lens array application method. The decal 1940 in one embodiment is made out of a clear, pressure sensitive material and is embossed or extruded in rolls to form the lenticules 1942, typically prior to the application of the adhesive 1946. In some preferred embodiments, the lenticules 1942 are embossed onto a base material of the array 1940 having a thickness from about one mil to about twenty or more mils and then, the lens array 1940 is applied to the container 1900. The container wall 1910 and the thickness of the material (including the adhesive) would be calculated in combination to create the focal point of the lens array 1940. The application of the lens array 1910 onto the container 1900 would preferably be straight and consistent so that the application of the printed label (in some embodiments) or the printing to the data area 1934 with printed image 1932 (as shown) is aligned consistently regardless of whether printing occurs before or after application of the array 1940. In some cases, the decal arrays 1940 are embossed in sheets to form the lenticules 1942 with a desired configuration or in rolls and are then converted into die cut pieces in line prior to or in conjunction with their application coming off the line. The lens array 1940 is formed of a clear plastic and in one particular embodiment is formed out of UV curable acrylic (or some other polymer).

The lens system shown for container 1600, 1900 is applied to glass containers in some embodiments of the invention. The label lens is applied over the glass bottle or container forming the top of the lens array. The thickness of this lens piece is combined with the container wall to equal the focal point of the particular container. In these embodiments, the label lens is sometimes made out of thin glass and applied to the glass container wall. These embodiments preferably address the fact that blown glass lens arrays are difficult to keep consistent in the process. Hence, in the described glass embodiments, glass or acrylic is molded, injection molded, or otherwise processed to form a flat or curved piece that is applied to the container with glue, heat, pressure, and the like. In this manner, glass containers according to the invention facilitate the formation of a perfect (or near perfect) lens that is applied to the container (such as container 1600 and 1900).

Figure 21:
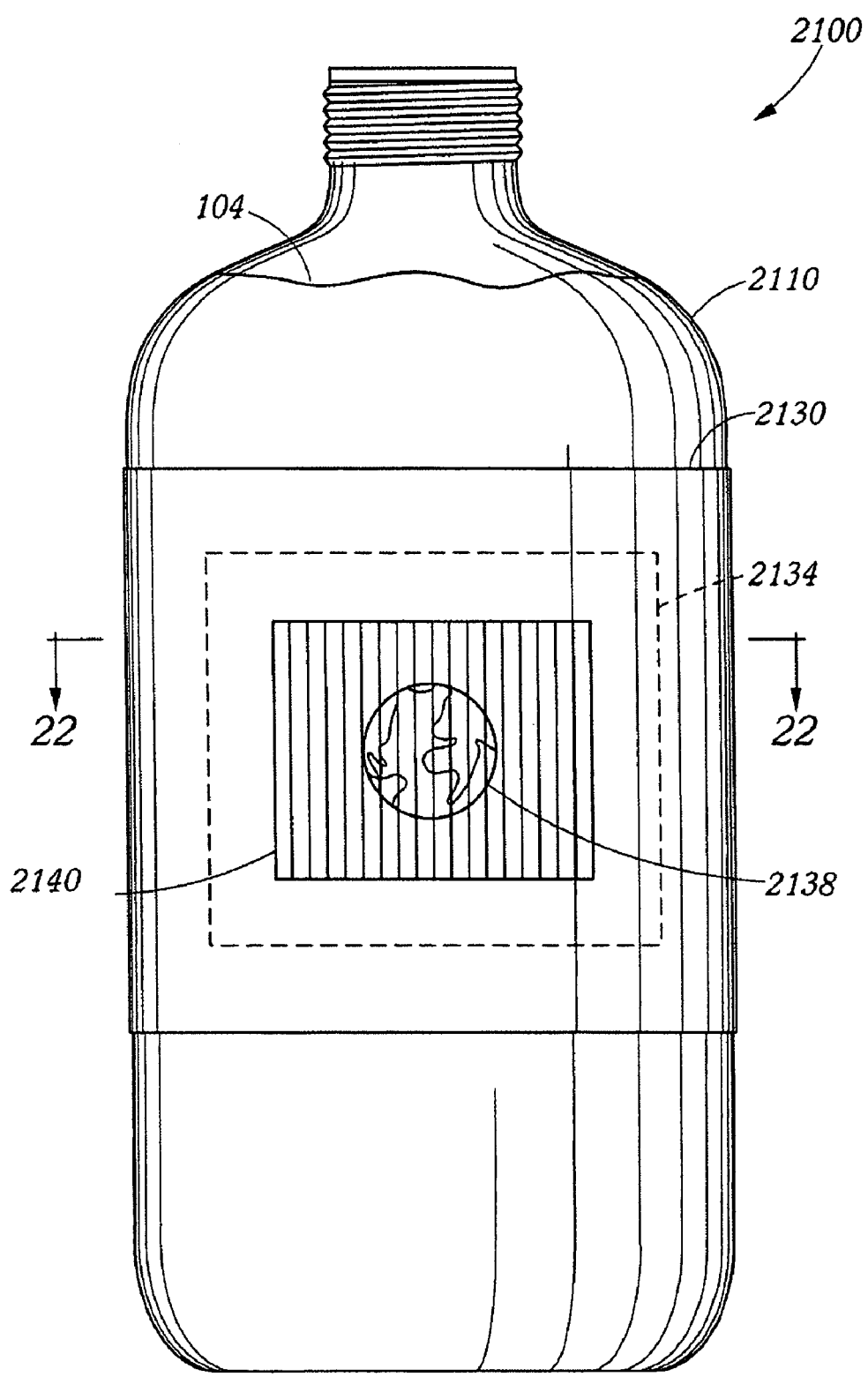
FIG. 21 is a front view of a container according to another embodiment of the invention utilizing a wrap around label with an integral lenticular lens array and a printed image provided on the label adjacent the lens array on the opposite side of the label.
Figure 22:
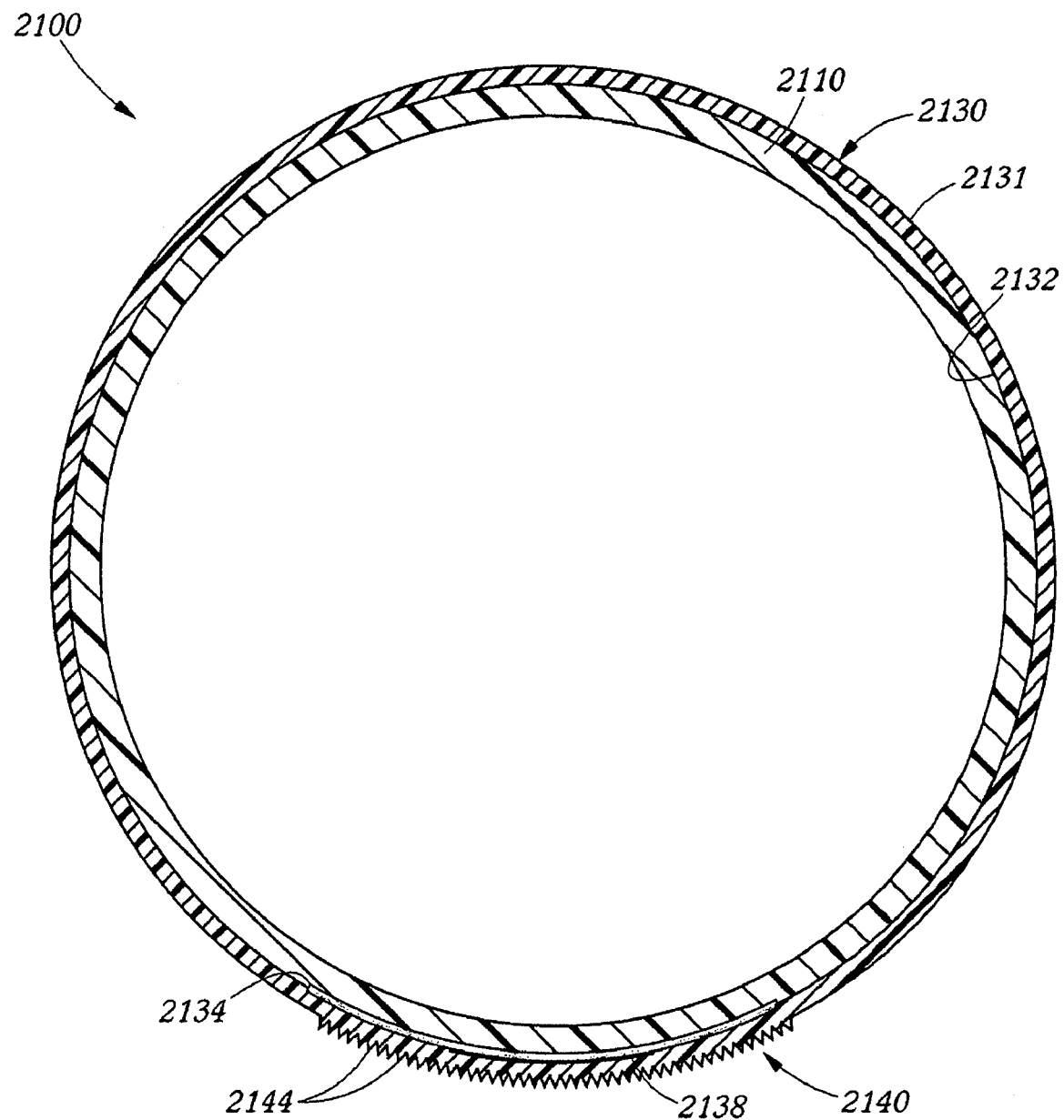
FIG. 22 is a sectional view of the container of FIG. 21.

FIGS. 21 and 22 illustrate a container 2100 according to an embodiment of the invention that requires no modification of the container walls 2110. The image and the lenses are both provided as part of a wrap around label 2130. The label 2130 is applied to the container walls 2110, such as with heat shrinking and little or no adhesive. The label 2130 is formed of a clear material, such as plastic, and as with the label 1630 of FIG. 16 it is relatively thin. The label 2130 includes a lenticular lens array 2140 that is typically but not necessarily formed by embossing the outer surface 2131 of the label 2130 to form a plurality of lenticules 2144. When the label 2130 is applied to the container wall 2110, the lenticules 2144 are distal to the container wall 2110.

The label 2130 further includes an inner or second surface 2132 that abuts the container wall 2110 when the label 2110 is attached to the container wall 2110. On the inner surface 2132 adjacent the lenticular lens array 2140, a data area 2134 is provided (and may take any of the forms discussed above). In the data area 2134, a printed image 2138 is provided, such as with any of the printing methods described herein. In other embodiments (not shown), the image may be provided on the container wall 2110. In the container 2100, the lens structure has a much smaller overall thickness and the focal point is very near the lens array 2140 than in the containers 1600 and 1900 and hence, it may be appropriate to include a smaller quantity of data in the image 2138. The thickness of the wrap around label provides the thickness of the lens system, and this thickness includes the lenticules 2144 and the flat web portion of the array 2140 behind or between the lenticules 2144 and the image 2138. The focal point of the lens array 2140 is at or near the back of the label 2130 (i.e., interior label surface 2132) or at the exterior surface of the container wall 2110. Manufacture of the container 2100 is simplified as the image 2138 and lens array 2140 are mapped as part of the fabrication of the label 2130 and the label 2130 can be applied to the container wall 2110 without concern for registering of the lens array 2140 with the image 2140.

Regarding the embodiments of FIGS. 16-22, it may be useful to provide a number of exemplary (but not limiting) design characteristics useful in creating containers with desirable visual effects. The wrap around label or decal thickness used to provide the lens array (and often the printed image) in several preferred embodiments is kept in the range of about 2 to about 16 mils and more preferably between 3 and 15 mils.

For a wrap around label that has printing (i.e., the printed image) directly on the reverse or interior side (i.e., directly behind the portion of the label that contains the lens array), embossing of the lenticules on the exterior surface of the label is used in one embodiment. The printing and embossing may be completed concurrently or serially during the manufacturing process, and the LPI may range significantly to practice the invention. For example, thicker wraps having a thickness of about 14 to about 16 mils may utilize a lenticule frequency of 80 LPI while thinner wraps (e.g., more common thickness for labels) having a thickness up to about 8 mils or larger may use a larger lenticule frequency of about 140 to about 200 LPI.

Container embodiments that utilize a lens system including the thickness of the container wall(s), any contents of the container, and also the thickness of the wrap around label (or decal) to focus at the back of the container have frequencies of about 8 to about 30 LPI. The frequency preferably varies to support selected viewing angles, design of the lens, and the particular image (e.g., 3D, motion, or the like). In these embodiments, the wrap or label (or decal) is typically between about 2 to 8 mils, with thinner labels being utilized since surface embossing or other techniques for providing the lenticules is combined with the thickness of the container to form the lens structure or lens system.

As a result, the combination of the lens array in the label and the container wall thickness with the distance to the focal point (i.e., the diameter or distance from a front wall to a rear wall of the container) and the curvature of the container (in some cases combined with the magnification caused by the contents of the container) produce a very powerful lens structure or system, even with a relatively think label. In general, the thickness of plastic container walls is about 12 to 20 mils, which would be combined with the label or wrap thickness of about 6 to 8 mils in one embodiment. The coarseness or low lenticule frequency in this embodiment makes the printing of the image or data area more forgiving as the data space in a, for example, 20 LPI lens array is much more forgiving and wider than a higher frequency or less course lens array. Hence, label printing according to the invention is easier and less error prone.

As will be appreciated by those in the label manufacturing industry, a number of techniques can be used to create the wrap around labels (and also the decals and inserts) of the invention so as to provide lenticules or a lens array and, at least for some embodiments, a printed image in a data area. For example, but not as a limitation, the labels may be produced by embossing the lens array or lenticules on the label. The embossing is performed as the label material is extruded using a typical extruder of plastic, e.g., an extruder that utilizes heated rollers and/or an oven to heat and shape the material to a desired thickness. In one case, a chill roller is used to emboss the heated, extruded plastic (alone or in combination with a pressure roller) and then, chill the label material so as to form the lenticules across entire width of the material or in a section of the material (i.e., in the lens array shown in FIGS. 16-22). This technique may be labeled "off line embossing." Printing may occur before or after the embossing (or in some cases, even during embossing, and then, the material is wound for distribution and/or further processed for application as labels (such as by die cutting prior to application to a container). Typical materials used in this manufacturing technique are OPP, polyester, PVC, polyethylene, and the like. Temperatures of the extruded plastic are typically between about 400 and 700° F.

Another technique for creating a lens array is to form the lenticules during the flexographic or letterpress printing of the labels or wraps. In this embodiment, a heated embossing station is added to the press assembly so that the label material is heated to over about 300° F. and then, embossed with an engraved or etched embossing plate or roller between two cylinders, typically at higher pressures. The heat may be applied to the label material or to the roller (or both) during this process. In some cases, it is advantageous to heat the material prior to the embossing stations and then, use the embossing station to cool the label material to a reduced temperature while embossing using a chilled roller (as is done in extrusion). In one version of this technique, the press is used as just the embosser with printing being performed in a separate process.

In another label manufacturing process, embossing of the lens array or lenticules of the lens system is performed using a flat letterpress embossing die. The die is applied typically while running the label material between a cylinder and the embossing die. The cylinder or roller typically moves back and forth over the length of the stationary die (and, at least temporarily, stationary label material) and the embossed material is then advanced, thereby positioning another portion of the non-embossed label material to the die. In one particular embodiment, a Heidelberg cylinder letterpress is used to form the label including the lens array. In other embodiments, the lens structures are formed in the label material with other techniques such as with UV beams, E beam liquid, and the like using flexo plates that are either mechanically engraved or engraved through exposure. Of course, the embossed label material or material with the formed lens arrays may then be rewound before or after printing of the printed images (e.g., to provide a roll to roll embossing operation).

FIGS. 23-27 illustrate embodiments of the invention that can be formed in plastic containers or, more typically, in glass containers. Each of these embodiments involves the use of a lenticular lens insert or array that is inserted into a recessed surface or indentation on the container, such as on a container wall. Hence, in the embodiments of FIGS. 23-27, the containers are blown or otherwise formed to include a recessed surface or indentation for receiving a lens insert that becomes a substantially integral part of the container wall and focuses a viewer's line of sight upon a focal point on or near the container wall that coincides with the placement of a printed image. The lens insert in these embodiments often will be substantially flat or planar, which simplifies manufacture and achieving a desired visual effect, but in some cases, has a curvature to match the surrounding container wall.

Figures 23, 24:
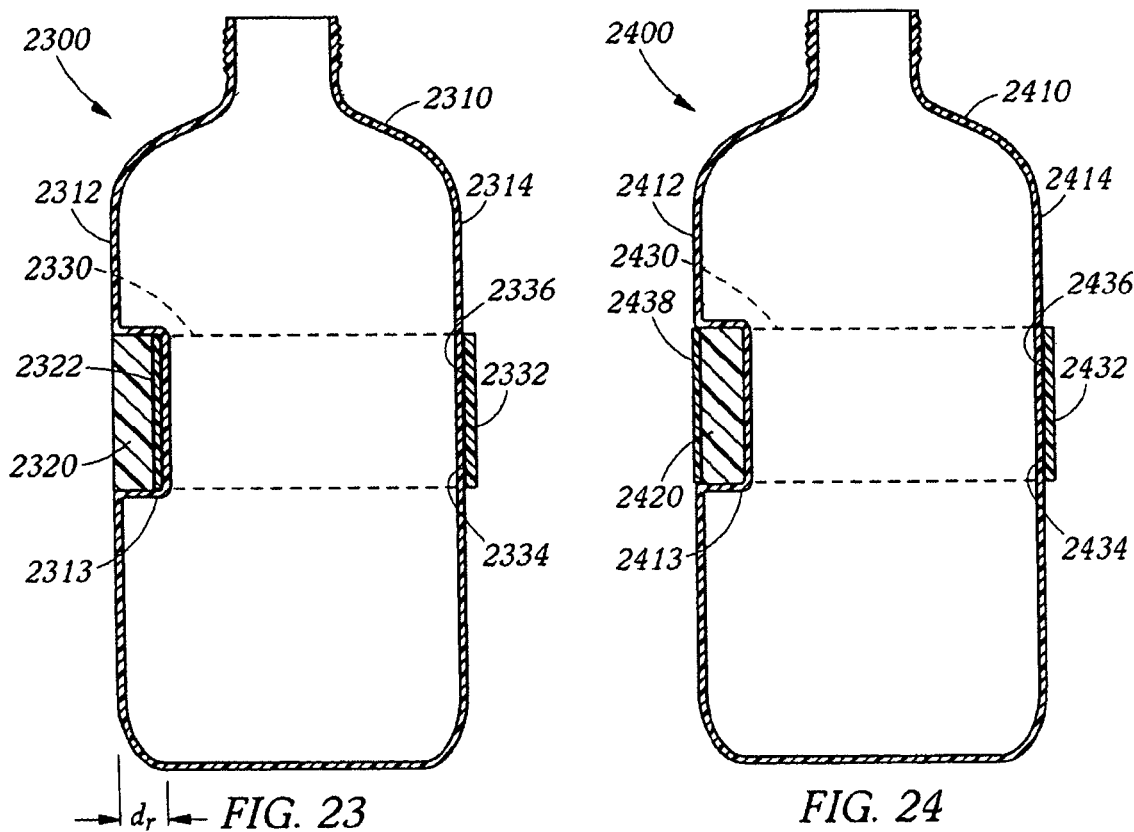
FIG. 23 is a sectional view of another container according to the present invention showing a lenticular structure or system including a wrap around label positioned within a recessed surface or indentation in a side of the container and a lenticular lens element inserted into the indentation to cover the label and so as to focus the lens through the container walls.
FIG. 24 is a sectional view similar to FIG. 23 illustrating another embodiment in which the lenticular lens element is positioned prior to applying the wrap around label such that the lenticules are covered by the clear label.

In FIG. 23, a container 2300 is shown with a container wall 2310 defining an interior void for containing a liquid or similar material. The container wall 2310 includes a first or front portion 2312 and a second or rear portion 2314. The front portion 2312 includes a recessed surface or indentation 2313 with a depth, $d_r$. The shape of the indentation 2313 and the depth, $d_r$, are selected for receiving a label 2330 that is wrapped around the container wall 2310. The indentation 2313 further receives and positions (relative to the container wall 2310 and label 2330) a lens array or insert 2320, which comprises a plurality of lenticules on a first side and a flat surface or web layer on a second side. The lens insert 2320 is either snapped or mechanically affixed onto the front container wall or portion 2312 to be held in place or is attached (as shown) with a layer of adhesive 2322 that bonds to the label 2330 (and, typically, a portion of the wall 2310 or indentation 2313 adjacent the label). The adhesive layer 2322 is selected to be substantially clear or transparent and to be chemically compatible with the material of the label 2330.

The lenticules of the lens insert 2320 are positioned distal to the label 2330 and container portion 2312. In preferred embodiments, the thickness of the insert 2320, adhesive layer 2322, and label 2330 are selected to be equal to or to be about the depth, $d_r$, of the indentation 2313 such that the lenticules of the insert 2320 and the exterior surface of the front portion 2312 of container wall 2310 form a substantially integral surface. For example, the lens insert may have a thickness of about ⅛ inch with the other two layers being about 1 mil to about 20 mils or more combined. In other embodiments, however, the insert 2320 may extend outward or inward from the adjacent portions of the front container wall 2312. The label 2330 may be configured similar to the labels in FIGS. 16-22. The label 2330 includes an exterior surface 2332 distal to the container wall 2310 and an interior surface 2334 adjacent and abutting the container wall 2310. On the inner or interior surface 2334, a data area and/or printed image 2336 is provided at a location on the label 2330 such that when the label 2330 is applied to the container wall 2310 the printed image 2336 is at a portion of the container 2314 that is substantially opposite the position of a central portion of the lens array 2320 (or indentation 2313 which typically coincide) on the front portion or wall 2312 of the container 2300.

When assembled, the lens structure or system is made up of the lens insert or array 2320, the adhesive 2322 (if included), the thickness of the wall 2310 at the indentation 2313, any contents of the container 2310, and the thickness of the rear or second wall portion 2314 adjacent the printed image, and hence, the lenticules on the insert 2320 are configured to take into account the various thicknesses and materials of these elements and possible distortions (such as due to curvature of the container 2300) in achieving a focal point at or near the printed image 2336.

FIG. 24 shows a container 2400 similar to that of container 2300, but in this case, the container 2400 positions a lens insert between the label and the container wall. As shown, the container 2400 includes a container wall 2410 having a front wall or portion 2412 with an indentation or recessed surface 2413 and a rear wall or portion 2414 distal to the front portion (or opposite the front portion 2412 on the container wall 2410). A lenticular lens array or insert 2420 is included in the container 2400 and snapped into or positioned within the indentation 2413, where it is preferably interference fit for mechanical support and retention (although an adhesive may be utilized (not shown)) and where the mechanical retention is furthered by the application of the label 2430 which wraps around the container wall 2410 so as to at least partially cover the lens insert 2420. As with the embodiments shown in FIG. 1 and the like, the insert 2420 essentially becomes an integral portion of the container wall 2410 and the clear label 2430 covers and abuts the lenticules on the insert 2420 without significantly interfering with or degrading the visual effects achieved by the created lens structure.

As with container 2300, the label 2430 comprises an exterior side 2432 distal to the container wall 2410 and an interior side surface 2434 that abuts and is proximal to the container wall 2410. For example, the interior surface 2434 contacts and retains the insert 2420 within the indentation 2420, thus reducing the need for an adhesive to keep the insert 2430 within the indentation 2413. The label 2430 further includes a printed image (or data area) 2436 on the interior serface 2434 that is printed on the label 2430 at a location such when the label is applied to the container wall 2410 the printed image 2436 is opposite a central portion of the positioned insert 2420 (or indentation 2413). In manufacturing the container 2400, the lenticules of the lens insert 2420 are designed based on any distortion caused by the portion 2438 of the label 2430 contacting and covering the insert 2420, the thickness and material of the insert 2420, the use, if any, of an adhesive, the thickness, material, and distortion of the container wall 2410 at the indentation 2413 and the rear portion or wall 2414 adjacent or proximal the printed image 2436 and any effects of an empty container or a container filled with a liquid or other content.

In another embodiment not shown, a container is provided similar to that of container 2400 except the label 2430 is omitted. Instead, a printed image is printed or otherwise provided at the rear wall of the container opposite the lens insert, such as by printing on the inside or outside of the container wall or with a decal affixed to the exterior surface of the container wall. In this embodiment, a tighter fit would be required since the label would not be used to retain the lens insert or alternatively, the lens insert would be held within the indentation by an adhesive.

Figure 25:
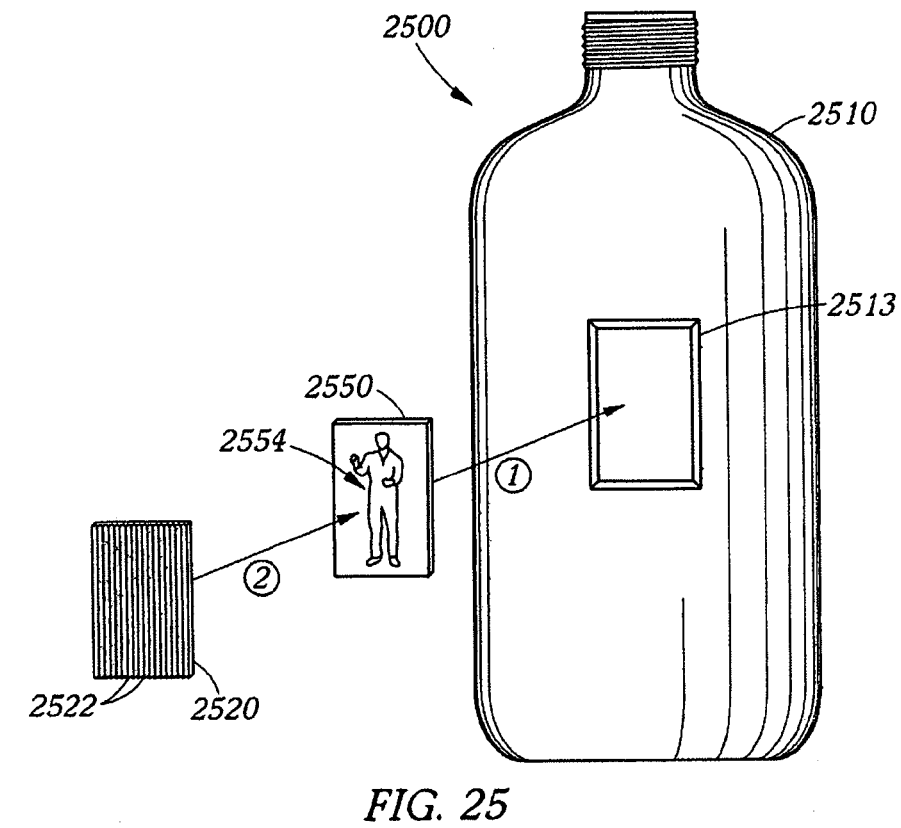
FIG. 25 illustrates another embodiment of a container in which a label is inserted into an indentation or recessed portion of the container wall with a lenticular lens element positioned over the label.

FIG. 25 shows a front view of another embodiment of a container 2500 similar to that of containers 2300 and 2400. In this embodiment, the container has a wall 2510 with an indentation 2513. A label or decal 2550 is created with a printed image 2554, and the label 2550 is affixed within the indentation 2513 to abut the wall 2510 (or is affixed to the flat side of the lens insert 2520 or is left "loose" but held in place by the insert 2520). The container 2500 includes a lenticular lens insert or array 2520 that includes a first or outer surface with a plurality of lenticules 2522. The insert 2520 is placed in the indentation 2513 of the wall 2510 to cover the label 2550, and the insert is held in place mechanically such as with a press fit or by other physical means and/or is affixed with adhesive on the flat side abutting the label 2550 or with adhesive on the sides abutting the sides of the indentation 2513 (i.e., side wall extending outward from the interior portion of the container 2500). In this embodiment 2500, the lens system includes only the insert and the lenticules 2522 are configured to focus on the label 2550 or image 2554 taking into account the material of the insert 2520, any curvature of the insert 2520, and the thickness of the insert 2520 (i.e., typically about that of the depth of the indentation 2513).

Figure 26:
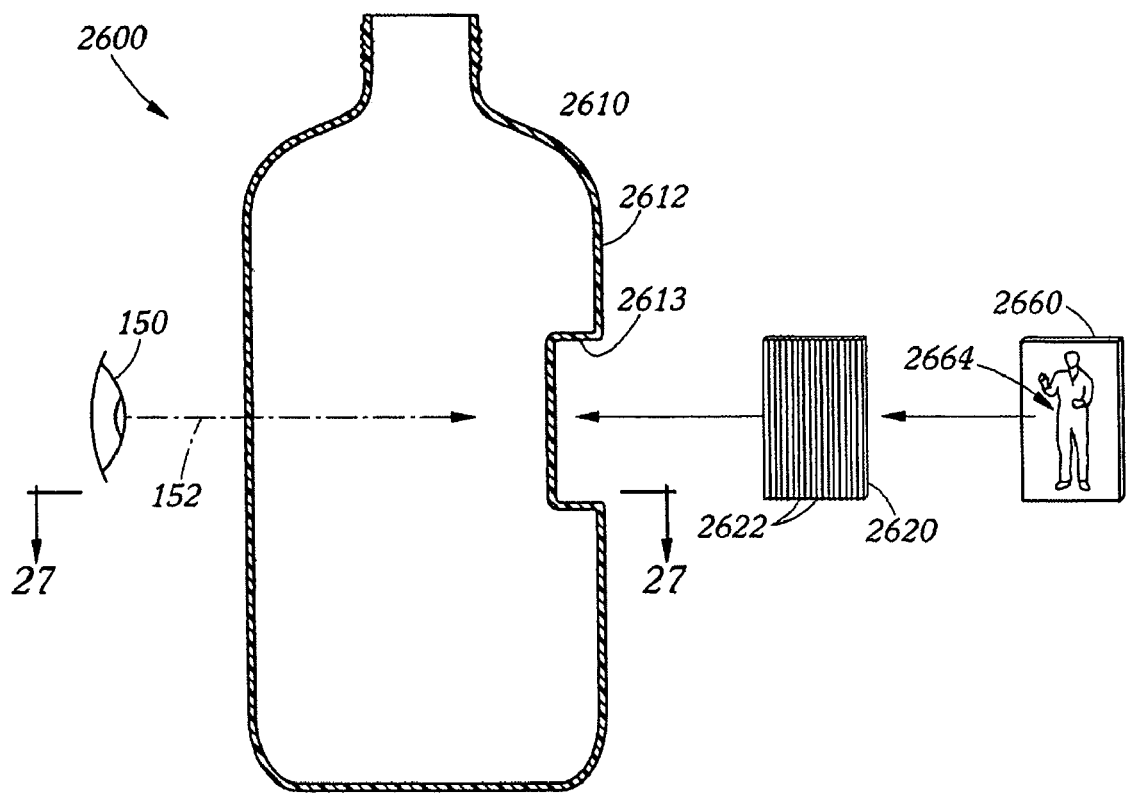
FIG. 26 illustrates a sectional view of yet another embodiment of a container according to the invention which includes a recessed portion in which a lenticular lens element is inserted with a lenticular lens array abutting the container exterior surface and in which a label with a printed image is positioned over the lenticular lens element.
Figure 27:
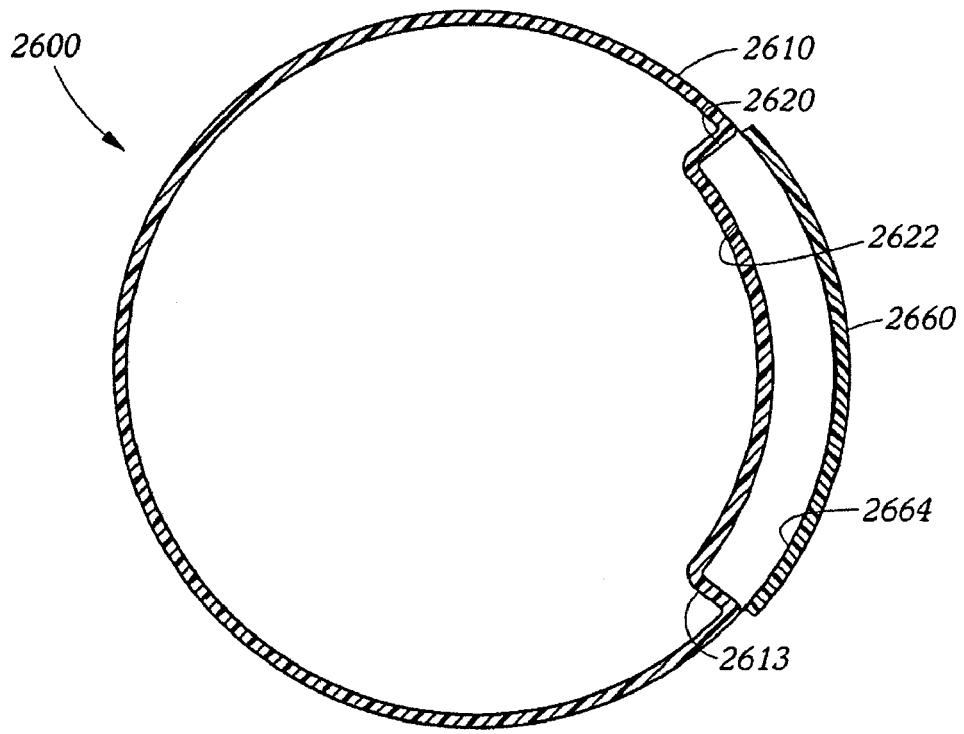
FIG. 27 is a sectional view of the container of FIG. 26.

FIGS. 26 and 27 illustrate yet another embodiment of a container 2600 according to the invention. With container 2600, a container wall 2620 is provided with a rear portion 2612 that is typically held distal to a viewer 150 that views images created by the lens system or structure of the container 2600 by viewing along a sight line 152 through the container wall 2610 to the rear portion 2612. The wall 2610 includes an indentation 2613 for receiving a lenticular lens insert 2620 over which a label 2660 is placed to put a printed image 2664 in abutting contact with a flat or web portion of insert 2620. As shown in FIG. 27, the lens insert 2620 comprises a plurality of lenticules 2622 that when positioned within the container 2600 abut or are adjacent to the container wall 2610 within the indentation 2613, i.e., the lenticules are proximal to the container wall 2610 in this embodiment.

The decal or label 2660 is positioned over the lenticular insert 2620 to position the printed image adjacent the insert 2620 (although in some embodiments the image 2664 is provided on the side of the label 2660 distal to the insert 2620. The label is typically glued to the insert 2620 but in some embodiments, the label is affixed with an adhesive that borders the image 2664 and the label 2660 is larger in size than the insert 2620 such that the adhesive (not shown) bonds with the container wall 2610 and only partially or not at all with the insert 2620. In this fashion, the label 2660 can be used to physically retain the insert 2620 within the insert 2613, and again the insert 2620 is selected to have a thickness approximately equal to the depth of the indentation 2613 such that its exterior surface (i.e., the surface distal to the container wall 2610) is flush with the rear wall or portion 2612. In this embodiment, the lens system includes the container walls 2610 (front and back) as well as the lens insert 2620 and any contents of the container 2600. Hence, the lenticules 2622 are preferably selected or formed to take into account distortions caused by the front wall of the container and its thicknesses and materials as well as the thickness and material of the indentation 2613 and liquid contents of the container 2600 to focus the lens system on the printed image 2664 on the label 2660. Further, any curvature of the insert 2620 itself should be taken into account when selecting and fabricating the lenticules 2622 on the insert 2620. While shown as having a size proximate to the insert 2620, the label 2660 may also be larger and even take the form of a wrap around label such as label 1630.

The lenticular lens or optical systems of the invention may be incorporated in nearly any container having one or more clear or translucent walls such as containers having substantially rectangular cross-sections or frustoconical shapes and is not limited to bottles, which were provided as exemplary and useful embodiments in the figures. Further, the design process for selecting the lenticule frequency based on the container wall thickness and other factors is not a required feature of the invention and the lenticular lens systems of the invention may be engineered and design parameters selected using other techniques including experience and knowledge combined with empirical data including trial and error methods involving fabricating sets of prototypes to determine a desired mix of the lenticular lens array design characteristics for a particular container, container wall material, and even for particular liquids. Further, the lenticular lens inserts and arrays were typically shown to be rectangular or square. It will be readily appreciated that such inserts and arrays (and the indentations that receive such inserts) may take many shapes and forms, such as circular, triangular, hexagonal, and the like, including irregular shapes.

Figure 28:
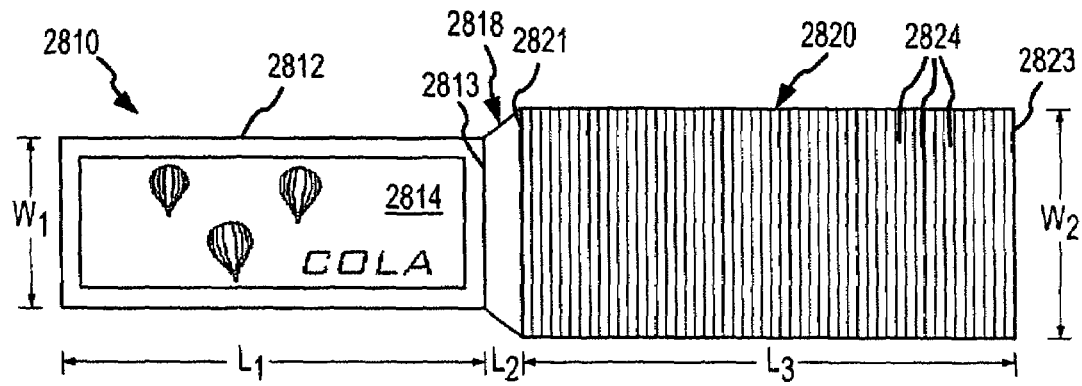
FIG. 28 is a plan view of a wraparound label illustrating a "T" shaped body with an image portion or element and a lenticular lens portion or element.
Figure 29:
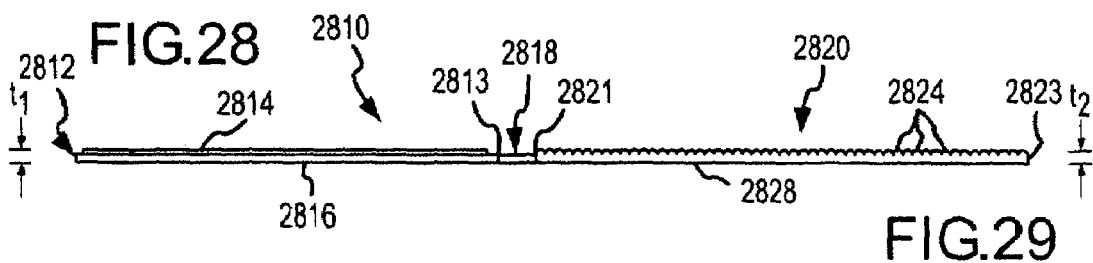
FIG. 29 is a side view of the label of FIG. 28 showing the interlaced image on a surface of the image portion and the plurality of lenticules or lenses on a surface of the lens portion;.
Figure 31:
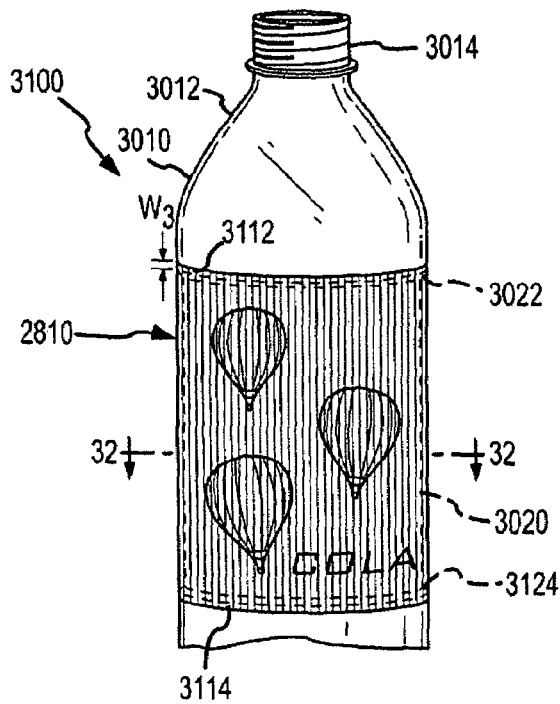
FIG. 31 illustrates a packaging system of the present invention including the container of FIG. 30 upon which the two-part, wraparound label of FIG. 28 has been attached (such as by adhesive) with the image portion contacting the recessed, registration surface and the lens portion enclosing the recessed surface and image portion by contacting surfaces of the wall 3010 adjacent or proximate the recessed surface.
Figure 32:
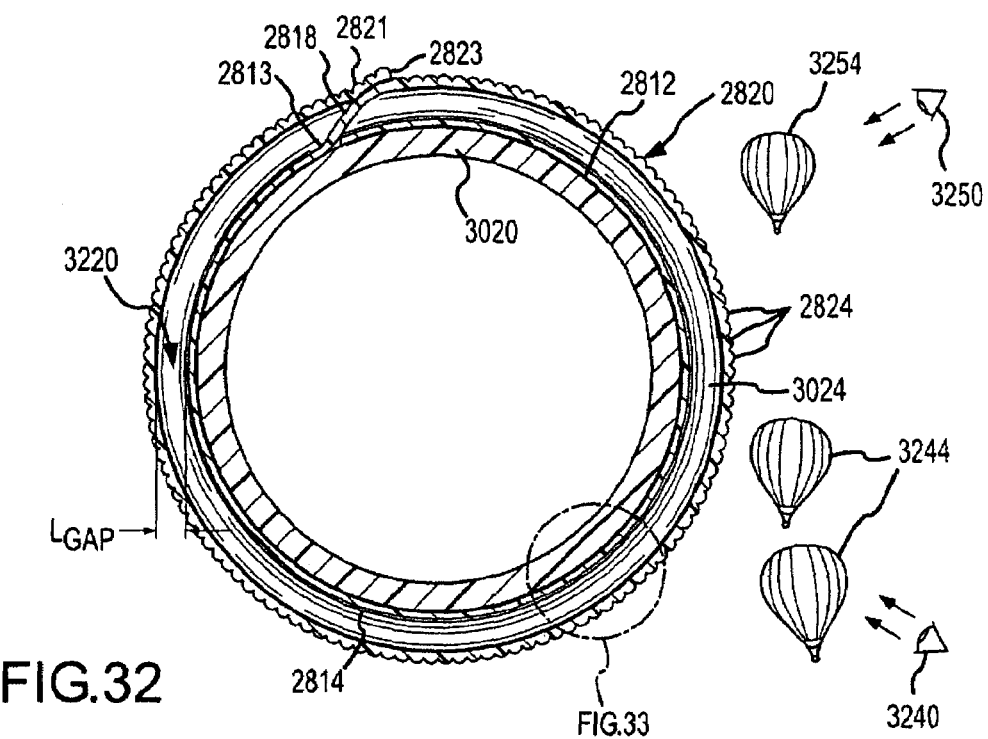
FIG. 32 is a cross section taken at line 32-32 of the packaging system of FIG. 31 illustrating in more detail the "double wrap" configuration in which the lens portion of the label acts as a sleeve for the container or bottle and a focusing or spatial gap (e.g., air gap) is formed between the printed image and the lenticules or lenses such that this gap matches or substantially matches the focal length of the lenses or lenticules.
Figure 33:
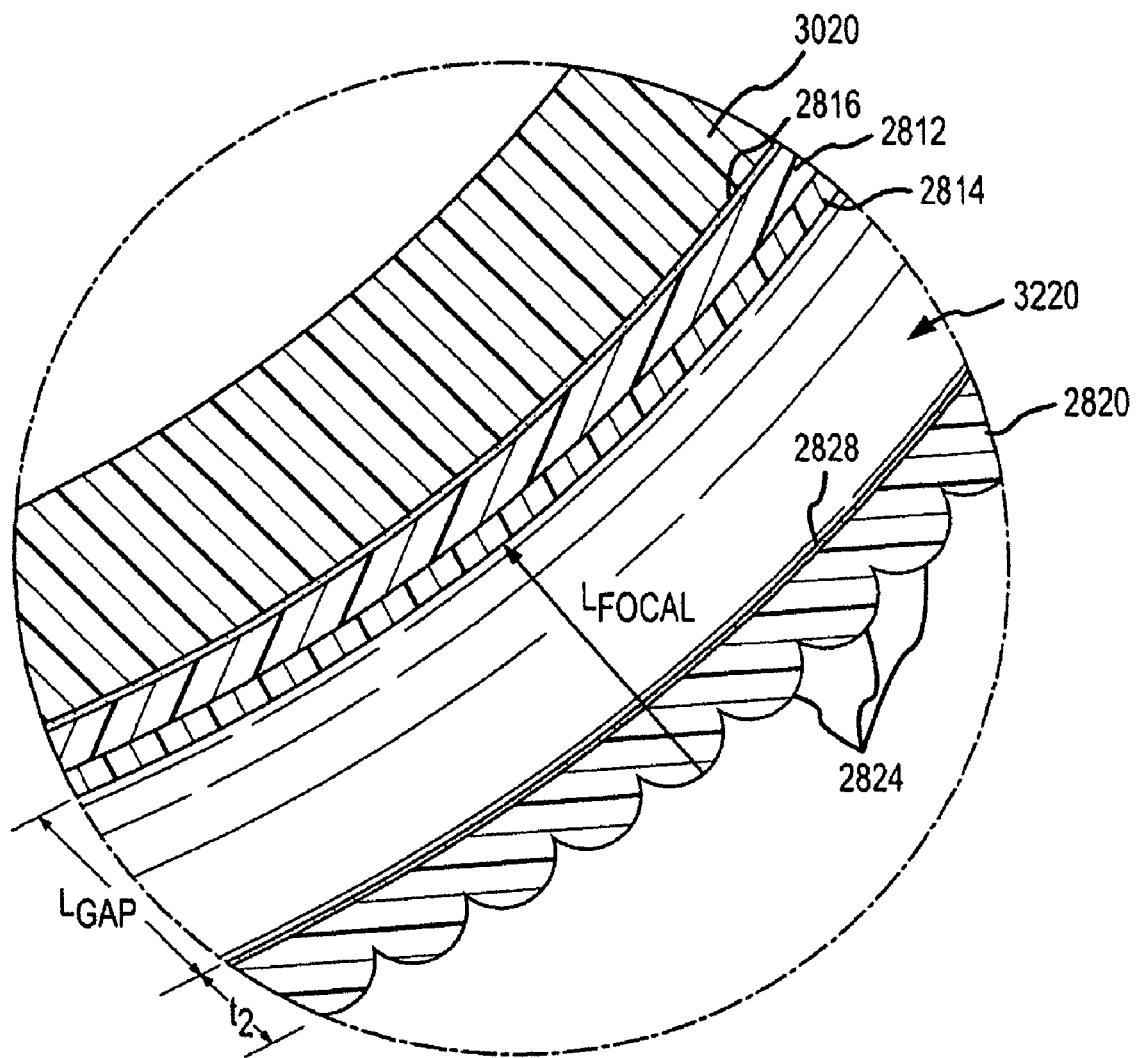
FIG. 33 is an enlarged view of a section of the cross sectional view of FIG. 32 showing in more detail the relative positioning of the image layer and image element body, the container wall, the lenticular lens element with its lenticules or lenses, and the air or spatial gap that is created or provide according to embodiments of the invention.

FIGS. 28 and 29 illustrate a wraparound label 2810 formed for use in some embodiments of a packaging system (e.g., system 4000 shown in FIGS. 31-33). The label 2810 can be considered a two-part body (e.g., a T-shaped body) formed with an image element or portion 2812 connected by a neck 2818 to a lenticular lens element or portion 2820. The label 2810 may be formed from a single piece of material such as a plastic sheet or may be formed from two sheets that may be attached (such as by adhesive) at the neck 2818, which may be useful to allow the elements 2812 and 2820 to made of differing materials or in different processes for later combination to form label 2810. The image element 2812 has an interlaced image (or printed image) 2814 provided on a one surface while a second opposite surface 2816 is used for mating with a container and, particularly, with a recessed, registration surface. The image 2814 is preferably configured to support the particular lens element 2820 and the density or coarseness (or LPI) of lenses 2824 provided on that element 2820. Further, the image 2814 mathematics will be selected based on the size of the air or focusing gap created in the packaging system (e.g., based on the gap length), with examples of specific embodiments and corresponding printing mathematics and/or algorithms provided with that discussion.

In some cases, the image element 2812 is formed of paper materials as is the case with many existing container wraparound labels or is formed of other materials such as plastic. The image element is mated or attached to the next at an end 2813 and has a thickness, $t_1$, that is typically very small such as less than 3 mils (but thicker elements 2812 may be used in some cases). The element 2812 has a width, $W_1$, that is typically selected to correspond with a width of a recessed, registration surface or shelf in the side of a container. In this manner, the positioning of the image element 2812 and its image 2814 can be consistently known and aligned or registered with the lens element 2820 and its lenticules 2824 (i.e., the lenticules of the element 2820 can each be aligned or registered with image slices or portions in the image 2814 when the label 2810 is applied or wrapped onto a container). The image element 2812 has a length, $L_1$, that typically is selected to be equal to or less than the peripheral dimension (e.g., circumference of $2\pi r$ for a cylindrical container, with r being the radius of the container at the recessed surface of the side wall), with one preferred embodiment having the element 2812 wrapping about container at the recessed surface one complete time. In this embodiment, the image 2814 may have a length that substantially matches the length of the element, $L_1$, to provide a 360 degree viewable image (e.g., when the lenses 2824 or lens array is provided about the entire circumference of the container, too) or the length of the image 2814 may be less than the entire element 2812 (or the image 2814 may not be continuous to provide images viewable in select portions of the container with lenses 2824 being provided in a similar fashion or continuous even when the image 2814 is discontinuous). In another embodiment, the element 2812 only wraps about a portion of the container circumference such as half, third, fourth, or the like to create an image viewable from a portion of the container and to reduce the cost and material for the label 2810.

The wraparound label 2810 includes a neck or connection element 2818 with for connecting the image element 2812 to the lens element 2820. The neck 2818 may expand outward from the width of the image element 2812 as shown to the width, $W_2$, of the lens element 2820, or it may have the width of either element 2812, 2820 or a width between the two. The neck 2818 may also be an integral part of either element 2812, 2820 (or of both in embodiments where the elements 2812, 2818, and 2820 are formed from a single sheet of material) or a separate unit, and either or both of the elements 2812, 2820 may attached such as with adhesive to the element 2818. The neck 2818 has a length, L2, that is generally selected to allow the neck to extend across a focus gap and often at a 45 degree or other angle formed as the label 2810 is rolled or wrapped onto the exterior surfaces of a container (e.g., see FIG. 32 and the extension of neck 2818 across air gap 3220). The neck 2818 is attached or mates with lens element 2820 at end or side 2821 of element 2820, and this end 2821 is typically the initial part of lens element 2820 and label 2810 to contact and/or be affixed to the container wall outside the recessed, registration surface.

The label 2810 also includes the lens element 2820 with its width, $W_2$, being selected to be wider than the image element (e.g., $W_2$ is greater than $W_1$) such that the lens element 2820 extends across the width of recessed surface in the container and can be mounted (such as with adhesive) to the container wall. In a typical embodiment, the lens width, $W_2$, may be 0.25 to 1 inches wider (although other widths may be utilized) such that the lens element 2820 can easily be attached with adhesive (or heat shrinking in some cases) and create an enclosure or sleeve about the recessed surface and the image element 2812. In this way, a focusing gap that is typically filled with air (e.g., an "air gap") is formed in a packaging system using the label 2810. The length, $L_3$, of the lens element 2820 (as measured from end 2821 to end or side 2823) may be equal or slightly larger than the circumference or peripheral dimensions of the container for the container side wall outside the recessed surface but typically adjacent or proximate to the surface.

The element 2820 has a thickness, $t_2$, that is typically relatively thin and corresponds to more typical wraparound plastic labels, e.g., less than about 3 mils and preferably between about 1.3 and 2 mils, but thicker labels may be used to practice the invention such as thicknesses less than about 10 mils with cost and rigidity of the material being a likely limiting factor. Greater thicknesses may be desirable for creating certain graphical effects but in many cases it is more desirable to use standard clear plastic wrap sheets and its accepted thicknesses to allow the element 2820 to be formed and applied using well known equipment, such as that used to apply roll labels. The image element 2812 has a thickness, $t_1$, that is typically less than or equal to that of the lens element (e.g., $t_1$ is less than or equal to $t_2$) to control costs and increase the size of the created air gap (but, again, in some cases, $t_2$ may be less than $t_1$).

An array of lenticules 2824 is formed on a first surface of the lens element 2820. The lenticules 2824 may extend "vertically" (e.g., transverse to a longitudinal axis of the label 2810) or "horizontally" (e.g., parallel to a longitudinal axis of the label) depending on whether 3D effects are desired or whether color and animation are adequate, respectively. The lenticules 2824 are formed integral with the body of the label 2810 in element 2820, typically in the same molding or other fabrication process and of the same material. The lenticules 2824 are configured with numerous lenticules or lenses formed by ridges or ribs that extend parallel to each other. The lenticules of the lens array 2820 are configured in frequency (lenticules per inch (LPI)) and shape (such as width and radius) based on the material and thickness of the element 2820, based on size or length of the created air gap (e.g., based on the refractive index of air), and the curvature of the container wall to focus on accurately on particular data element or slices of images in the interlaced image when the image 2814 is positioned on a recessed surface of a container but spaced apart by the air gap from the lens element 2820.

For example, the lenses 2824 may be provided with a coarseness or frequency of 10 to 70 or more LPI and more preferably in the range of 15 to 35, with a 20 LPI frequency being used in some preferred embodiments. The space or distance provided by the air gap and the refractive index of air allows a coarser configuration for lens array 2824 to be used while still providing a large quantity of data in the printed image 2814. The array of lenticules 2824 can have a wide variety of dimensions (such as a height and "width") selected based on the size of the container and its recessed surface and the size of the printed image 2814 and shapes (such as a square, a rectangular, a triangle, a circle, an oval, or any other useful shape for viewing the image 2814). The fabrication of standard lenticular material sheets is well known by those skilled in the printing arts and such knowledge may be utilized at least in part in designing the molding or arrangement of the lenticular lenses on the wraparound label 2810 in lens element 2820. For example, lenticular material fabrication is described in U.S. Pat. No. 5,967,032 to Bravenec et al. and U.S. Pat. No. 5,753,344 to Jacobsen, which are incorporated herein by reference.

Typically, the label 2810 and, particularly, the lens element 2820, are fabricated from a very thin sheet of clear plastic to minimize distortion through the lenticules 2824. The lenticules 2824 make up a lenticular lens array and include a plurality of optical ridges or lenses (which may extend vertically as shown or horizontally on the element 2820) and a transparent lens layer or web that provides a relatively smooth, contact surface 2828 for contacting the container exterior surfaces in this embodiment and for facing inward into an air space or gap. Fabrication of such lens arrays may be performed by well known techniques and preferably is performed to account for the shape of the container and the forming of lenticules on a flat surface that will later be mounted on a curved surface (e.g., including using the mathematical algorithms discussed later in this description). For example, the techniques used to produce the label 2820 may include beginning with a sheet or portion of a sheet of clear label wrap or material for wrapping on a container (such as that used presently with water or beverage bottles). The wrap is processed by printing the image 2814 on image element 2812 and embossing the lenses 2824 on lens element 2820 in line or in separate processes. In some cases, a printing press is used to print with flexography inks the image 2814 and is also used to emboss the top of the lens element 2820 to form the lenticules/lenses 2824 using a heated or unheated pressure roller. A lens embossing station may alternatively be provided down (or up) line from the printing press with dies selected to form the lenses 2824 in element 2820, which typically would be formed of plastic (such as polypropylene or the like). The lenses 2824 may also be embossed or spot embossed or extruded prior to the printing of the image 2814 and/or attaching of image element 2812. The lenses 2824 (or an array of such lenticules/lenses) may extend to the edges of the element 2820 or may a frame without such lenses 2824 may be provided (such as to the sections attached to attachment portions 3112, 3114 of sidewall 3010 as discussed below) or the lenses 2824 may be provided only in sections (or discontinuously) on element 2820 to be paired with images provide in a similar manner in image 2814.

There are a number of processes that may be used to form labels, such as label 2810, to practice the present invention. The following describes one exemplary fabrication technique for a two piece label (e.g., in which the lens and image elements are joined), which those skilled in the art may be modified without deviating from the breadth of the description, and particularly the specific materials and dimensions are provided as examples only and not as limitations. In one embodiment, the process begins with selecting or providing a clear film with a thickness of 50-gauge to 2-mil and a material of cast propylene, OPP, polyester, PETG, or other useful material. The film is printed with one or more interlaced images on either side (e.g., its front or back/reverse surface), e.g., a number of images may be printed to use the sheet for forming a like number of wrap around labels. The film is then laminated with another clear film of identical thickness, smaller thickness, or greater thickness, which is used for forming the lens element. For example, the base or image element film may be 70 gauge (i.e., 0.70 mils) and the secondary or lens element film is also 70 gauge. An "adhesive" layer or connector element between the two films may be a low density extruded polyethylene that is sandwiched between the two films to connect them. Though it is typically preferred for processing efficiencies and waste minimization to print the single layer of based films prior to laminating, the printing may be performed after the lamination or connection step to the two piece label. After the printed film is laminated to the extruded poly material in a thickness of 0.5 mils to several mils thick (with some embodiments using thickness of up to or over 10 mils but, more typically 2 to 3 mils or less is used), the total construction thickness of the film is about 3 to 4 mils thick.

The combined sheets or material is then taken to a process in which the center between each label (e.g., usually the labels are printed at about 3 inches wide in forming labels for bottles or similar containers) in a roll that may be, for example, 50 to 60 inches wide (e.g., with about 20 labels across its width) is cut out and "stripped" or rolled up to be thrown out accommodating the die cut for the "T" shape (e.g., see, FIG. 1). During the same process, an "emboss" that is the lenses (or lens array) for the lenticular or lens element of the label is embossed in the film on the secondary or lens element portion of the film. This embossing is performed so as to register the second layer or overlap that becomes the lens when the label is installed to the printed image (see, for example FIGS. 28-32). Generally, this emboss is done in "spot" style and not in the whole label. The embossed lens can be performed in at least three ways: a cold emboss, a heat emboss, and a pre-heat emboss (which is preferred in some cases) followed by a chill roller in which the pattern of the lenses is embossed into the film and "chilled" into place. In these embossing processes, it is important to note that the "lenses" that are formed into the film preferably corresponds mathematically to the interlaced graphic already printed on the label substrate or film. This array of lenses also should be aligned and preferably perfectly aligned to the printed image and be engineered for the circumference (or lack thereof for flat surfaces) of the container wall, as is explained in more detail below.

With the labels formed, the packaging process continues generally with each container to be packaged being first wrapped into a recessed surface in an automated process with the graphic or image element portion of the label. The wrapping continues with the application of the lens portion of the label that goes onto the container adjacent to the recessed surface in a secondary wrap (with the whole wrap being one piece in this example, although this is not necessary to practice the invention) to form a spatial or focusing gap between the two label portions. The lens portion of the label is lined up and aligned with the graphics or printed image, and in some cases, this allows 3D and animation effects to be maintained and effectively provided with an spatial gap. Correct mathematical pitch of the lenses and the interlace image is maintained to assure animation continues to work properly, and the lenses and image are also configured or set for the particular viewing distance of the packaged container or object.

More specifically, the wrapping process may include a container being placed onto a machine and then being wrapped twice in a "tack and wrap" system. In this system, the first and often thinner image portion of the label is wrapped around the container into recessed surface or space engineered for or provided for the narrower portion of the label (e.g., see FIG. 28). The second layer or lens element of the label is wrapped or completed on the second revolution of the container, which takes the wider portion of the label and places it onto a registration shoulder or greater diameter portion of the container adjacent the recessed surface. This double wrapping creates an air gap of known depth or length between the graphic or printed image/container and the lenses that preferably corresponds with the focal length of the lenses to enable the lenses to accurately focus on the interlaced graphic. The focal length is determined by calculating the refractive indexes of the lens element portion of the label and air and the corresponding thickness of the lens element portion of the label and length of the gap, and then combining them. One idea or theory behind this wrapping technique is to create a focal length that is more forgiving for courser lens arrays, e.g., lower LPI, to increase the ease of printing, to provide greater data space in the image, and generate enhanced graphic effects.

Figure 30:
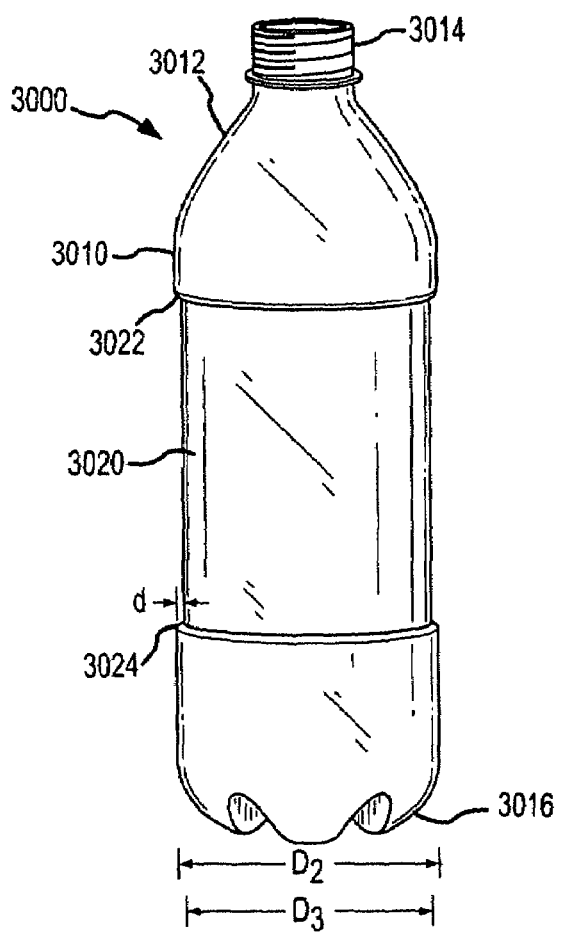
FIG. 30 is side view of a container (e.g., a bottle) with a recessed, registration surface in its side wall.

FIG. 30 illustrates a container 3000 upon which the label 2810 may be applied in a packaging system (e.g., packaged container or packaging system 3100 of FIGS. 31 and 32). The use of a spatial gap to provide a focusing length that includes focusing through air, other gases, or liquid is useful with a variety of container shapes and wall materials (e.g., not limited to plastic or glass but is also useful with metal, cardboard, and other materials used for packaging of goods). Hence, the container 3000 is not meant as a limiting embodiment but, instead, is an exemplary embodiment for the general concepts of the invention.

As shown, the container 3000, which may be thought of as a plastic or glass beverage or other product bottle, jar, or the like, includes a side wall 3010 that defines its generally cylindrical shape. As shown, the container 3000 is provided with a relatively standard shape utilized for typical plastic bottles used for distributing water or other beverages, and in other cases, the container 3000 is preferably modified to include such a recessed surface 3020. As such the container 3000 includes a clear or translucent or opaque container wall 3010 having a substantially cylindrical shape for containing liquid. The container wall 3010 is typically formed of glass or more typically of a plastic such as polyvinyl chloride (PVC), polypropylene, polyethylene, polyester (such as PET, APET, PETG, and the like) or other plastic used by the packaging or container industry. The container 3000 may be formed by blow molding, injection molding, or any other technique useful for producing containers and adapted (as necessary) for the glass or plastic material used to fabricate the container 3000.

The sidewall 3010 abuts a shoulder 3012 that is connected to opening or neck 3014, and the exterior further includes a bottom or bottom wall 3016 enclosing the container 3000. Significant to the present invention, the side wall 3010 includes a recessed, registration surface 3020 extending about the circumference or periphery of the container 3000. The recessed surface 3020 has a diameter, $D_2$, that is less than the diameter, $D_1$, of the adjacent portions of the container 3000 as defined by the side wall 3010 (i.e., the diameter, $D_1$, of the container at the recessed surface 3020 is reduced by two times the depth, d, of the recessed surface 3020 relative to the side wall 3010). The depth, d, is established by upper and lower shoulders or shelves 3022, 3024, which are shown to be the same size in this embodiment but in some cases there will be a first and second depth associated with the shelves 3022, 3024 (e.g., the container 3000 may be smaller towards its neck 3014 than near the bottom wall 3016) and such cases are within the breadth of this invention. The depth, d, is significant to the invention as it defines (along with the thickness of the image element 2812) the size or length of a focusing or air gap that is created when the label 2810 is applied to the container 3000.

The recessed, registration surface 3020 has a width, $W_3$, as measured between the shelves 3022, 3024. It is useful for the image element 2812 and its image 2814 to be in a known or registered portion of the container 3000 to facilitate registration of the lenses 2824 with the image 2814. To this end, the width, $W_3$, is preferably about the width, $W_1$, of the image element 2812 such that the edges of the image element abut the shelves 3022, 3024. In other embodiments, though, the image element 2812 is thinner than the recessed surface 3020 and registration is controlled by application processes used to apply the label 2810 to the container 3000. As discussed above, the width, $W_2$, of the lens element 2820 is greater than the width, $W_3$, of the recessed, registration surface 3020 such that when the label 2810 is applied the lens element 2820 is positioned so as to span over the surface 3020 and contact at least a portion of the sidewall 3010 on each side of the surface 3020 (e.g., side wall 3010 adjacent or proximate to shelves 3022, 3024), whereby the focusing or air gap is formed.

FIG. 31 illustrates a packaged container or packaging system 3100 according to one embodiment of the invention. The system 3100 includes the container 3000 with the label 2810 attached to the outer surfaces of the side wall 3010. As shown, a graphical image is visible from the exterior of the container, and, as will be explained, the label 2810 is applied such that the focal point of the lenses 2824 is on or proximate (e.g., accounting for the thickness, $t_1$, of the image element 2812) to the recessed surface 3020 so as to focus on the image 2814. In other words, the focal length of each lens 2824 is selected to be through the lens element 2820 (e.g., its thickness and accounting for its material and refractive index) and through the air in the focusing gap created between the web or back surface 2828 of the lens element 2820 and the image 2814 on the image element 2812 of the label 2810.

With reference also to FIG. 32, the label 2810 is typically applied to the container side wall 3010 using standard application practices such as heat shrinking and more preferably rolling processes with adhesives (e.g., hot glue). It will be understood that the cross sectional view of FIG. 32 and in other figures (such as FIG. 34) is not to scale with the bottle or container 3000 shown smaller relative to the thicknesses of the wraparound label 2810 and the achieved air gap such that the various very thin layers can be visualized with their relation to each other being shown.

The application process may be thought of as a single process or single roll that involves a "double wrap." Specifically, in one embodiment, a first end of the image element 2812 is applied to a starting or initiation point on the recessed surface 3020 between the registration shelves 3022, 3024, such as with adhesive (not shown) applied to the contact surface 2816 which is placed in contact with the surface 3020. Rolling of the label 2810 onto the container 3000 thus begins with application of the image element 2812 with the image 2814 facing outward from the container side wall 3010. In the illustrated embodiment, the image 2814 is printed or applied onto the same side of the label 2810 as the lenses 2824, but, in some embodiments, the image 2814 is applied to the back side 2816 of the label 2810 so as to provide additional focusing space and materials (e.g., when the image element body is formed also of clear plastic or the like rather than a nontransparent paper or other material).

Application of the label 2810 continues until the lens element 2812 is placed fully against the recessed surface 3020, with additional adhesive sometimes being applied during such application or at least at or near the end 2813 such that image element 2812 is retained in position against the recessed surface 3020. With the image element 2812 in place, the rolling or application of the label 2810 continues with the neck or extension portion 2818 extending outward from the recessed surface 3020 across the depth, d, to the shelves 3022, 3024. Then, the lens element 2820 contacts the sidewall adjacent the recessed surface 3020 at attachment surfaces 3112, 3114 of side wall 3010. As shown, only a relatively small portion of the lens element 2820 abuts the surfaces 3112, 3114 (such as 0.125 to 0.5 inch or more on each side of the recessed surface 3020). The rolling or application continues with the lens element 2820 being attached, e.g., glued or the like) to the surfaces 3112, 3114 of the side wall 3010 until it has been fully applied. At this point, the end 2823 of the lens element 2820 may be further attached to the container side wall 3010 and/or to itself. Typically, the length, L3, of the lens element 2820 is such that it will extend about the container side wall 3010 at least once so as to fully enclose the image element 2812 and recessed surface 3020 (although this is not a requirement to practice the invention).

As shown in FIG. 32, the application of the label 2810 in this manner results in a focusing or spatial gap 3220 being created between the lens element 2820 and the image element 2812. In the illustrated embodiment, the length of this gap, $L_{GAP}$, is measured from the back surface or web 2828 of the lens element 2820 to the image 2814 on the image element 2812. This distance can typically be approximated as being equal to or slightly less than the depth, d, of the recessed surface 3020 minus the thickness, $t_1$, of the image element 2812. In standard manufacturing processes (such as typical application of a wrap around label onto a bottle or container), the gap 3220 is filled with air. Hence, determination of the proper shape and configuration for the lenses 2824 and their frequency (e.g., LPI) takes into account focusing through a thickness of air equal to the gap length, $L_{GAP}$, rather than just the thickness, $t_2$, of the lens element.

As discussed in detail above, this is very beneficial for achieving high quality graphics with relatively coarse or lower frequency lens arrays. For example, in some embodiments, the thickness, $t_2$, can be kept below about 3 mils (or use standard wrap around materials and sheet thicknesses), the lenses 2824 can be provided at less than 40 LPI (such as at 15 to 25 LPI), and the image 2814 can be interlaced with 20 or more frames or images (at 1/400 of an inch spacing or slices) that can be registered to the lenses 2824 when an air gap or spacing thickness of 0.25 inches or less is achieved in the packaging system 3100. In one embodiment, 20 LPI was used by the inventor to produce high quality graphics with 20 images when a 3/16-inch $L_{GAP}$ was provided in a packaged container 3100.

As shown, a viewer 3240, 3250 can view images 3244, 3254 through the lenses 2824 at various points about the container package 400. Specifically, the images 544, 554 are viewable where the lenses 2824 are provided and paired with images 2814. In the illustrated embodiment, this is between 300 and 360 degrees (e.g., nearly about the entire circumference of the container 3000). In other embodiments, the images 3244, 3254 may only be visible for a portion of the circumference, such as for a front portion or from particular locations such as the front and back. In this latter arrangement, the image 2814 may be provided in select locations of image element 2812 and similarly, the lenses 2824 may be provided in only select portions of the lens element 2820 that can be paired with these image sections 2814 or so as to be availabel about the entire circumference or periphery of the container 3000 as shown. Also, as shown, the images 3244, 3254 may be projected outward from the container package 3100 to provide a 3D effect. The images 3244, 3254 may also be provided with motion by rotating the container package 3100 and be combined with images (such as the product logos and the like shown in FIG. 31) that are background and appear to be at 2812 or between 2812 and images 3244, 3254. In addition to floating or projected images and images at the label location, the lenses 2824 and image element 2812 may be configured such that images appear to be inside the container or otherwise behind the image element 2812 or container recessed surface.

FIG. 33 provides an enlarged view of the various components and/or layers of the packaging system 3100. As shown, the container wall 3020 mates (such as with adhesive or shrink fitting) with the contact or inner surface 2816 of the image element 2812 (or element 2812 body), and typically, there is little or no gap or spacing between these surfaces (except some air pocketing that may occur in standard labeling processes). The interlaced or printed image 2814 is provided on the opposite surface of the image element 2812. A spatial or focusing gap 3220 is provided that is typically filled with air (but other gases or fluids may be provided in such gap 3220 to achieve a specific effect or to obtain a desired index of refraction). The gap 3220 has a size or length, $L_{GAP}$, that is measured from the web or back surface 2828 of lens element 2820 to the printed image 2814 (or, more simplistically, to surface of element 2812). In one example, the thickness, $t_2$, of the lens element 2820 is less than 5 mils and more preferably between about 1.3 and 2 mils, and the gap length, $L_{GAP}$, is less than about 5/16-inch (with one embodiment being less than 3/16-inch). The focal length, $L_{FOCAL}$, is the sum of these two dimensions, which is typically much larger than could be obtained with just the use of a plastic wrap as stiffness, cost, and fabrication issues would make such thickness impractical.

It is important that the lenses 2824 be registered with particular portions of the image 2814 and typically that they either be substantially parallel to these slices or portions of the image 2814 or be substantially perpendicular. Generally, this is achieved by the proper selection of the lengths of the elements 2812, 2818, and 2820 (e.g., $L_1$, $L_2$, and $L_3$) for a particular container 3000 and its diameters, $D_1$ and $D_2$ such that when the label 2810 is applied as shown in FIGS. 31-33 the lenses 2824 are properly aligned with the image 2814. Further, in this regard, some embodiments of the packaging system 3100 include grooves or slight shoulders (not shown) as part of the attachment surfaces 3112, 3114 on the side wall 3010 to assist in proper placement and alignment of the label 2810 as it is attached to the container side wall 3010. Of course, some lack of alignment may be acceptable with the quality of the images 3244, 3254 being improved with higher accuracy alignment or registration.

FIGS. 28-33 illustrate an embodiment for creating an air gap 3220 with a single wrapping process. In other embodiments, an air gap or focusing gap filled with air is formed with separate applications of an image element and of a lenticular lens array or lens element. For example, the packaging system 3100 may be modified such that the image 2814 is applied directly onto the container surface 3020, e.g., is printed onto the side wall directly without a label or is provided as part of the wall (e.g., during manufacture of the container 3000 an interlaced image may be printed or otherwise formed/provided on either the outer or inner surface of the side wall 3010 or even within the side wall 3010 at surface 3020. Such embodiments are considered within the breadth of this description as they are packaging systems or packaged containers/devices in which a gap filled with air or other fluid is provided by the application of a lenticular lens label or a wrap around label, whereby coarser or lower frequency lens arrays may be used to achieve results similar to that achievable with much thicker lens elements and/or much higher frequency arrays (with corresponding much more challenging printing mathematics and processes).

Figure 34:
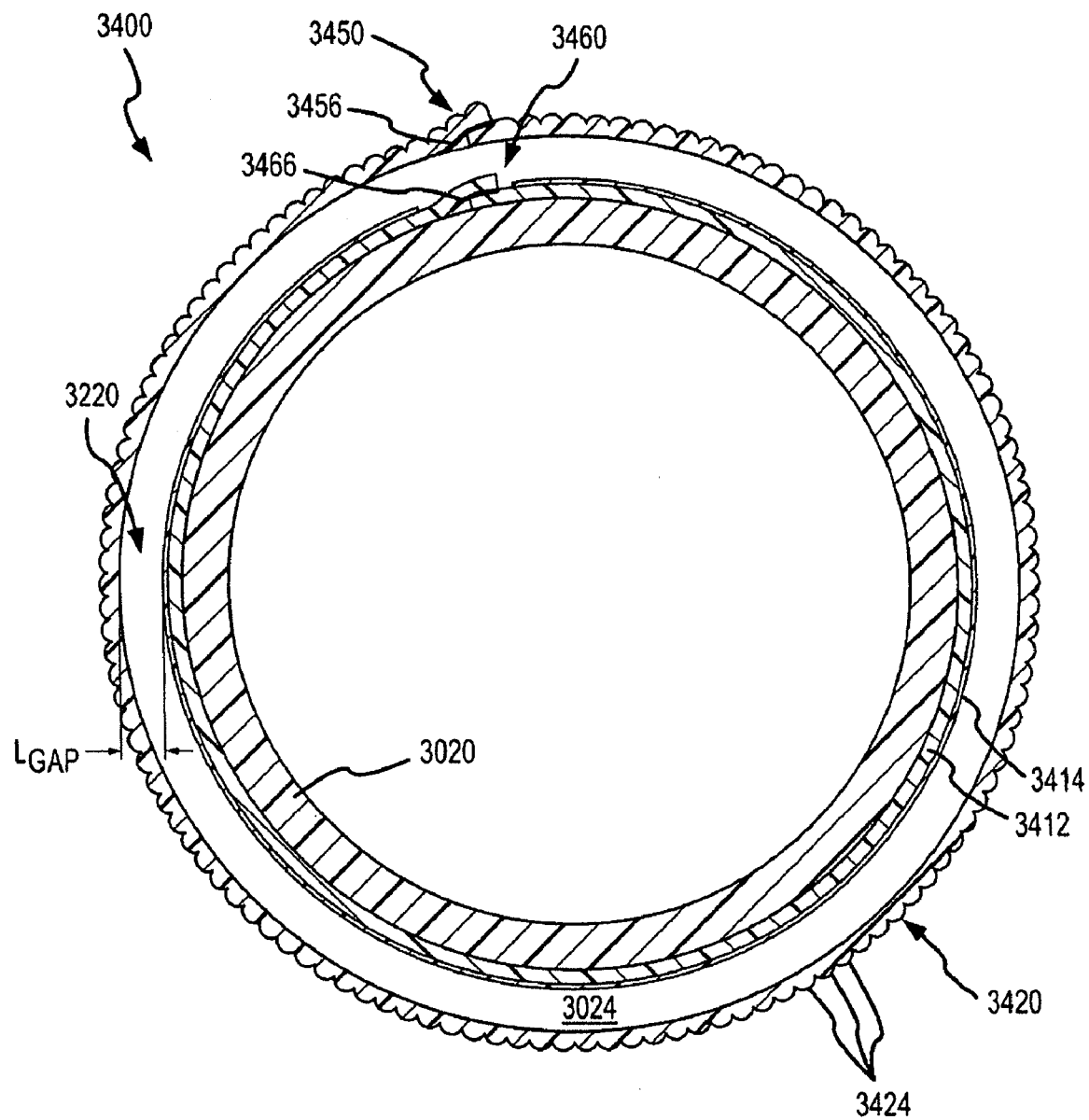
FIG. 34 is a cross section view similar to that of FIG. 32 showing an alternative packaging system in which two separate labels are applied to provide the image element and the lenticular lens array.

FIG. 34 illustrates another packaging system or packaged container 3400 according to the invention. In the system 3400, a container (such as a container 3000 or a cup or other cylindrical cross section container) is wrapped to form an air space 3220. As shown in a similar fashion to FIG. 32, a container side wall 3420 with a registration shelf 3024 is provided to define recessed surface (such as surface 3420). The air space 3220 in contrast to the system 3100 is formed by two individual wraps or wraparound labels that are applied in two processes or sequentially on a single line. An inner wraparound label 3412, e.g., an image element, is provided with an interlaced or printed image 3414. The image element 3412 is applied by attaching a first end, such as with adhesive, and wrapping the element 3412 about the recessed surface of wall 3420. The wrap or element 3412 may have a length such that it extends around the wall 3020 at the recessed surface slightly more than one time such that an overlap section 3460 may be attached, such as with adhesive, to the top or image side 3414 of the image element 3412 to tightly bind the element 3412 to the recessed surface of wall 3020.

An outer or lens element (or wrap or wrap around label) 3420 is provided in the system 3400 to form the focusing gap 3220. The lens element 3420 is attached to the wall 3020 at its larger diameter portion that is adjacent to the recessed surface defined by the shelf 3024 (and shelf 3022 not shown in FIG. 34). The lens element 3420 may be configured similarly to element 2820 and includes a lens array or plurality of lenticules or lenses 3424. The lens element 3420 is applied or attached to the wall 3020 such that the lenticules 3420 are on the exterior of the packaged container 3400 and such that the line of focus is inward to a focal point on or near the printed image 3414 through the air or fluid in gap 3220. As with the lens element or wrap 3412, the lens element or wrap 3420 may be provided with a length that is somewhat larger than the circumference or periphery such that it has an overlap portion 3450 that can be attached to the lens side (or over lenticules 3424 in some cases) with adhesive 3456.

The embodiments of packaging systems 3100 and 3400 are shown to include recessed surfaces and labels that extend about the entire circumference or periphery of the container 3000. In some embodiments of the invention, it may be desirable that one or the other of these components does not extend about the entire circumference or periphery. For example, it may be useful to only provide the image element and/or lenticular array in a portion of the container, such as in the front (or side presented to consumers when the device is shelved for sale) even though the recessed surface extends about the entire circumference or periphery.

Figure 35:
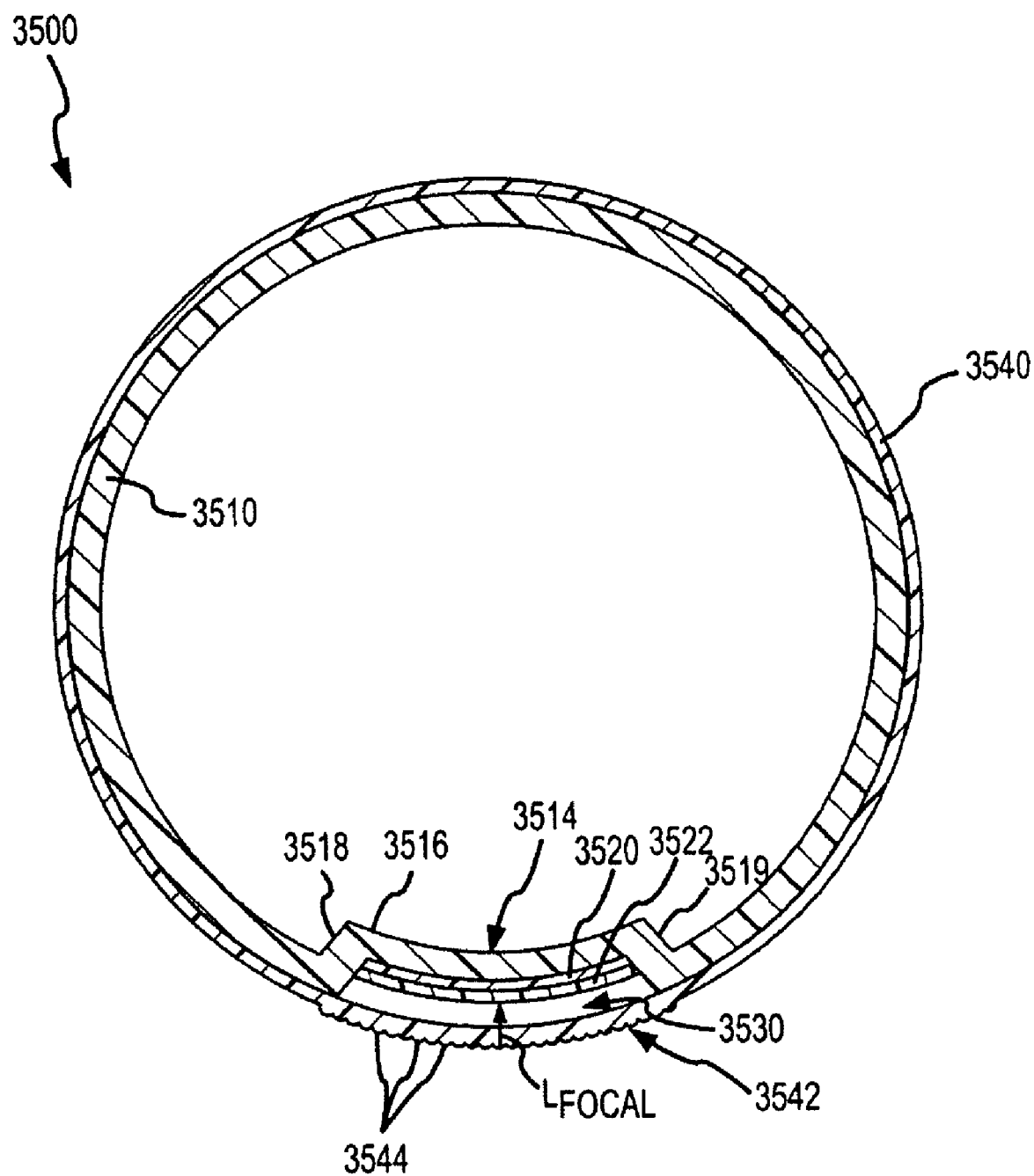
FIG. 35 is a cross section view similar to FIGS. 32 and 34 showing another alternative packaging system of the invention in which the recessed, registration surface does not extend about the entire periphery or circumference of the container (and, in the illustrated embodiment, neither does the lenticular array or set of lenticules)

Alternatively, the packaged container or packaging system 3500 of FIG. 35 may be utilized to create a desired graphical image. This container having the side wall 3510 may be a bottle as provided for container 3000 or may be a cup (such as a stadium cup) or other cylindrical container. The side wall 3510 includes a recessed surface 3514 that may extend the length of the container wall 3510 or more typically is provided in a portion of the wall 3510. For example, in a container wall 3510, the recessed surface 3514 may be a 3-inch by 4-inch rectangle, a 2-inch square, a 3-inch diameter, or other shape with a surface area that is selected to suit the size of the wall 3510 (e.g., the diameter of the container with wall 3510) and the size of the image being displayed or created by the system 3500. The size, number, shape, location, and depth of the recessed surfaces 3514 may be varied to practice the invention.

As shown, a single rectangular or square recessed surface 3514 is provided in the container wall 3510 of system 3500. The recessed surface 3514 is defined by side walls 3518, 3519 (with top and bottom side walls not being shown in FIG. 35) and back or interior wall 3516. Such a recessed surface 3514 is typically formed at the same time as wall 3510 such as during the blow molding or other manufacturing process. In other cases, the recessed surface may be cut or otherwise formed in wall 3510 such as by having the depth of surface 3514 being only a fraction of the thickness of sidewall 3510. A printed image is then either formed directly in the recessed surface, or as is shown, an image element or label may be provided and affixed (such as with adhesive) to the recessed surface 3514. The image element may include a substrate 3520 (such as a paper material or plastic or the like) and an interlaced printed image 3522 (e.g., a layer of ink). A wraparound label 3540 is then applied to the container wall 3510 so as to position a lenticular array 3542 with a plurality of lenticules 3544 adjacent or proximate the image 3522 but spaced apart by a focusing gap 3530, which may be filled with air or other gas/fluid.

The lenticules 3544 may be at a lower frequency than if the gap 3530 were not provide with the focal length, $L_{FOCAL}$, being the thickness of the wrap 3540 or more specifically of the wrap at the lenticular array 3542 combined with the length or size of the gap 3530. For selecting the frequency (e.g., 10 to 50 LPI or more or less coarse) and configuration of the lenticules 3544, the thickness of the array 3542 and its material would be taken into account along with the radius (or curvature) of the container wall 3510 at the application of the array 3542 and further along with the index of refraction of the fluid in the gap 3530 (e.g., the index of refraction of air or other gas). With the system 3500, a graphical image (not shown) can be created relative to a portion of the container wall 3510 with relatively coarse lens and thin wrap 3540.

Figure 36:
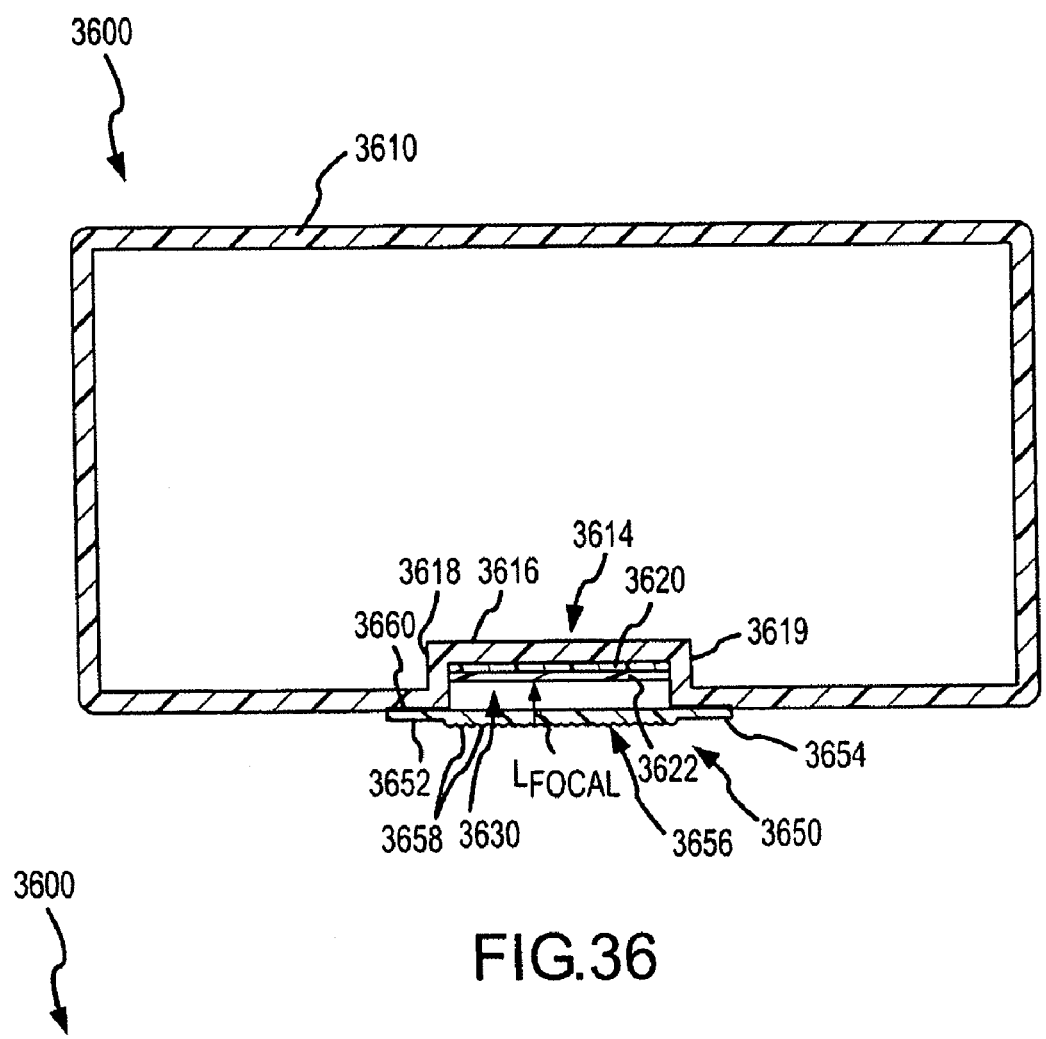
FIG. 36 is a cross section view similar that of FIG. 35 showing packaging system in which the container has a rectangular cross section and the lenticular lens array is provided in a label that does not extend about the container but instead extends over the recessed, registration surface.
Figure 37:
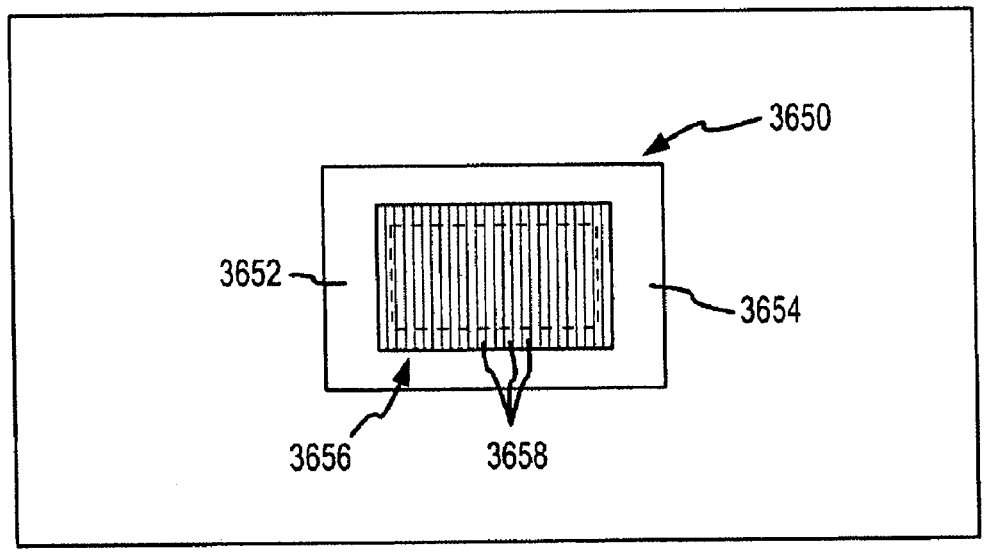
FIG. 37 is a top view of the packaging system of FIG. 36.

Of course, the inventive concepts may be used in containers with a cross section that is not circular. For example, a container that is square, hexagonal, triangular, or other polygonal cross sectional shape may be enhanced by the inclusion of the packaging shown herein. In general, nearly any surface may be modified to include a recessed surface for holding an image element (or just an interlaced image that may be printed directly or otherwise provided within the recessed surface) and a lenticular array or label with a set of lenticules may be positioned over the recessed surface and a corresponding image. FIGS. 36 and 37 are useful for showing another embodiment 3600 of a packaged container that has a container wall 3610 that is rectangular in cross section. The embodiment 3600 is also different from the others shown as the lens element or label 3650 does not extend about the entire periphery of the container wall 3610. Instead, the lens element 3650 is only slightly larger in dimension than the recessed surface 3614 with side or mounting tabs 3652, 3654 that provide surfaces for mounting to the side wall 3610 about the recessed surface 3614, e.g., mounting with adhesive 3660 adjacent to side walls 3618, 3619 of recessed surface 3614.

The recessed surface 3614 is defined in depth and shape by side walls 3618, 3619 and includes a back or rear wall 3616 attached to side walls 3618, 3619 for receiving image element or substrate 3620, which may be attached using adhesive (not shown). An interlaced image 3622 is shown on the surface of substrate distal to the wall 3610 (or proximate to lenticular array 3656 and its series of lenticules 3658. The lenticules or lenses 3658 are paired with and registered to or mapped to portions or slices of the data in image 3622. A focusing gap 3630 is provided that may be filled with air or other fluid and that defines (along with the thickness of array 3650) the focal length, $L_{FOCAL}$, of the lenses 3658. The container wall 3610 may be formed from plastic, glass, cardboard, metal, or other materials useful for providing containers for products such as consumer goods that typically are displayed on shelves to provide "eye catching" graphics when provided the view of system 3600 as shown in FIG. 37.

Figure 38:
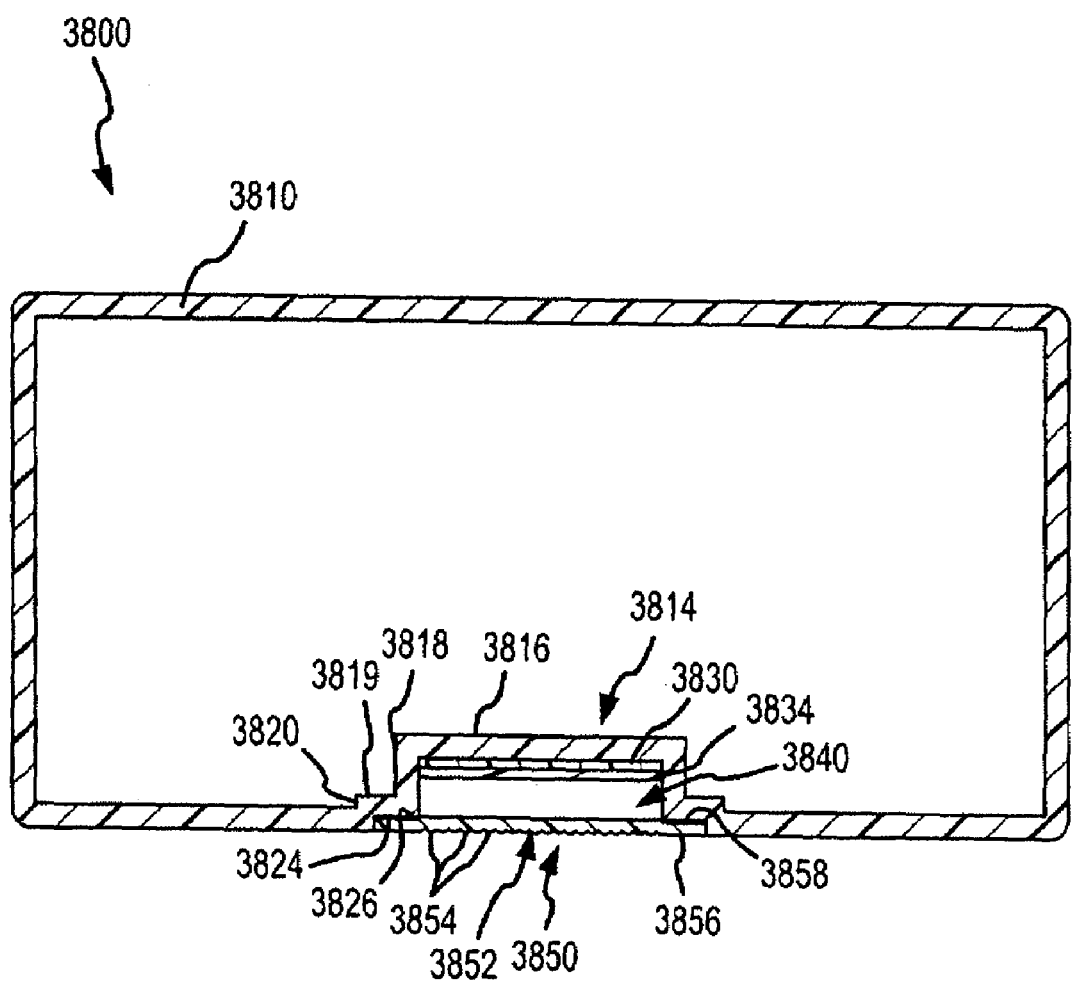
FIG. 38 is a cross section view similar to that of FIG. 36 showing yet another packaging system of the invention in which the recessed surfaces in the container wall include an image registration surface and also a shelf for receiving peripheral mounting, positioning tabs of the lenticular lens element such that the lens element's outer surfaces are substantially level or concurrent with container wall outer surfaces.

FIG. 38 illustrates with system 3800 a variation of the system 3600. In this embodiment (which may be implemented in other cross sectional shapes) 3800, the side wall 3810 is configured for receiving not only a image element 3830 with a printed image 3834 but also the lens element 3850. In this manner, the side wall 3810 with the image producing assembly can be relatively flush rather than having a label protruding as shown in system 3600. As shown, the a recessed surface 3814 for receiving and supporting the image element 3830 is formed with a back or inner wall 3816 surrounded by side wall(s) 3818. A step 3819 is then provided to a second side wall 3820 to provide a second recessed surface for receiving the lenticular lens element 3850. The second recessed surface is provided by shelf 3824 and side wall(s) 3826. The lens element 3850 includes a lens array 3852 made up of a plurality of lenticules or lenses 3854, and the lens element 3850 may be attached at tabs or attachment surfaces 3856 with adhesive 3858 or by other methods. The arrangement shown in system 3800 produces or provides a spatial gap 3840 that again may be filled with air or other fluid to provide enhanced focusing by providing a desired refractive index or characteristics and by increasing the focal length of the lenses 3854 onto the image 3834.

Figure 39:
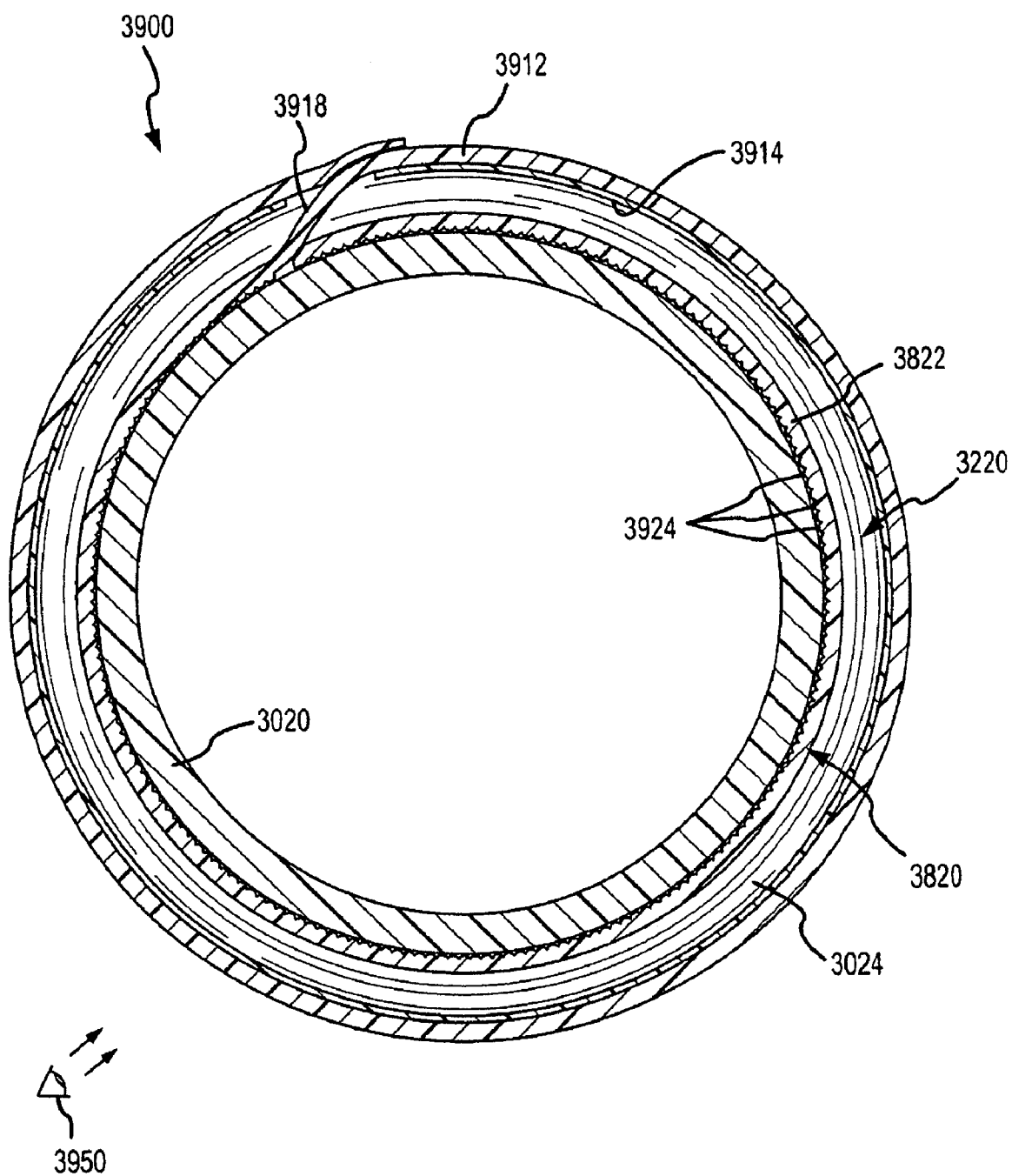
FIG. 39 is a cross section similar to FIG. 32 of another embodiment of a packaging system in which a two-part wraparound label is used to create a focusing or spatial gap (or "air gap") but with the lenticular lens element being in contact with the container wall in the recessed surface and the image element creating the external sleeve over the lens element.

FIG. 39 illustrates yet another embodiment of a packaging system 3900 useful for obtaining an air gap to allow thinner lens material to be used and lower LPI lenticular arrays. The embodiment 3900 may be applied to a container 3000 without additional modification. System 3900 differs from system 3100 in that the lens element is positioned within the recessed surface with the lenses abutting the container wall 3020 in such recessed surface. The focus line is through the container and its contents, through the lens array, then an air gap, and finally to the printed image provided on a label that may be a wrap around as shown or a label that extends for a portion of the container circumference. As a result, the container wall 3020 needs to be transparent or at least translucent as does the contents (e.g., water or other clear fluid) or air when the contents/product is removed (e.g., view an image such as information regarding a prize, a contest result, a coupon, or other data after the a beverage or other product is removed from the container 3000).

As shown, the container wall 3020 includes a recessed surface defined by registration wall or shoulder 3024 (and 3022 shown in FIG. 30). The system 3900 includes a one piece label that can be wrapped about the container wall 3020 in a single process, but in other embodiments, the lens element and image element are provided separately similar to the embodiment 3400 of FIG. 34. During the application process, the lens element 3920 is applied or wrapped about the container wall 3020 at the recessed surface such the lenticules 3924 of the lens array 3922 are facing inward toward the container wall 3020 and typically so that the lenses 3924 contact the recessed surface. The shelf 3024 is useful for aligning or registering the lens element 3920 in the system 3900 and typically, the lens element 3920 will have a width equal to or slightly less than the width of the recessed surface (with some embodiments having a width that is significantly less than the width of the recessed surface). Adhesive (not shown) may be used to attach the lens element 3920 (but preferably not at the lens array 3922 to avoid distortion issues when adhesive is applied between the lenses 3924 and the wall 3020). The lens element 3920 may extend entirely about the wall 3020 at the recessed surface as shown or extend for only part of the container circumference.

Next, the extension element or neck 3918 stretches across the depth of the recessed surface (or spatial gap 3220) so that the wider lens element 3912 can be attached to the container wall 3020 at attachment surfaces near or adjacent to the recessed surfaces (or shoulders 3024), e.g., as shown for in FIG. 31 at attachment surfaces 3112, 3114 for lens element 2820 of wrap 2810. The image element 3912 is typically glued or otherwise affixed to the container wall 3020 so as to provide a sleeve or enclosing layer over the recessed surface and to form the focusing or air gap 3220. The image element 3912 typically will extend about the entire circumference of the container wall 3020 as shown with an overlap provided in some case to facilitate attachment by bonding the element 3912 to itself as well as to wall 3020. An interlaced image 3914 is provided on the element 3912 and is mapped or registered to the lenses 3924 of array 3922 so as to create a viewable image through the container as shown at 3950, with the image (not shown) being projected outside the container system 3900, inside the wall 3020, and/or at the surface 3912. The image 3914 may be provided on a surface of image element or wrap 3912 as shown or be provided on an exterior or distal surface of the element 3912. As with the other interlaced images, the image 3914 may be printed onto the image element body or attached after being formed on a different substrate.

In some embodiments, it may be desirable to provide a spatial gap in containers or packaging for which no recessed surface is provided or availabel. For example, many containers such as plastic bottles, glass bottles, jars, and the like, paper/cardboard boxes, and other containers (or products) have walls with smooth outer surfaces, but it is still useful to create a gap by applying a label in a wrapping or rolling process as discussed above. In such cases, a label can be provided that uses raised shoulder or surfaces to achieve a spatial gap to benefit from the refractive index of air or other gas rather than having to rely on label thicknesses alone.

Figure 40:
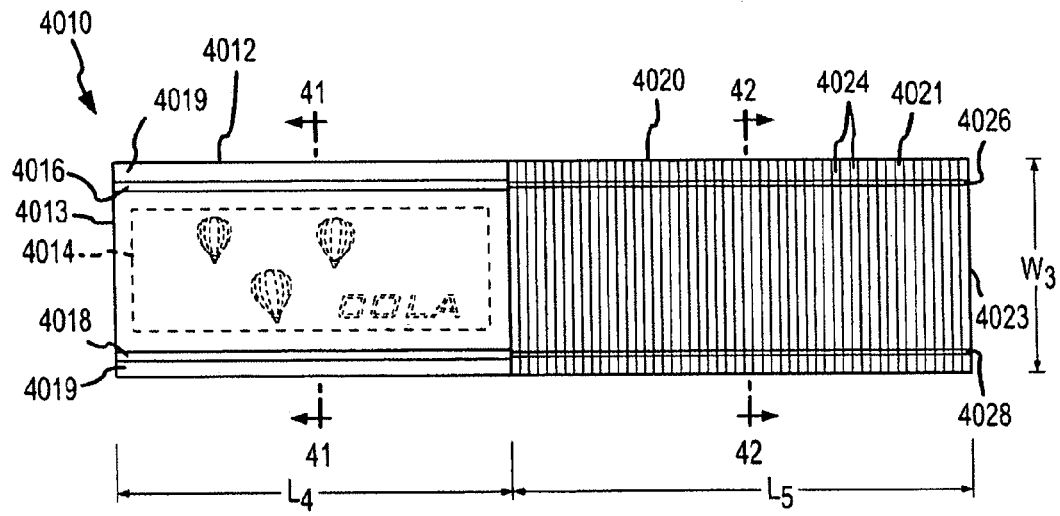
FIG. 40 is a view similar to FIG. 28 of another embodiment of a wrap around label useful for achieving a focusing or spatial gap between a lens array and a printed image on a container with flat walls (e.g., without use of a recessed surface)

One such embodiment of a wrap around label 4010 with "shoulders" is shown in FIG. 40. The label 4010 differs from label 2810 of FIG. 28 in that it is formed from a single sheet of material (but, of course, it could be formed by laminating two pieces together as discussed for label 2810). The label 4010 also differs from label 2810 in that the image is 4014 is printed on the opposite side as the lenses 4024 so as to utilize the thickness of the label 4010 twice, e.g., once for the lens element 4020 and once for the image element 4012, but, again, the image 4014 may be provided on the same side as the lenses 4024 as was shown in FIG. 28 for label 2810.

Figures 41, 42:
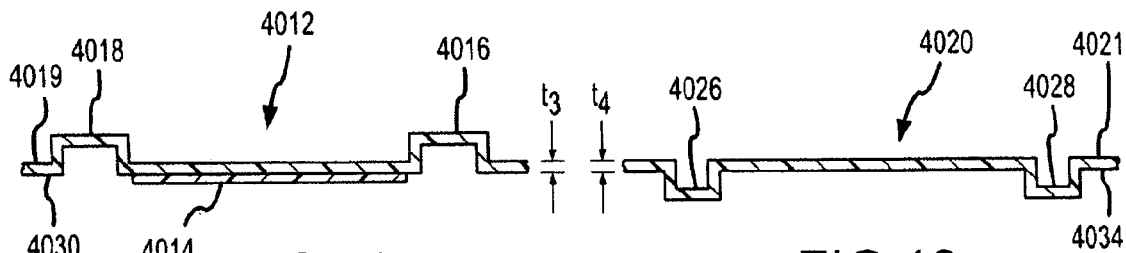
FIG. 41 illustrates a cross section of the image portion or element of the label of FIG. 40 taken at line 41-41.
FIG. 42 illustrates a cross section of the lens portion or element of the label of FIG. 40 taken at line 42-42.
Figure 43:
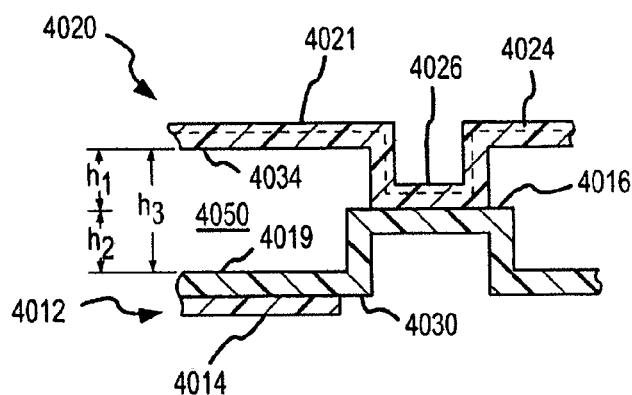
FIG. 43 illustrates a partial cross section of an assembly package system or packaged container similar to FIG. 33 showing the label of FIGS. 40-42 as applied in a double wrap to create a spatial gap that may be filled with air to provide a focal length that supports focusing on the back of the image element (or in other cases on the front of the image element as shown in FIGS. 33 and 34)

As shown in FIGS. 40-42, the label 4010 includes an image element or portion 4012 and a lens element or portion 4020. The two elements 4012, 4020 have a single width, $W_3$, in most embodiments and have lengths, $L_4$ and $L_5$ that are typically equal such that each element is wrapped about a container once. The image element 4012 includes a first side 4019 and a second side 4030. An interlaced image 4014 is provided, e.g., by printing, on the second or "reverse" side 4030 in the illustrated embodiment so as to increase the distance from the image 4014 to the lenses 4024 (e.g., to provide a larger focal length). In other cases, though, the image 4014 may be provided on the surface 4019 with the lenses 4024. The image element has a thickness, $t_3$, such as the thickness of an extruded sheet (e.g., 0.5 to 10 mils or more). The image element 4012 is formed so as to have two raised shoulder 4016, 4018 on the first side and extending along the length of the element 4012 from end or edge 4013 to the lens element 4020. In one example, the shoulders 4016, 4018 are formed by embossing of the label 4010 after the printing or application of image 4014 and are provided in a continuous manner adjacent the image 4014 (but in other cases, the shoulders 4016, 4018 may not be continuous and/or may be provided in only portions of the element 4012). With reference to FIG. 43, the height, $h_2$, of the raised shoulders 4016, 4018 may vary to practice the invention, but in some embodiments is about 25 to 100 percent of the thickness, $t_3$, of the image element 4012. For example, the label 4010 may have a thickness of about 0.5 to 10 mils or more and the height of the raised shoulders 4016, 4018 may be about 0.125 to 10 mils (or more). The cross section of the shoulders 4016, 4018 (and 4026, 4028) is shown as square or rectangular as being easy to form and providing good mating surfaces, but in other embodiments, the cross section may be arcuate, triangular, or other shape.

The lens element 4020 extends from image element 4012 to end 4023 and includes a plurality of lenticules or lenses 4024 that provide a lens array for viewing the image 4014. The lens element 4020 has a thickness, $t_4$, that typically is about the thickness of the image element, $t_3$. The lenses 4024 are formed on a first side 4021 of the lens element 4020, which typically is the opposite side of the label 4010 as the image 4014. The lens element 4020 includes a second side or surface 4034 upon which a pair of raised shoulders 4026, 4028 is provided (or recessed surfaces 4026, 4028 are provided on first side 4021). The shoulders 4026, 4028 are shown to extend along the length of the lens element 4020 from the image element 4012 to the end or edge 4023 (but, may be provided as two or more shoulders rather than one unitary shoulder). As with the shoulders 4016, 4018, the shoulders 4026, 4028 are typically formed (such as by embossing) in the label 4010 after the printing of image 4014 and the forming of lenses 4024. The height, $h_1$, of the raised shoulders 4026, 4028 may be about the thickness, $t_4$, of the lens element 4020 or some smaller value, and typically is about 0.125 to 10 mils or more depending on the thickness, $t_4$, of the lens element 4020.

As with the label 2810, the label 4010 can be applied to a container, such as glass or plastic bottle or other container, in a rolling or wrapping process or other process useful for applying such labels. A partial sectional view of such a label 4010 as it may appear when applied to a container is shown in FIG. 43. As shown, the image element 4012 would contact a container or other surface (not shown) such that the image 4014 abuts the container. To this end, the image element 4012 is wrapped onto the container first starting at end 4013 (e.g., with adhesive provided near this end 4013 on surface 4030). The raised shoulders 4016, 4018 extend outward from the container outer surface and from the first or front side 4019 of the image element by the height, $h_2$, which may be up to a thickness, $t_2$, of the image element 4012 (or label 4010). Typically, the length, $L_4$, of the image element 4012 is such that the container wall is wrapped completely one time.

With the image element 4012 attached, the lens element 4020 is wrapped onto the container surface as shown in FIG. 43 over or so as to contact the image element 4012. Preferably, the rolling or label application is done such that the shoulders 4016, 4018 of the image element 4012 contact (e.g., receive and support) the raised shoulders 4026, 4028 of the lens element 4020. As shown, this results in the creation of a gap 4050 (e.g., a spatial gap filled with air, gas, or other fluid) that has a gap length, $L_{gap}$, of the combined heights of the two raised shoulders. The shoulders 4016, 4018, 4026, 4028 may have the same width or differ as long as good mating surfaces are achieved to establish and maintain the gap 4050, and the width of these shoulders typically will be from about 0.1 to 0.5 inches (or more or less to suit a particular application). Likewise, the heights, $h_1$ and $h_2$, of the shoulders may be equal or differ to practice the invention. In one embodiment, a gap 4050 with a length, $L_{gap}$, of 20 mils was achieved with lens and image element thickness, $t_3$ and $t_4$, of 10 mils each.

The following is a discussion of one exemplary technique for fabricating the wrap around label 4010. In this exemplary process, the lenses 4024 in the lens element 4020 typically would be created by extruding or embossing. The label 4010 would typically be formed of a clear plastic material, such as, but not limited to, cast propylene, oriented polypropylene (OPP), APET, polyester, polyvinyl chloride (PVC), propylene, polycarbonate, or the like. For example, an extrusion cylinder or drum may be provided with a surface with surfaces that alternate between a mirror image of the lenses 4024 or lens element 4020 (i.e., is useful for defining the lenses with a wave pattern cross section to form the protruding ribs or lens surfaces of lenses 4024 in vertical or horizontal patterns) and a smooth or blank surface corresponding to the initially smooth surface 4019 of the image element 4012. In this manner, a sheet of material is produced with a plurality of labels 4010 with an image element 4012 adjacent to a lens element (but without shoulders 4016, 4018, 4026, 4028). Extruders and corresponding cylinders are typically useful for label or material thicknesses of less than about 35 mils, and, the label 4010 when applied as shown in FIG. 43 is able to achieve a focal point of over 35 mils by extruding the label 4010 with thicknesses well below 35 mils (e.g., 10 mil thicknesses can achieve thickness of up to 40 mils). Alternatively, the lenses 4024 may be embossed onto a flat sheet of clear plastic material. The extruded or embossed material is typically sheeted or rolled in rolls for flexographic or web printing. The printing of the image 4014 on each label 4010 on the sheet is typically performed on the second or reverse side 4030 (e.g., on the non-lens side of the wrap or sheet). The printing of the interlaced image 4014 is not done directly behind the lenses 4024 as in conventional lenticular printing.

The "tack and wrap" labels 4010 are then into strips with a number of labels 4010 or left in roll form. The shoulders 4016, 4018, 4026, 4028 are formed in the labels 4010 by embossing into the sides of the labels 4010. For example, the shoulders 4016, 4018 are formed by embossing the side 4030 while shoulders 4026, 4028 are formed by embossing the lens side 4021. This may be done in combination or separately, and such embossing may be done separately or concurrently with operations to cut each label from the strip or rolled sheet.

The spatial gap 4050 is created to coincide with the desired focal length of the lenses 4024 to the interlace image 4014 when the label 4010 is applied to a container or package. These wraps 4010 are for the most part "mirror-printed" or second surface printed (as could be label 2810 and other labels shown herein). Therefore, the focal lengths are calculated by combining the refractive index of the plastic used in the lens element 4020 and image element 4012 (which in most, but necessarily all, cases are equal in thickness) along with the refractive index of air (or other fluid) in the gap 4050 and its length. By this technique, viewing angles can be decreased for a sharp focal point at the image 4014, which produces outstanding lenticular graphics at a more course LPI. For example, a 50 LPI label, similar to that shown in FIGS. 40-43 or in FIG. 32 if adapted for reverse side or second surface printing, with a 10 mil gap filled with air was determined to have a viewing angle of 36 degrees while one with a 20 mil gap filled with air was determined to have a viewing angle of 28 degrees, which represents a more desirable configuration for obtaining a good focus on an image. Prior to the present invention, a lens with 50 LPI and a 28 degree viewing angle may have required over 100 mils thickness because it was only using plastic for focusing rather than also using air, which allows a reduction in thickness of 60 mils or about a 60 percent reduction in this example.

In alternative embodiments, the label 4010 may be modified to only include shoulders 4016, 4018 in the image element 4012 or to only include shoulders 4026, 4028 in the lens element 4020. Further, some forms of labels (not shown) with shoulders are provided by forming the labels as discussed above but replacing the embossing steps used to form the shoulders of label 4010 with steps to attach additional material such as bonding plastic strips, applying tape, applying paper, or other strips of material (such as polyethylene or the like) with a thickness of 1 to 3 mils or more to the image element on the surface 4019 and/or to the surface 4034 of the lens element 4020.

With the physical configuration and design well explained, it may now be useful to describe in further detail exemplary processes and mathematical algorithms or techniques in designing the lenticular arrays or plurality of lenses used in the air gap embodiments shown in the figures. For example, it may be useful to more explain generally how the frequency, size, shape, and thickness of the lens elements and their arrays are chosen for use in a particular packaging system or packaged container to achieve a desired graphic result, e.g., how are the parameters of a wrap around label such as label 2810 found or selected.

In one process, the desired pitch is selected from predefined resolution values for an image or packaged container (e.g., what are the resolution goals or desired resolution for a particular product). Once that resolution number is chosen or known, the desired viewing angle is used to determine the gap needed to produce the desired viewing angle. The gap or gap number in turn sets the focusing parameters for the lenticules or lenses of a lens array. One of these focusing parameters of the lenticules is the radius of each lenticule (assuming substantially circular lenses but other cross sectional shapes may be used in some cases). The lens radius is found for the lenticules, and this radius allows the gap focal lengths to be determined.

Such focal length determinations may be performed manually but, in many cases, ray tracing programs or subroutines are utilized to determine the focal lengths for a particular lens radius (or radius based on a particular focal length (e.g., based on an achievable focusing gap)). Ray tracing programs or algorithms are useful as they allow a number of variables or parameters of the design to be changed, with ray tracing results provided quickly to determine if a desired result (e.g., a desired resolution is achieved or the focal length provides focusing on a particular printed image with a set data space/ resolution). Typically, such a ray tracing program takes as parameters the thickness of the lens sheet, the material used for the lens sheet (or its index of refraction), the refractive index of the gas in the focusing gap and its length, LGAP, and target resolution (focusing width such as 1/400-inch as discussed in the earlier examples).

For example, a properly designed ray tracing program may be used to fine tune the radius of a lenticule. The diameter(s) of the container (e.g., bottle, can, cup, or the like) may be used to determine the radius of the cylinder upon which the lenticules sit or are positions, e.g., the diameter, $D_1$, of wall 310 in FIG. 30 outside but near the recessed surface 3020 where the image is positioned. Then, the ray tracing program can be used to accurately determine the focal length of the lenticule and for the lens array. If this particular radius fails to achieve a desired result in resolution or in focusing on printed image, then a larger or smaller radius may be entered into the ray tracing program to tune the lens array to achieve a more desirable lens element such as element 2820 of FIG. 28. The "drop off" of the lenticule is calculated so that cusp areas of the lenticules are known. Too small of a cusp area to support distance would produce a weak lenticular structure. The overall thickness of the lenticular array or pattern is set to give a sufficient support structure.

A further subroutine or algorithm may be used to account for the fact that the lenticules are typically formed or embossed or formed using a flat mold tool but then are later applied or wrapped about a cylindrical or curved area (e.g., the systems 3100 and 3400 shown above). Such a subroutine preferably converts the radii of the lenticules wrapped on a bottle or other container to the radii of the lenticules when they are cut or formed on a flat sheet of material so that the lens element (such as element 2820) is effective for focusing the lenticules on data spaces or portions in a later registered or paired interlaced image. As will be appreciated, the wrapping causes an effective reduction in the lenticule radius, and, hence, the radius formed in the flat sheet is preferably larger to adjust for this effect.

One exemplary subroutine or algorithm corrects for this effect by calculating the "drop off" in the lenticule and reduces this calculated drop off value by the drop off in the cylinder and calculates a new radius to be used in flat fabrication processes. The original "drop off" is the distance from the flat sheet or planar material that is needed to form a lenticule having a particular or desired radius. But, if no adjustment were made, the effective radius would be reduced by the curvature of the container. Hence, the drop off produced by the container side wall is determined at the point of mounting (e.g., based on the radius of the container wall at the mounting location), and this extra drop off is subtracted from the desired drop off such that fabrication can be accurately achieved in a planar or flat sheet of material (such as a thin sheet of plastic used for typical wrap around labels), e.g., by establishing where embossing lines should be positioned or provided to create the lenticules in a lens element to produce lenticules of a particular radius not when formed but when placed on a particular container. In other words, the adjusted drop for use in fabrication of the lens array is equal to the calculated lenticule or lens drop less the bottle drop, with such determinations of "drop" or "drop off" being readily understood by those skilled in the arts with the important aspect here being that it be recognized that such corrections are preferred to achieve a desirable graphical result with the wrap around systems of the present invention. Such a radius correction process preferably is repeated or performed for each container to account for varying mounting surfaces and their corresponding shapes or radii.

With reference to FIGS. 44-47, the following discussion provides further description of how the invention utilizes the combined refractive indexes of plastic in the lens element and image element (e.g., two layers of a wrap around label) and of air in the gap created between such label portions to provide unique focusing capabilities when compared with lenticular lenses that only utilize plastic. Specifically, the following describes a method of determining a focal length of a particular lens or lenticule, such as one used by itself with no air gap and one in which an air gap and an additional layer of plastic is provided (e.g., the thickness of plastic in an image element or portion of a wrap or label).

Figure 44:
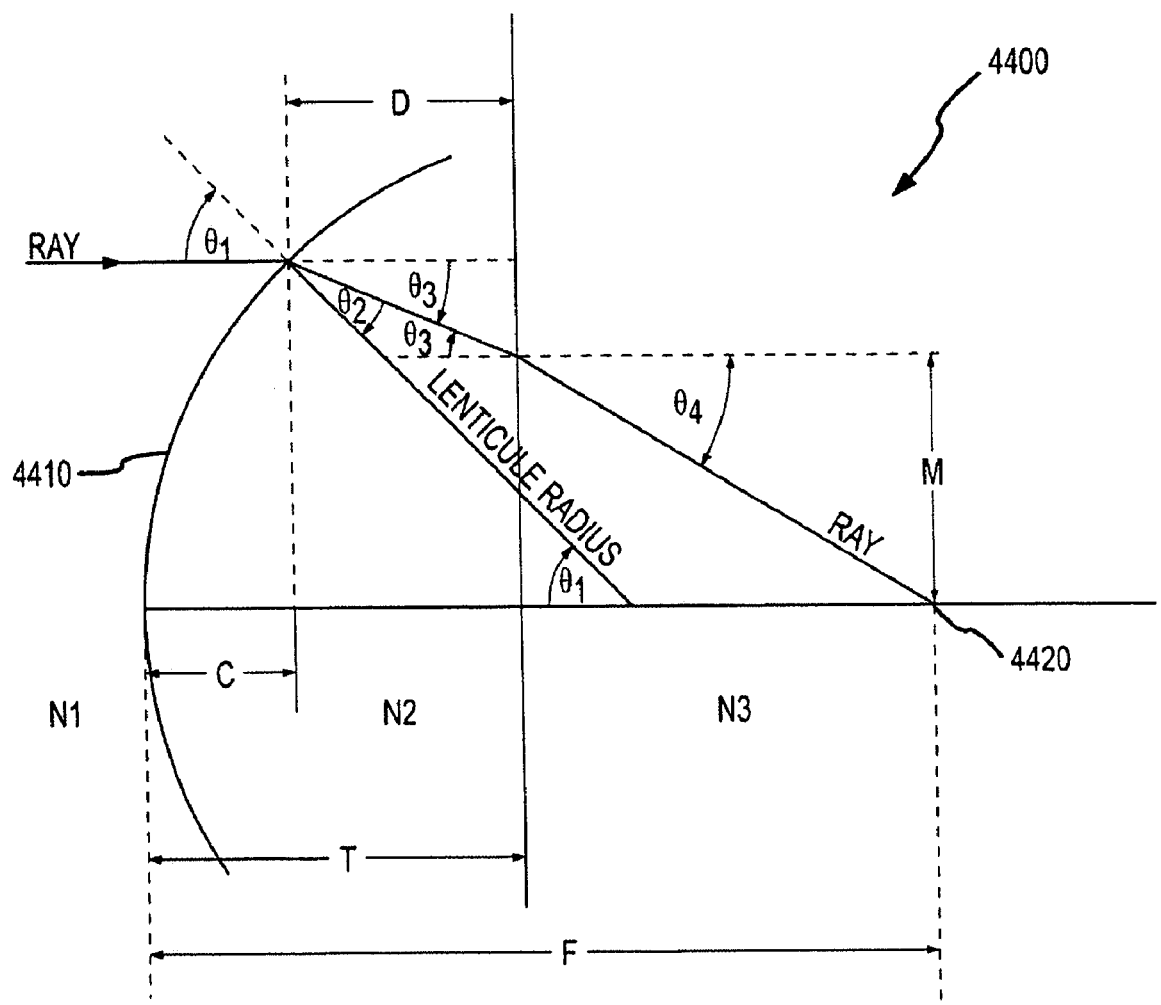
FIG. 44 is a geometric diagram of a single lens that may be provided in a lens array or lens element of the invention but being used without a focusing or spatial gap.
Figure 45:
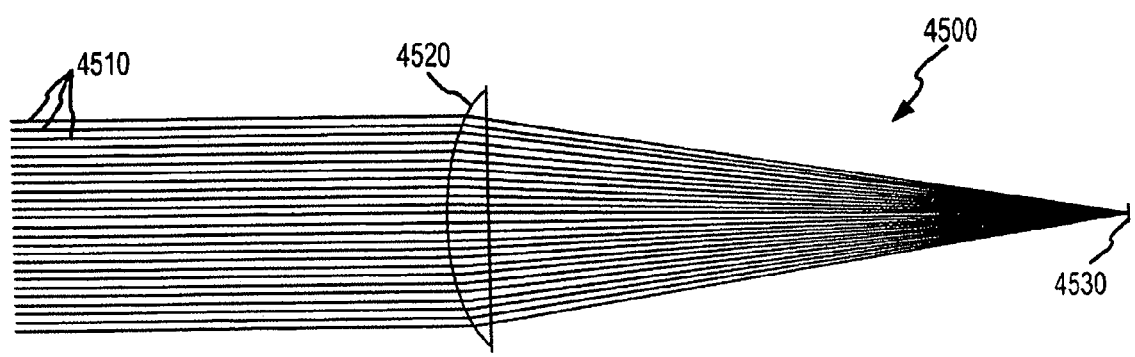
FIG. 45 illustrates a ray tracing for the lens of FIG. 44.

FIG. 44 shows a geometric diagram 4400 of a lens 4410, such as one lens among many in a lens array, that is used to focus an incoming ray onto a focal point 4420. FIG. 45 illustrates a ray tracing 4500 of this or a similar lens or lenticule 4520 that focuses a plurality of rays 4510 onto a focal point 4530. To determine a focal length of a lenticule, the following equations may be utilized:

Snell's law $$N1*Sin(Theta1)=N2*Sin(Theta2) \quad\quad 1)$$

$$H/R=Sin(Theta1) \quad\quad 2)$$

$$\text{Theta1} = \text{Arc Sin}(H/R) \quad 3)$$

$$\text{Theta2} = \text{Arc Sin}(N1*\text{Sin}((\text{Theta1})/N2)) \quad 4)$$

$$\text{Theta3} = \text{Theta1} - \text{Theta2} \quad 5)$$

Snell's law again $$N2*\text{Sin}(\text{Theta3}) = N3*\text{Sin}(\text{Theta4}) \quad 6)$$

$$\text{Theta4} = \text{Arc Sin}((N2*\text{Sin}(\text{Theta3})/N3)) \quad 7)$$

$$C = R - \text{Sqr}(R^2 - H^2) \quad 8)$$

$$D = T - C \quad 9)$$

$$M = H - D*\text{Tan}(\text{Theta3}) \quad 10)$$

$$F = T + M*\text{Cot}(\text{Theta4}) \quad 11)$$

where, with reference to the above equations and FIG. 44:
F=Focal length of lenticule
T=Thickness of lenticule
H=Distance of incoming ray from viewer axis
D=Space between lenticule and flat back surface
R=Radius of lenticule
C=Drop off of lenticule to point of incoming ray
Theta1=Angle of incidence of incoming ray with lenticule surface normal
Theta2=Angle of refraction of incoming ray in lenticule
Theta3=Angle of incidence of ray at back surface
Theta4=Angle of refraction at back surface
N1=Index of refraction of medium of incident ray
N2=Index of refraction of lenticule
N3=Index of refraction of medium of ray in focal area Using the equations above, the focal length of an air or solid plastic lenticule 4410 can be found. For example, a lenticule 4410 may have the following dimensions and parameters: R=0.027 inches; H=0.0125 inches; T=0.005 inches; N1=1.000; N2=1.49; and N3=1.000. We can use Equation 3 above to find the angle of the incident ray, Theta1, and use the value in Equation 4 to find Theta2, i.e., the refracted angle of the ray entering the lenticule 4410. The incident ray angle on the back surface is Theta3, and it can be found from Equation 5. Equation 7 then gives the angle Theta4 of the ray refracted out of the back of the lenticule 4410 into air. Equation 8 is used to calculate the drop off of the lenticule at the point of intersection. Equation 9 is useful for finding the separation of the lenticule at the intersection point to the back of the lenticule. Equation 10 finds the value M, i.e., the distance from the axis to the exit point along the back of the lenticule. This value is used in equation 11 along with Theta4 found above to calculate the focus F, i.e., the, distance from the front of the lenticule 4410 to the point where the ray crosses the axis of the lenticular lens. In this case, it is found to be 0.0796 inches. When N2=1, the focal length is instead 0.053 inches. Determining the focal length F and the focal point 4420 is important to the successful use of lens 4420 to focus a viewer's sight on a pattern on a printed substrate, which preferably would be positioned at or proximate to the focal point 4420. If an interlaced image is not sharply imaged, the viewer will see a reduced contrast image and even a confusion of images not intended to be seen at the viewer position.

Other methods of finding the focal point and designing the lenticular structure are useful and can be used to verify the results achieved mathematically above. One useful technique is ray tracing and can be achieved with ray tracing programs carried out by computers or the like. These programs provide a faster and less error prone procedure for the lenticule design and can be used to generate ray tracings or ray tracing plots. A typical ray tracing plot 4500 from a ray tracing program is shown in FIG. 45 showing a tracing of a plurality of rays 4510 as they may be refracted by a lens 4520 onto a focal point 4530, e.g., to provide a tracing for a single lens as discussed with reference to FIG. 44.

Figure 46:
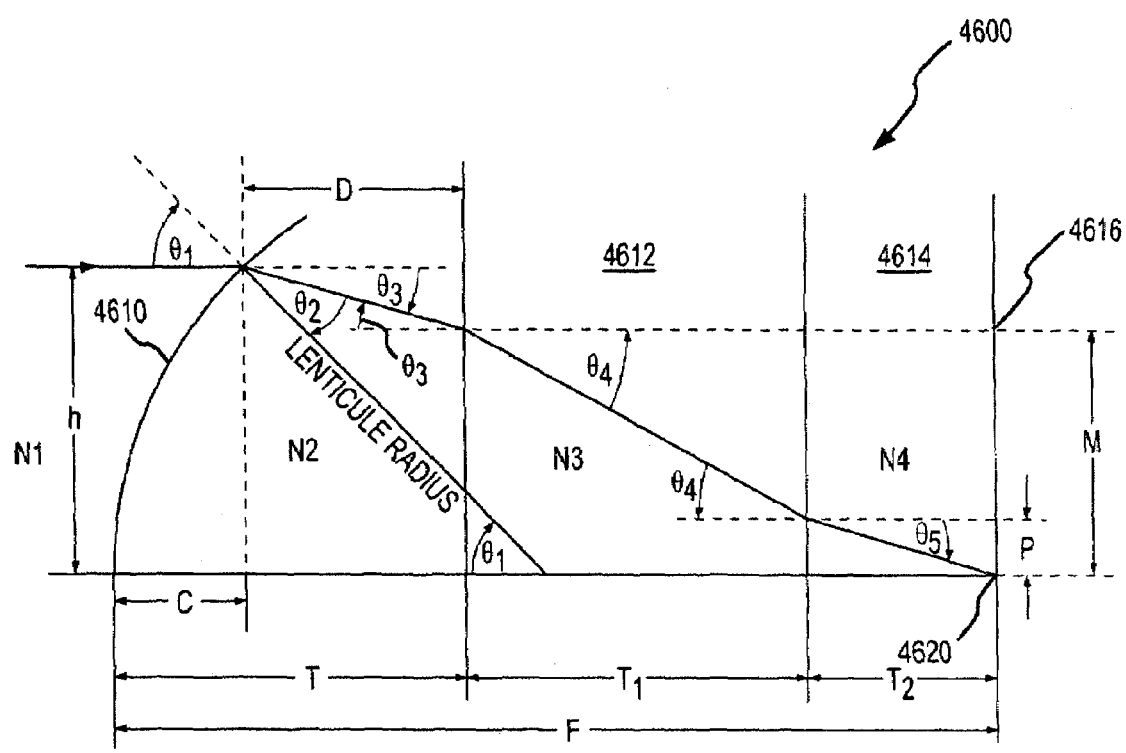
FIG. 46 is a geometric diagram of a single lens in a wrap around label of the invention useful for explaining optical or mathematical calculations that result from the use of a focusing or spatial gap.
Figure 47:
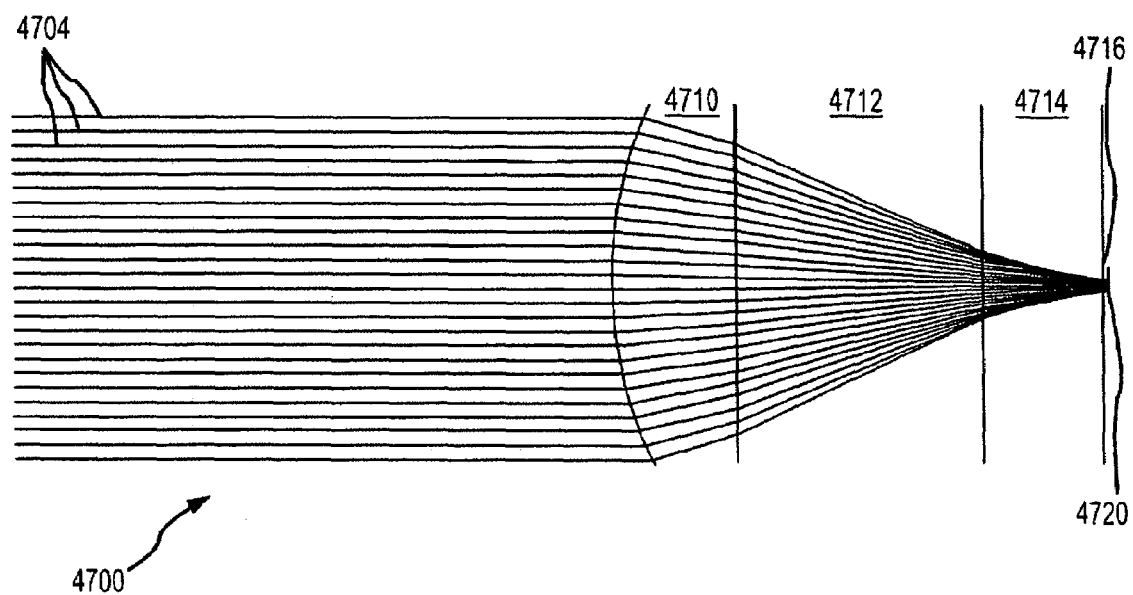
FIG. 47 illustrates a ray tracing for the lens of FIG. 46 showing the rapid bending or refracting of rays provided by air in a spatial gap to achieve desired focusing on a focal point (e.g., on or near a printed image)

As described herein, the packaged containers of the invention are adapted for creating a spatial gap between the lens element and the image element. The graphical or interfaced image may be provided on the image element or portion of the label proximate to the gap or, more typically, be provided on the reverse side distal to the gap to provide additional space for achieving a desired focal length. In this case of a combination of lenticule (or lens element), air gap, and wrap (e.g., plastic sheet or material of the image element), the above calculations and techniques for finding a focal length can be followed with several modifications. FIG. 46 illustrates a geometric diagram 4600 for a lenticule 4610 combined with a gap (e.g., a gap filled with air or other fluid) 4612, and a thickness of clear plastic (i.e., the image element or interior/initial wrap of label) 4614 upon which an interlaced image or printed image 4616 (or slice or single data element of such image) is provided at or near a focal point 4620. FIG. 47 illustrates a ray tracing plot 4700 showing a plurality of rays 4704 being focused through a lens or lenticule 4710, a gap 4712 filled with air, and a layer of label or plastic 4714 onto a printed image 4716 provided at or near a focal point 4720.

The focal length calculation in the cases shown in FIG. 46 may involve the following equations:

Applying Snell's law $$N1*\text{Sin}(\text{Theta1}) = N2*\text{Sin}(\text{Theta2}) \quad 1)$$

$$H/R = \text{Sin}(\text{Theta1}) \quad 2)$$

$$\text{Theta1} = \text{Arc Sin}(H/R) \quad 3)$$

$$\text{Theta2} = \text{Arc Sin}(N1*\text{Sin}(\text{Theta1})/N2)) \quad 4)$$

$$\text{Theta3} = \text{Theta1} - \text{Theta2} \quad 5)$$

Further applying, Snell's law $$N2*\text{Sin}(\text{Theta3}) = N3*\text{Sin}(\text{Theta4}) \quad 6)$$

$$\text{Theta4} = \text{Arc Sin}((N2*\text{Sin}(\text{Theta3})/N3)) \quad 7)$$

$$C = R - \text{Sqr}(R^2 - H^2) \quad 8)$$

$$D = T - C \quad 9)$$

$$M = H - D*\text{Tan}(\text{Theta3}) \quad 10)$$

$$(M - P)/T1 = \text{Tan}(\text{Theta4}) \quad 11)$$

$$P = M - T1*\text{Tan}(\text{Theta4}) \quad 12)$$

With further application of Snell's law, $$N3*\text{Sin}(\text{Theta4}) = N4*\text{Sin}(\text{Theta5}) \quad 13)$$

$$\text{Theta5} = \text{Arc Sin}(N3*\text{Sin}(\text{Theta4})/N4) \quad 14)$$

$$T2 = P/\text{Tan}(\text{Theta5}) \quad 15)$$

$$F = T + T1 + T2 \quad 16)$$

where with reference to the above equations and FIG. 46:
F=Focal length of lenticule, air, plastic
T=Thickness of lenticule
T1=Air Gap
T2=Thickness of plastic sheet H=Distance of incoming ray from viewer axis
D=Space between lenticule and flat back surface
R=Radius of lenticule
C=Drop off of lenticule to point of incoming ray.
Theta1=Angle of incidence of incoming ray with lenticule surface normal
Theta2=Angle of refraction of incoming ray in lenticule
Theta3=Angle of incidence of ray at back surface
Theta4=Angle of refraction at back surface
Theta5=Angle of refraction into the plastic sheet
N1=Index of refraction of medium of incident ray
N2=Index of refraction of lenticule
N3=Index of refraction of medium between lenticule and plastic
N4=Index of plastic sheet To find the focal length for the lens 4610, we proceed through Equations 1 to 16 to find the focal length. For example, the geometric diagram 4600 may be used to analyze an applied label (such as label 2810, 4010) having the following parameters: R=0.0175 inches; H=0.01 inches; T=0.01 inches; T1=0.02 inches; T2=0.01 inches; N1=1.000; N2=1.49; N3=1.000; and N4=1.49.

Often when designing a label according to the invention and the embodiments described herein, the various thicknesses of the layers or components may be set of have desired values (such as a label of 10 mils that provides 10-mil lens element and image element and in some cases, may coincide with a 20-mil gap length but any of the other label/component thicknesses and gap lengths may be inserted in these calculations) and R, the radius of the lenticule, is adjusted (e.g., formed in embossing or extrusion operations) so that the focal length comes out to match the other desired values. Again, it may be useful to use a ray tracing program to save doing the tedious calculations, and the results of such a tracing using the parameters provided above is provided in FIG. 47. The plot 4700 shows that with a lens element of 10 mils, a gap length of 20 mils, and an image element of 10 mils that rays 4704 can accurately be focused onto a focal point 4720 at which a data image 4716 may be provided with a lenticule radius of 0.0175 inches, which represents a significant improvement over what can be achieved with just the use of plastic (e.g., without the gap between the lens and image element or by providing an image on the back of lenticular array).

In the ray tracing program (whose results are shown in FIG. 47), the curvature of the bottom of the lenticule is also taken into account as the structure is wrapped around a bottle. The focal length calculation can thus be thought of as involving four cylinders: the lenticule cylinders, the exit surface of the lenticules, and the cylinders of the wrapped plastic sheet. In the ray trace plot 4700 of FIG. 47, the magnified section does not show these curvatures very well, but it should be understood that they have been taken into account.

The embodiments of the invention typically are designed and implemented using several principles based on the above geometry or focal length determinations, which involve the combination of refractive indexes due to the spatial gap provided by the wrap around labels. The viewer angle is controlled by the pitch to focal length ratio. An exact value can be found by ray tracing; however, an approximation is provided by the following: View angle=Arctan(Pitch/Focal length). The pitch should be small enough to produce a picture of desired resolution. However, the pitch should not be so small that the printed images cannot be accurately placed and separated.

The use of an "air space" instead of plastic or glass of a thicker lens formation provides a significant improvement as it replaces expensive materials with air or other fluid. Drastic or extreme 3D and animation can thus be achieved at minimal costs and with little or no modification of standard containers and label application (or packaging) processes. For example, in the embodiment 3800 of FIG. 38, the lens element may be 10 mils thick and a focal length of ⅜ inch including the air space or focusing gap is readily attainable, with the printed image being pre-printed on the container or package wall or later placed (such as with a sticker, decal, or the like). The invention allows the use of a coarse lens which corresponds to being able to provide more data (e.g., more frames for animation or 3D effects or simply more impressive and unique graphic images). For example, a 40 LPI lens array with a focal length of 33 mils may be able to provide 48 images or 3 seconds of animation, but with the present invention, a 10 LPI lens array with a thickness of 132 mils (including a lens element or wrap thickness with 1 to 10 mils thickness and the focusing or air gap length) can provide 480 images or up to 30 seconds or more of animation or video.

Building on the prior description, it is useful to note that lenticular cylinders (e.g., cylinders used for embossing a sheet or extruding a sheet with lenticules) are traditionally engraved for the usage of printing the image directly on the reverse side of the lens material. To the inventors' knowledge, there has not previously been a lenticular cylinder produced for the use of creating a lens sheet or lens array on a sheet that can be wrapped about a container so as to create a focal point between the lens and the interlaced image that is greater than the thickness of the lens array (e.g., prior systems relied solely on the lens material itself). Therefore, in these prior applications, the definition of focal length using Snell's Law is clear in that the lens must have a reasonable focus through itself to the back of the lens sheet within a given range of acceptability. Snell's Law indicates that the refractive index of the material used in the lens is the basis and the speed limit of the photons going through the material, whether it is glass, plastic, or another material. Other primary information used to determine focal length is the thickness of the material, which is often plastic, the frequency of the lens (e.g., lenses per inch or LPI), and the radius of each lenticule or lens. The radius that is chosen along with the LPI defines a viewing angle, which can vary from a few degrees to almost 90 degrees. Traditionally, the ranges for viewing angle was between 15 and 60 degrees with viewing angles over 70 degrees not presenting a clear or sharp focus (which makes images appear confusing or fuzzy to a viewer).

Lenticular cylinders are generally engraved around the periphery to define a particular lens array and then, indexed so that the cylinder is "spun" on a lathe. However, they can also be engraved across the cylinder. It is useful to note that cylinders are designed to correspond with the thickness of the plastic or glass and are output in that manner. A unique feature of the invention is to design cylinders in more coarse LPI and then use the cylinders to extrude or emboss label material in a thickness that seems to violate Snell's Law regarding focal lengths by not providing the thickness in the label material to create a focal point on the backside of the lens material (or label) itself (e.g., where prior lenticular lens devices provided the interlaced image). An aspect of the invention is to extrude materials at an LPI coarser or with fewer lenses per inch than are mathematically possible or useful if printing directly on the back side of the lens element or lens array. Hence, the identifying of the desirability and the ways of providing of a gap of air and, in some cases, a second layer of label material (e.g., when mirror or secondary side printing) is unique to the invention described herein and is useful for giving a corresponding focus in finished products (or "packaged containers"). In one example, a lens can be extruded at 30 LPI, which would require a thickness of lens material of approximately 140 mils in conventional applications but represents a thickness that cannot be extruded and is not useful for a wrap around label. In contrast, using the labels and packaging techniques described above, a 30 LPI lens can be extruded or embossed at 4 mils and be applied with an air gap of 102 mils to achieve desired focal points. Unless one pre-designs a lens array for the packaged containers with an air gap described herein, there is no need for an extrusion design in which the relationship of the lenses does not follow Snell's Law for focusing on the back side of the lens sheet or material.

As will be clear from the above description, such as with reference to FIGS. 30-32 and the like, it is desirable and advisable to have a mechanism to guide the application of the lens over the interlaced image in order to take an embossed or extruded lens and line it up properly with an air gap and positioned interlaced image on a cylinder container, a box, or other type container. The "registration" mechanism may be part of the container or be provided by the "T" wrap described above with reference at least to FIG. 28. In some cases, using registration shelves is useful as it allows the lens array or lenses to be registered to the images (i.e., aligned properly) without requiring inspection of every packaged assembly or unit. This can be done by creating a shelf (such as the shoulders or shelves defining the recessed surface or other shelf) within the piece that mechanically aligns to the printing in the X and Y axes, and the lens comfortably rests and is secured in place by glue, pressure, tape, or any other fastening technique.

In some embodiments, it may be useful to not have the lenticular lens array cover the entire lens element as is the case in the label 2810. For example, in an effort to wrap a container with a lens array corresponding to an interlaced image underneath, it may be difficult to read or scan a Universal Product Code (UPC) and/or other product data provided on a label. In these cases, an area free of (or without) lenticules may be provided in the lens element, such as a spot or strip, such that UPC and other product data that may be included on the container side wall, on a separate label, or as part of the image element can be read or scanned. This blank spot in the lenticular array or lens element can be created during extrusion or embossing processes used to form the lenticules in the lens element.

In some embodiments of the invention (not shown), it may be useful to configure a packaged container so as to hide a set of information on the label such that it is visible only have the contents of the container are removed or consumed. For example, it may be useful to use packaged containers to run a contest. This may desirable for beverage and other consumer product companies. With this in mind, some embodiments of packaged containers may include a "reveal mechanism" to hide a set of data when the container is full and reveal or display the data when the container is empty or at least some of the contents have been removed from the interior space of the container. In some such embodiments, an image is interlaced so that the lines are in a similar color to the beverage or other container contents. In this way, when the viewer looks at the beverage through the interlaced image, a hidden set of data or game message cannot be readily seen until the beverage or container contents are consumed, at which time the hidden data or game message is revealed. In other embodiments, a hidden image is interlaced on the back of the container (e.g., printed or provided on the outer surface of the side wall prior to applying the label or provided on the inner surface of the label (e.g., on the image element distal to the interlaced image that is visible with the container full)). An area embossed in the lens or lens array may have a focal point differing from other portions of the lens array (e.g., the lens array may have two sets of lenticules with differing configurations and/or focal points), and this spot or area of lenticules is configured to focus on the hidden image by taking into account the refractive indexes of the double wrap label and also the material of the container side wall (e.g., twice) and the air in the container.

The embodiments shown in FIGS. 1-47 all utilized lenticular lens arrays or a plurality of lenticules to create an optical effect with an interlaced image and the optical characteristics achieved by the spatial gap, the container sidewall, and/or the contents of the container. According to some embodiments of the invention, a block out grid is substituted for the lenticular lens arrays to achieve a desired optical effect such as animation or 3D imagery. Briefly, the embodiments described in FIGS. 1-47 may each be modified to replace the lenses or lenticules with a block out grid that is configured with properly sized and spaced apart block out lines to provide focusing or a line of sight to about one frame within an interlaced image from a view point or a particular viewer's line of sight. The following are specific examples of such modifications, and with these examples, it is believed similar modifications to all the embodiments in FIGS. 1-47 will readily be understood by one skilled in the art.

Figure 48:
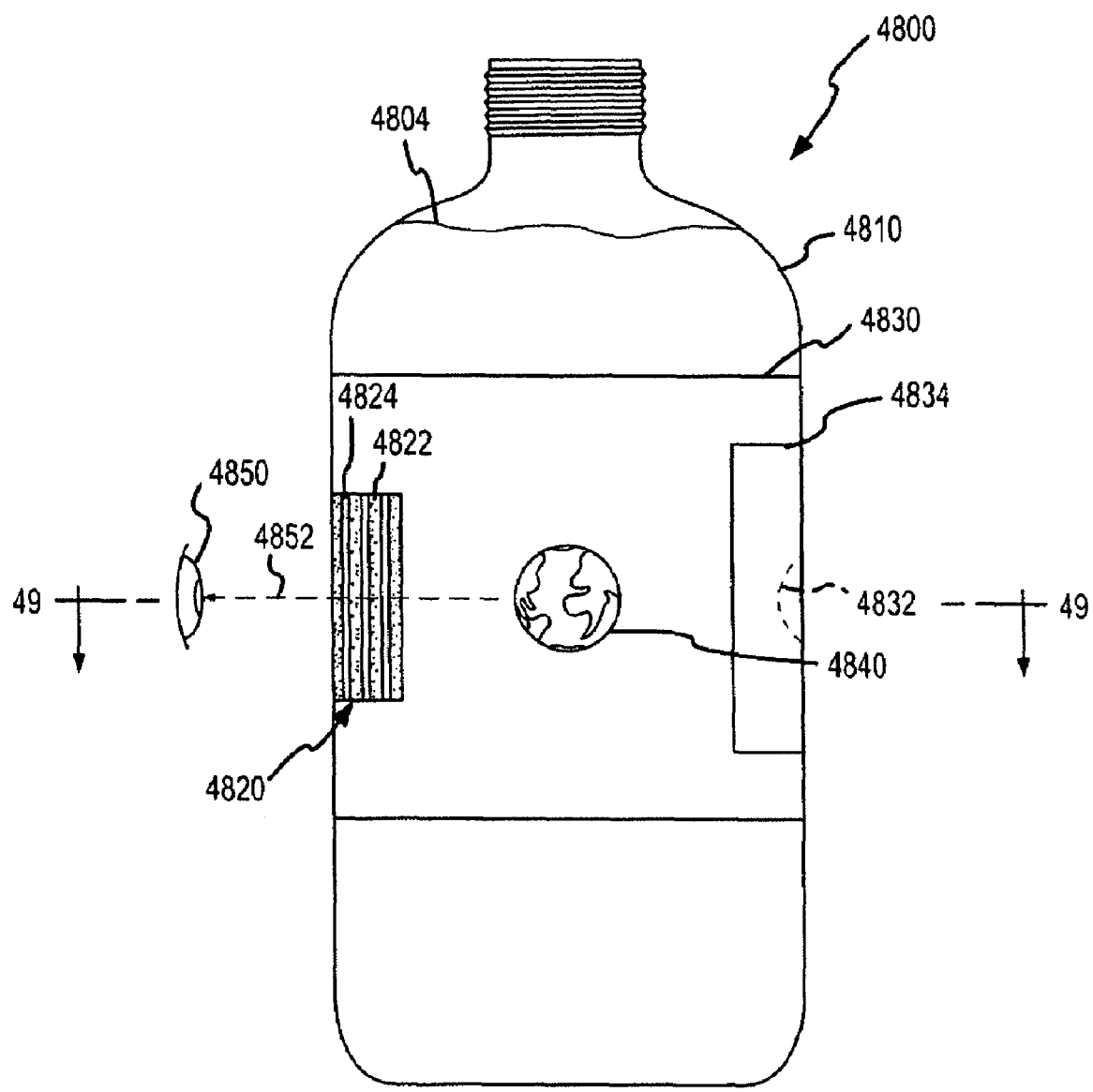
FIG. 48 is a side view similar to FIG. 2 of a container of the present invention showing an image created or viewable in the center of the bottle or toward the rear of the bottle (i.e., "floating" in the container contents) by the combination of a "front" block out grid and a "rear" printed image on a label.
Figure 49:
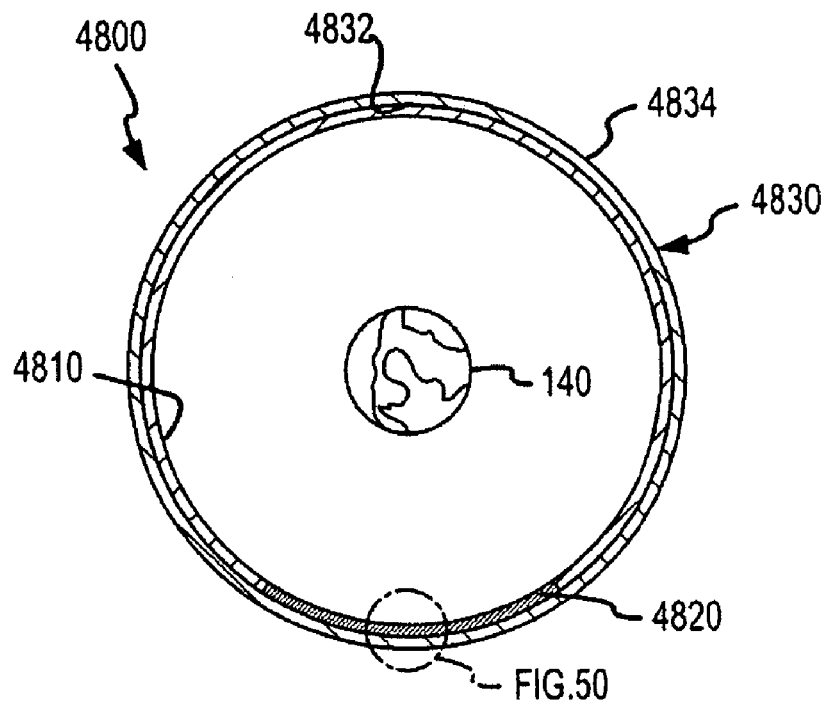
FIG. 49 is a view of a cross section of the container of FIG. 48 taken at line 49-49.
Figure 50:
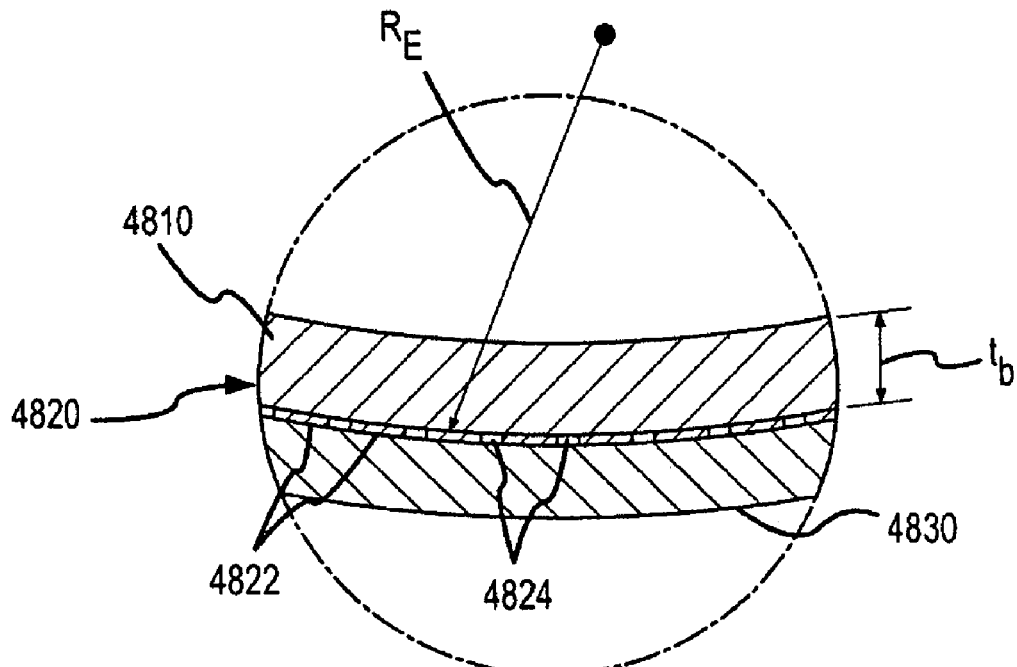
FIG. 50 is an enlarged partial view of the cross section shown in FIG. 49.

FIGS. 48-50 illustrate a container 4800 utilizing a block out grid system of the present invention to produce a floating 3D or animated image 4840. The container 4800 is similar to that shown in FIGS. 1-4 with a block out grid being substituted for the lens array. As shown, the container 4800 is provided with a standard shape utilized for typical plastic bottles used for distributing water or other beverages. As such the container 4800 includes a clear, substantially transparent, or at least translucent container wall 4810 having a substantially cylindrical shape for containing liquid 4804. The container wall 4810 is typically formed of glass or more typically of a plastic such as polyvinyl chloride (PVC), polypropylene, polyethylene, polyester (such as PET, APET, PETG, and the like) or other plastic used by the packaging or container industry. The container 4800 may be formed by blow molding, injection molding, or any other technique useful for producing containers and adapted (as necessary) for the glass or plastic material used to fabricate the container 4800.

According to one aspect of the invention, a block out grid 4820 is provided in a front portion of the container wall 4810. The block out grid 4820 is formed integral with the container wall 4810 such as within the wall or as a structural component of the wall (e.g., in the same molding or other fabrication process and of the same material) or, more typically, in a printing process performed after the molding or forming of the container sidewall 4810. For example, the block out grid may be printed on an exterior surface of the sidewall 4810 using black or other opaque (or, in some cases, translucent to opaque) ink. The grid 4820 is configured with numerous block out lines 4822 (or bars, stripes, ribs, or the like) that are spaced apart by spaces or gaps 4824 and extend parallel to each other and, in this example, parallel to a longitudinal axis of the container 4800 (but the lines 4822 and gaps 4824 may extend transverse to the longitudinal container axis or horizontally rather than vertically to suit or match the interlaced image configuration). The block out lines 4822 and gaps 4822 of the grid 4820 are configured in frequency (lines per inch) and shape (such as width and length) to provide viewing of the interlaced image 4832 as shown at 4840, and, in some cases, the grid 4822 based on the material of the container wall 4810, based on the liquid contents 4804 of the container 4800 (or lack thereof), and the curvature of the container wall 4810 to provide a line of sight 4852 of a viewer 4850 to the rear portion of the container wall 4810. The space or distance (i.e., the inner diameter of the container) allows block out grid 4820 to be used while still providing a large quantity of data in the printed or interlaced image 4832. The grid 4820 can have a wide variety of dimensions (such as a height and width of the lines 4822 and the spaces 4824 between the lines 4822) selected based on the size of the container 4800 and the size of the printed image 4832 and can have a wide variety of outer shapes (such as a square as shown in FIG. 48, a rectangular, a triangle, a circle, an oval, or any other useful shape for viewing the image 4832).

With the grid 4820 (or the gaps 4824) directing the line of sight 4852 onto the rear portion of the container wall 4810, a graphical image 4840 is produced within the container 4800 so as to "float" in the liquid 4804 or elsewhere by providing a printed image 4832 at the focal point of the lens system including the block out grid 4320, the label 4830, the container sidewall 4810, and the contents 4804 of container 4800. In this regard, a label or printed image presentation element 4830 is provided with a printed image 4832 on the inner surface of the label 4830, i.e., the portion abutting the rear portion of the container wall 4810 (or as part of label 4830 or on the outer surface). The label 4830 is shown to be wrapped around the container wall 4810 so as to cover the grid 4820 and the rear portion of the container wall 4810. The label 4830 is typically fabricated from a clear to translucent material such as plastic so as not to interfere or block light from passing through the grid 4820 or, more accurately, the spaces or gaps 4824, which allows a viewer 4850 to see (as shown by a sight line 4852) the graphical image 4840 which is produced by the grid 4820 and the printed image 4832 as well as the container 4800 and label 4830.

The label 4830 includes a data area or backdrop portion 4834 in which a printed image 4832 is provided, and in some embodiments, the data area 4834 includes additional images, such as text, for viewing or may provide a background color(s) useful for emphasizing or highlighting the printed image 4832. The printed image 4832 is positioned relative to the rear portion of the container (i.e., the focal point of the grid 4820, label 4830, container wall 4810, and contents 4804 combination or lens assembly) to map or register the interlaced printed image 4832 with corresponding gaps 4824 between block out lines 4822 in grid 4820 to effectively produce the graphical image 4840 to the viewer 4850. The image 4832 may be printed using known techniques for printing images or data to achieve graphics such as 3D, animation, or action and for use with lenticular lenses or lenticular materials but the invention is not limited to a specific technique. For example, the image 4832 may be printed upon the interior or reverse side of label 4830 via web or offset press operations to form an ink layer with corresponding interlaced images in conjunction with the appropriate mathematics of the materials of the label 4830, the container sidewall 4810, and contents 4804 and configuration of grid 4820. The mathematics preferably not only matches the "lens" assembly materials but also the distortion caused by the curvature of the container wall 4810 and grid 4820 and distortion or optical effects cause by the liquid or contents 4804 in the container 4800. In the case of a bottle or other cylindrical shaped container 4800, the spaces 4824 in grid 4820 tend to "open up" somewhat and create a new mathematical pitch. This pitch is predetermined before the labels 4830 and plates are made and printing occurs so that the printing can be performed with more accuracy and to facilitate registering the label 4830 and printed image 4832 with the block out grid 4820 (i.e., the block out grid 4820 is designed to suit the shape of the container sidewall 4810 and this may differ from a conventional configuration of a block out grid for use in a planar arrangement such as with narrower gaps 4824 (or wider lines 4822)).

FIG. 49 shows a sectional view of the container 4800. As shown, the grid 4820 is provided on an exterior surface of the container wall 4810 with vertically extending block out lines 4822 spaced apart by gaps 4824 forming a block out grid 4820 at the "front" portion of the container wall 4810. Generally, the grid 4820 only adds the thickness of a layer or layers of ink on to the wall 4810, which is negligible but shown thicker to illustrate the lines 4822 in the cross sectional views of FIGS. 49 and 50. Alternatively, the grid 4820 may be provided on label 4830 as shown in FIGS. 51-57. The grid 4820 is useful for creating a container 4800 with a focal point through label 4830 substantially coinciding with the rear portion of the container wall 4810 adjacent the printed image 4832 of the label 4830. The label 4830 is shown to wrap around the entire periphery of the container wall 4810 as is common practice in the beverage industry (such as in the bottled water industry), but in some embodiments (not shown), the label 4830 may extend for only a portion of the periphery of the container wall 4810 as long as the printed image 4832 is positioned adjacent an exterior surface of the rear portion of the container wall 4810 that coincides with the focal point (or points) of the container 4800 through grid 4820.

FIG. 50 illustrates a portion of the cross-section of the container 4800 showing grid 4820 and label 4830 shown in FIG. 49. As shown, the label 4830 is wrapped about the container wall 4810 so as to contact the outer surface of the grid 4820 or to abut the block out bars or lines 4822. Typically, the label 4830 is fabricated from a very thin sheet of clear to translucent plastic to limit distortion through the label 4830 and grid 4820. The block out grid 4820 includes a plurality of block out lines 4822 (extending vertically as shown or horizontally) that are spaced apart by gaps or spaces 4824 (e.g., where no ink was printed for example), with the grid 4820 sometimes being considered to include a transparent lens layer or web 4824 that is provided by the portion of the container sidewall 4810 upon which the grid 4820 is provided. The grid 4820 has an overall thickness, $t_B$, that affects focusing of the grid 4820 and typically is equivalent to a thickness of the container wall 4810 as focusing is provided through the gaps 4824. Optical results of the grid 4820 are determined by characteristics of the array 4820 including the frequency of the gaps 4824 (which may be compared with lenticules per inch (LPI) in lenticular lens embodiments), the curvature of the grid 4820 as determined by the curvature, $R_E$, of the container wall 4810, and the relationships between these characteristics or design parameters. Additionally, the resulting optical effect is determined in part by the liquid 4804 (or lack of liquid) in the container 4800 and the distance from the grid 4820 to the rear portion of the container wall 4810 (and the printed image 4832) which is approximately the inner diameter of the container 4800 at the location of the grid 4820 and the printed image 4832.

The grid 4820 may be provided on or as part of the container sidewall 4810 in a number of ways including, but not limited to, printing or attachment as a separate label or decal with adhesive. In some preferred embodiments, the grid 4820 is formed by printing black or other translucent to opaque ink to form the block out line, bars, or stripes 4822. The overall dimensions (such as width and height in the square or rectangular embodiments) of the grid 4820 is typically the same or greater than those of the image 4832 (or data area 4834). The width of each line 4822 and gap 4824 pair is typically the same as each subset of interlaced images used to produce a frame or portion of image 4832. For example, an interlaced file or image 4832 may be made up of 10 frames or images with each of the 10 frames or images being sliced into 10 (or more) slices or segments. The block out grid 4820 is formed to allow one slice to be seen through each of the gaps 4824 between stripes or lines 4822. In the above example, the block lines 4822 would have a width equal to about 9 of the slices or segments while the gaps 4824 would have a width equal to about 1 of the slices or segments (or slightly less to account of opening up of a curved or convex container sidewall 4810), with the specific dimensions varying to match the block out grid 4820 with the particular interlaced image 4832. For example, if each of the subparts of the interlaced image has a dimension of $^{100}/_{1000}$ of an inch and there are 10 slices or image segments per subpart of the frame or image, the block out lines 4822 would have a width of about $^{90}/_{1000}$-inch and the spaces between lines 4824 through which the slices or image segments are seen would have a width of about $^{10}/_{1000}$-inch.

Instead of being provided on or as part of the container, the block out grid may be provided, e.g., printed or the like, on the outer or inner surface of a label that is attached to a container. Briefly, the block out grid may be provided on a container by using a clear to translucent plastic in the form of a wrap or decal to form a top layer of a lens array or lens system. The grid may readily be formed on a decal or wrap surface by printing spaced apart block out lines or stripes and a paired or mapped interlaced image (which may also be provided on or within the container sidewall). Such wrap around and decal methods are very desirable from a cost and tooling point of view, as they allow application of a bottle wrap or decal on an already tooled container, e.g., a typical bottle or other often used glass or clear plastic container. As with the lenticular embodiment of shown in FIGS. 16-18, the lens top or the block out grid in the label or decal would be relatively useless and not designed properly for application directly onto an interlaced printed piece if it were not for the thickness of the container and its walls. In other words, the thickness of the decal or clear embossed wrap becomes part of the container wall and together these structures form a lens system that is effective in focusing on a focal point near or on an interlaced image provided on the container, such as on the wrap around label in a portion opposite the lens array or on the exterior or interior surface of the container wall (or even as an integral portion of the container wall).

Figure 51:
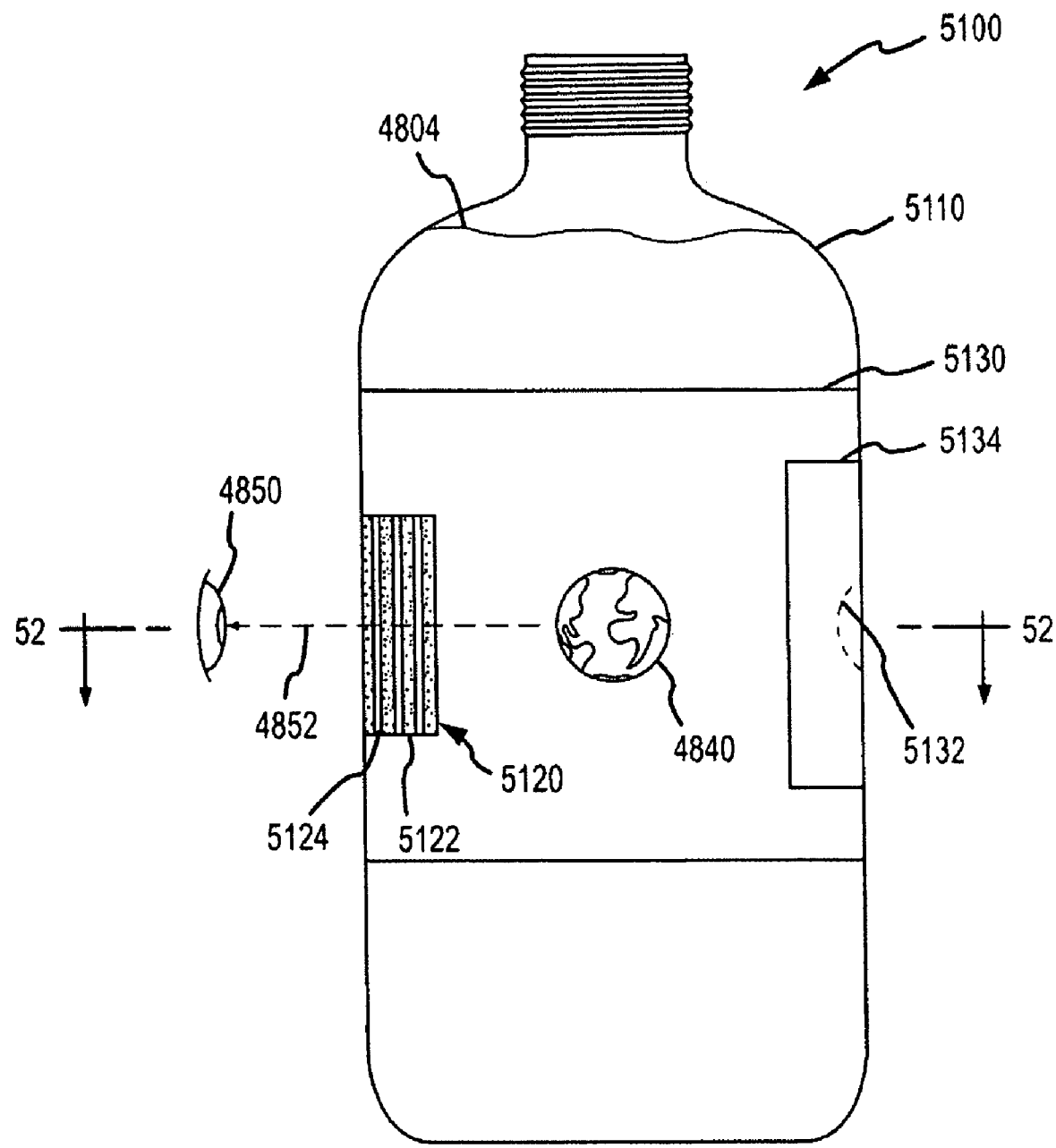
FIG. 51 illustrates another container (or packaged container) of the present invention similar to that shown in FIG. 16 but with the label including a block out grid rather than a lenticular lens array or plurality of lenticules or lenses.
Figure 52:
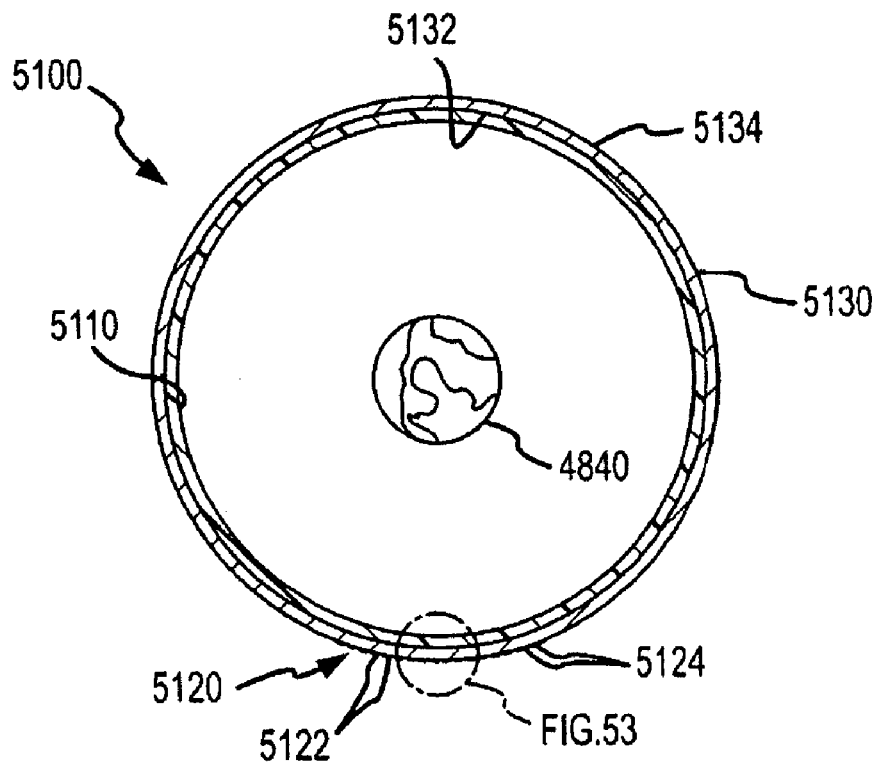
FIG. 52 is a cross sectional view of the container of FIG. 51 taken at line 52-52.
Figure 53:
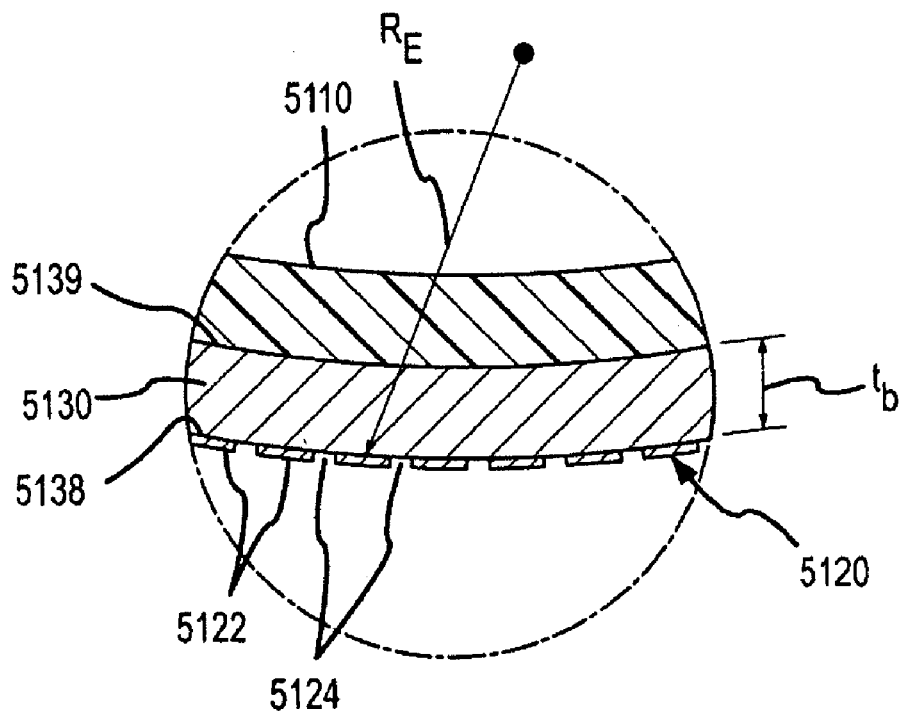
FIG. 53 is an enlarged, partial view of the cross section shown in FIG. 52.

FIGS. 51-53 illustrate a container 5100 utilizing a block out grid of the present invention to produce a floating image 4840 visible to a viewer 4850 using exemplary sight line 4852. The container 5100 is similar to container 1600 of FIG. 16 but with a block out grid 5120 replacing the lenticular array 1640. As shown, the container 5100 is provided with a standard shape, such as those used for water and other similar bottles, but the invention is broad enough to cover nearly any shape for which a wraparound or other label or labels may be provided. The container 5100 includes clear, transparent, substantially transparent, or translucent walls 5110 for containing contents, such as a liquid, 4804. The container wall 5110 is typically formed of glass or, more typically, of a plastic such as polyvinyl chloride (PVC), polypropylene, polyethylene, polyester (such as PET, APET, PETG, and the like), or any other plastic useful in the packaging industry.

In contrast to the container 4800 of FIG. 48, the container 5100 does not include a block out grid integral with or upon with the container wall but instead a block out grid 5120 is provided as an integral portion or upon a wraparound label 5130. As shown, the block out grid 5120 is configured with numerous block out lines 5122 spaced apart by gaps or spaces 5124 of formed (e.g., printed, provided by a separate decal or label, or the like) on an exterior surface of the label 5130 (or within the label 5130 or on an interior surface of the label 5130). The block out lines 5122 and gaps 5124 positioned between the lines 5122 extend parallel to each other and, typically, also parallel to a longitudinal axis of the container 5100. As with the container 4800, the block out lines 5122 and gaps 5124 of the grid 5120 are configured in frequency (lines or spaces per inch) and shape (such as width and length) based on the material of the container wall 5110, based on the liquid contents 4804 of the container 5100, and the curvature of the container wall 5110 to focus a viewer's line of sight 4852 on the rear portion of the container wall 5110. The space or distance (i.e., the inner diameter of the container) allows a coarser configuration for block out grid 5120 to be used while still providing a large quantity of data in the printed image 5132. The grid 5120 can have a wide variety of dimensions (such as a height and width) selected based on the size of the container 5100 and the size of the printed image 5132 and shapes (such as a square, a rectangular, a triangle, a circle, an oval, or any other useful shape for viewing the image 5132).

As with container 4800, a graphical image 4840 can be produced in part through the use of block out grid 5120 within the container 5100 so as to "float" in the liquid 4804 or elsewhere by providing a printed image 5132 at the focal point of the lens structure or system. The label 5130 is fabricated from a clear, transparent, or at least translucent material, such as a plastic, so as to not unduly interfere with light passing through gaps 5124 between block out lines 5122 in the grid 5120. The wrap label 5130 together with the container walls 5110 (front and back in this embodiment) combine—along with the liquid 4804 in some cases—to form the lens structure or system that generates the image 4840.

The label 5130 includes a data area or backdrop portion 5134 in which a printed image 5132 is provided on an interior side or surface of the label 5130 (in other embodiments, the image 5132 is provided on the exterior side of the label 5130). When the label 5130 is placed on the container 5100, such as by heat shrinking, adhesive or other application techniques well-known in the packaging arts, the interlaced image 5132 is positioned relative to the rear portion of the container 5100 (e.g., at the focal point of the lens systems including the grid 5120, container walls 5110, and, if present, liquid 4804) to map or register the interlaced printed image 5132 with corresponding gaps or spaces 5124 or portions of the lenticular lens array 1640. As discussed previously, the image 5132 may be printed using known techniques for printing images or data to achieve graphics, such as 3D, animation, or action, and for use with lenticular lenses or lenticular materials. As with the container 4800, the mathematics used for designing and printing the image 5132 are preferably not only selected to match the lens material(s) but also the distortion caused by the curvature of the container wall 5110, label 5130, and/or of the liquid 4804 in the container 5100.

FIGS. 52 and 53 more clearly show the construction of the wrap around label 5130 with the block out grid 5120 and the fabrication of the container 5100. As shown, the label 5130 has an exterior or first surface 5138 and an interior or second surface 5139 opposite the first surface 5138. The grid 5120 is formed on a portion of the exterior or first surface 5138 with a plurality of block out lines 5122 which may be structural components blocking or hindering light from flowing through the label 5130 or be a layer of ink or the like that is translucent to opaque with gap or spaces 5124 provided between each pair of adjacent lines 5122. The gaps or spaces 5124 typically being free of ink or otherwise configured to allow light to pass through the grid 5120, and, as discussed with reference to FIG. 48, are selected to have a thickness substantially similar to a single segment or slice of the interlaced image while the lines 5122 are typically the width of multiple ones of the image segments or slices (i.e., to block viewing of segments or slices except for the one viewed through the gap 5124). The grid 5120 is generally a very thin layer of ink but may be considered to include the label immediately beneath it (or upon which it is formed or printed) so as to include a flat surface on the interior or second surface 5139 of the label 5130 that abuts the exterior surface of the container wall 5110. The label 5110 further includes the data area 5134 which includes the interlaced image 5132, which may be on the interior surface 5139 of the label 5130 as shown or on the exterior surface 5138 of the label 5130. Further, in some embodiments not shown, the interlaced image 5132 is printed or positioned directly on the container wall 5110 on an interior or exterior surface so as to be positioned at the focal point of the lens system that includes the grid 5120, label 5130, container wall 5110, and any contents 4804 of container 5100.

Typically, the label 5130 is fabricated from a very thin sheet of clear to translucent plastic to minimize distortion through the array 5140. It is useful again to understand that the label 5130 has a thickness, $t_b$, at the location of the grid 5120 that affects focusing of the line of sight 4852. Optical results of the grid 5120 are also determined by other physical characteristics of the container 5100 including the material of the label 5130, the material of wall 5110, the frequency of the lines 5122 and/or spaces 5124 in grid 5120 (typically measured in lines or spaces per inch), the curvature of the grid 5120 as determined by the curvature, $R_E$, of the container wall 5110 and the relationships between these characteristics or design parameters. Additionally, the resulting optical effect is determined in part by the liquid or other contents 4804 (or lack of liquid) in the container 5100 and the distance from the grid 5120 to the rear portion of the container wall 5110 (and the interlaced image 5132) which is approximately the inner diameter of the container 5100 at the location of the grid 5120 and the image 5132.

The embodiments using block out grids shown in FIGS. 48-53 (and as would result from modifications of FIGS. 1-27 to replace lenticular lenses with spaced apart block out lines) utilize the geometry and thickness of the container sidewalls and, optionally, contents of such containers to achieve optical effects and focusing of a viewer's line of sight on frames or images of an interlaced image. As discussed previously, good optical effects can also be achieved by modifying the spatial or air gap embodiments shown in FIGS. 28-47 to replace the lenticular lenses with block out grids. Generally, in these embodiments, the lens or lens assembly includes a wrap around or other label (or a web or a substrate upon which the grid is printed or attached) and a spatial gap and any material provided in such a gap such as air or other gases.

Figure 54:
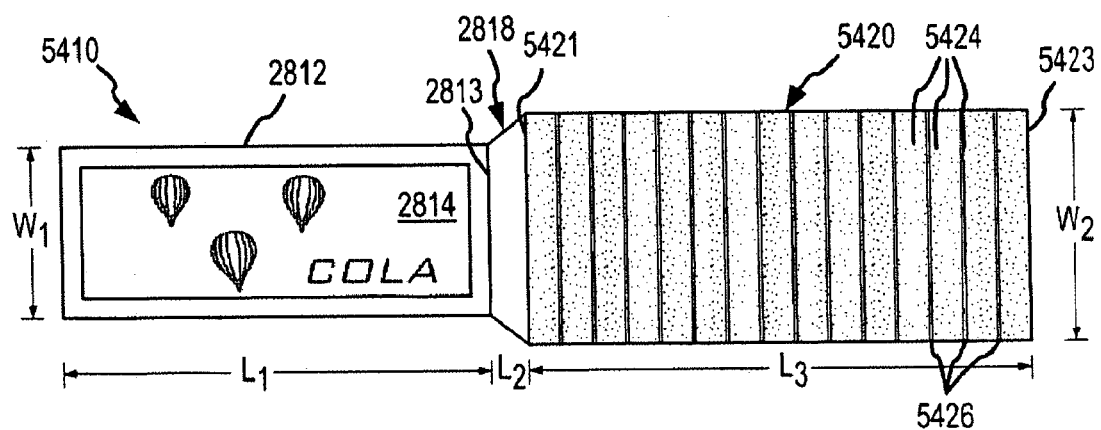
FIG. 54 is a plan view similar to FIG. 28 of an alternative embodiment of a wraparound label illustrating a "T" shaped body with an image portion or element and a block out grid portion or element.
Figure 55:
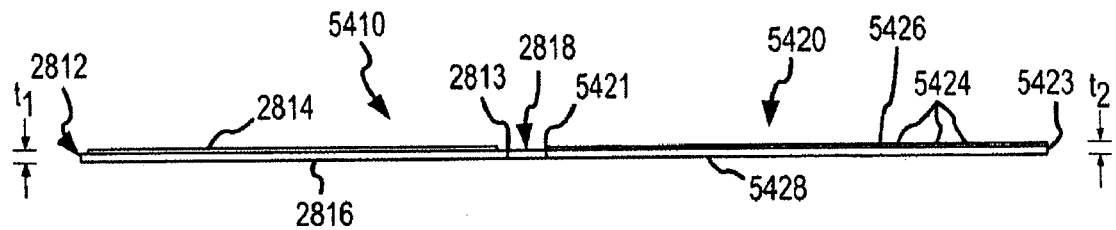
FIG. 55 is a side view of the label of FIG. 54 showing the interlaced image on a surface of the image portion and the plurality of alternating bars (or lines or strips) and space or gaps making up the block out grid on a surface of the block out grid portion or element.

For example, the embodiment of FIGS. 28-33 may be modified to utilize a block out grid rather than a lenticular lens portion or element. FIGS. 54 and 55 illustrate a wraparound label 5410 formed for use in some embodiments of a packaging system using block out grids to achieve an optical effect with an interlaced image (e.g., system 5600 shown in FIGS. 56 and 57), with similar components being numbered as shown in FIGS. 28-33. The label 5410 can be considered a two-part body (e.g., a T-shaped body) formed with an image element or portion 2812 connected by a neck 2818 to a block out grid or lens element or portion 5420. The label 5410 may be formed from a single piece of material such as a plastic sheet or may be formed from two sheets that may be attached (such as by adhesive) at the neck 2818, which may be useful to allow the elements 2812 and 5420 to made of differing materials or in different processes for later combination to form label 5410. The image element 2812 has an interlaced image (or printed image) 2814 provided on one surface while a second opposite surface 2816 is used for mating with a container and, particularly, with a recessed, registration surface. The image 2814 is preferably configured to support the particular block out grid element 5420 (or vice versa) and the density or coarseness (or lines or gaps per inch for example) of lines 5424 and gaps 5426 provided on that element 5420. Further, the image 2814 mathematics will be selected based on the size of the air or focusing gap created in the packaging system (e.g., based on the gap length), as discussed with reference to FIG. 28 and other air gap embodiments.

In some cases, the image element 2812 is formed of paper materials as is the case with many existing container wraparound labels or is formed of other materials such as plastic. The image element is mated or attached to the neck 2818 at an end 2813 and has a thickness, $t_1$, that is typically very small such as less than 3 mils (but thicker elements 2812 may be used in some cases). The element 2812 has a width, $W_1$, that is typically selected to correspond with a width of a recessed, registration surface or shelf in the side of a container. In this manner, the positioning of the image element 2812 and its image 2814 can be consistently known and aligned or registered with the lens element 5420 and its clear, transparent, or at least translucent gaps 5426 (i.e., the gaps 5426 (or block out lines 5424) of the element 5420 can each be aligned or registered with image slices or portions in the image 2814 when the label 5410 is applied or wrapped onto a container). The image element 2812 has a length, $L_1$, that typically is selected to be equal to or less than the peripheral dimension (e.g., circumference of $2\pi r$ for a cylindrical container, with r being the radius of the container at the recessed surface of the side wall), with one preferred embodiment having the element 2812 wrapping about container at the recessed surface one complete time. In this embodiment, the image 2814 may have a length that substantially matches the length of the element 2812, $L_1$, to provide a 360 degree viewable image (e.g., when the gaps 5426 or grid 5420 is provided about the entire circumference of the container, too) or the length of the image 2814 may be less than the entire element 2812 (or the image 2814 may not be continuous to provide images viewable in select portions of the container with grid array 5420 being provided in a similar fashion or continuous even when the image 2814 is discontinuous). In another embodiment, the element 2812 only wraps about a portion of the container circumference such as half, third, fourth, or the like to create an image viewable from a portion of the container and to reduce the cost and material for the label 5410.

The wraparound label 5410 includes a neck or connection element 2818 for connecting the image element 2812 to the block out grid element 5420. The neck 2818 may expand outward from the width of the image element 2812 as shown to the width, $W_2$, of the grid element 5420, or it may have the width of either element 2812, 5420 or a width between the two. The neck 2818 may also be an integral part of either element 2812, 5420 (or of both in embodiments where the elements 2812, 2818, and 5420 are formed from a single sheet of material) or a separate unit, and either or both of the elements 2812, 5420 may attached such as with adhesive to the element 2818. The neck 2818 has a length, $L_2$, that is generally selected to allow the neck to extend across a focus gap and often at a 45 degree or other angle formed as the label 5410 is rolled or wrapped onto the exterior surfaces of a container (e.g., see FIG. 32 and the extension of neck 2818 across air gap 3220). The neck 2818 is attached or mates with grid element 5420 at end or side 5421 of element 5420, and this end 5421 is typically the initial part of grid element 5420 and label 5410 to contact and/or be affixed to the container wall outside the recessed, registration surface.

The label 5410 also includes the block out grid element 5420 with its width, $W_2$, being selected to be wider than the image element 2812 (e.g., $W_2$ is greater than $W_1$) such that the grid element 5420 extends across the width of recessed surface in the container and can be mounted (such as with adhesive) to the container wall. In a typical embodiment, the lens width, $W_2$, may be 0.25 to 1 inches wider (although other widths may be utilized) such that the grid element 5420 can easily be attached with adhesive (or heat shrinking in some cases) and create an enclosure or sleeve about the recessed surface and the image element 2812. In this way, a focusing gap that is typically filled with air (e.g., an "air gap") is formed in a packaging system using the label 5410. The length, $L_3$, of the grid element 5420 (as measured from end 5421 to end or side 5423) may be equal or slightly larger than the circumference or peripheral dimensions of the container for the container side wall outside the recessed surface but typically adjacent or proximate to the surface.

The element 5420 has a thickness, $t_2$, that is typically relatively thin and corresponds to more typical wraparound plastic labels, e.g., less than about 3 mils and preferably between about 1.3 and 2 mils, but thicker labels may be used to practice the invention such as thicknesses less than about 10 mils with cost and rigidness of the material being a likely limiting factor. Greater thicknesses may be desirable for creating certain graphical effects but in many cases it is more desirable to use standard clear plastic wrap sheets and its accepted thicknesses to allow the element 5420 to be formed and applied using well known equipment, such as that used to apply roll labels. The image element 2812 has a thickness, $t_1$, that is typically less than or equal to that of the lens element (e.g., $t_1$ is less than or equal to $t_2$) to control costs and increase the size of the created air gap (but, again, in some cases, $t_2$ may be less than $t_1$).

An array or grid of block out lines 5424 spaced apart by transparent (or translucent to clear) gaps 5426 is formed on a first surface of the lens element 5420 (such as by printing or other methods discussed with reference to FIGS. 48-53). The lines 5424 and gaps 5426 may extend "vertically" (e.g., transverse to a longitudinal axis of the label 5410) or "horizontally" (e.g., parallel to a longitudinal axis of the label) depending on whether 3D effects are desired or whether color and animation are adequate, respectively. The lines 5424 may be formed integrally with the body of the label 5410 in element 5420, typically in the same molding or other fabrication process and of the same material or may be provided in a later step such as by printing of an opaque or nearly opaque or at least translucent ink (such as black ink or the like), with the gaps 5426 often formed simply by not applying ink in certain portions of grid 5420. The lines 5424 and gaps 5426 are configured typically to extend parallel to each other with widths selected such that each gap 5426 allows one slice or segment of the interlaced image 2814 to be viewed at a time by a viewer when the label 5410 is applied to a container or other object. The lines 5424 and gaps 5426 of the grid 5420 have a frequency (lines or gaps per inch) and shape (e.g., length and width) based on a number of characteristics that may effect viewing of the image 2814 such as the material and thickness of the element 5420, the expected size or length of the created air gap (e.g., based on the refractive index of air) between the element 5420 and image 2814 when in use, and the curvature of the container wall to focus on accurately on particular data element or slices of images in the interlaced image 2814.

For example, the lines 5424 and gaps 5426 may be provided with a coarseness or frequency of 10 to 70 or more per inch and more preferably in the range of 15 to 35, with a 20 lines or gaps per inch frequency being used in some preferred embodiments. The space or distance provided by the air gap and the refractive index of air allows a coarser configuration for grid element 5420 to be used while still providing a large quantity of data in the printed image 2814. The lines 5424 and spaces there between 5426 may have a wide variety of dimensions (such as a height and width) selected based on the size of the container and its recessed surface and the size of the printed image 2814 and shapes (such as a square, a rectangular; a triangle, a circle, an oval, or any other useful shape for viewing the image 2814). The fabrication of standard lenticular material sheets is well known by those skilled in the printing arts and such knowledge may be utilized at least in part in designing or determining the mathematics for slicing the image 2814 and matching viewing gaps or spaces 5426. For example, lenticular material fabrication is described in U.S. Pat. No. 5,967,032 to Bravenec et al. and U.S. Pat. No. 5,753,344 to Jacobsen, which are incorporated herein by reference. An exemplary process for forming the label 5410 is discussed with reference to the label 2810 of FIG. 28 and is not repeated here. The step or steps for forming the grid element 5420 may be the same as discussed for forming the grid 4820 of FIG. 48 and/or grid 5120 of FIG. 51.

With the labels formed, the packaging process continues generally with each container to be packaged being first wrapped into a recessed surface in an automated process with the graphic or image element portion of the label. The wrapping continues with the application of the lens portion of the label that goes onto the container adjacent to the recessed surface in a secondary wrap (with the whole wrap being one piece in this example, although this is not necessary to practice the invention) to form a spatial or focusing gap between the two label portions. The block out grid portion of the label is lined up and aligned with the graphics or printed image, and this allows 3D, animation, and/or other optical effects to be effectively provided with a spatial gap rather than requiring significantly thick lens layers (such as ⅛-inch thick layers as is often the case with prior block out grid devices). Correct mathematical pitch of the block out grid element and the interlaced image is maintained to assure animation continues to work properly, and the block out grid and image are also configured or set for the particular viewing distance of the packaged container or object. In some cases, the double wrapping process described for the system 3100 may be utilized with the modified label 5410.

Figure 56:
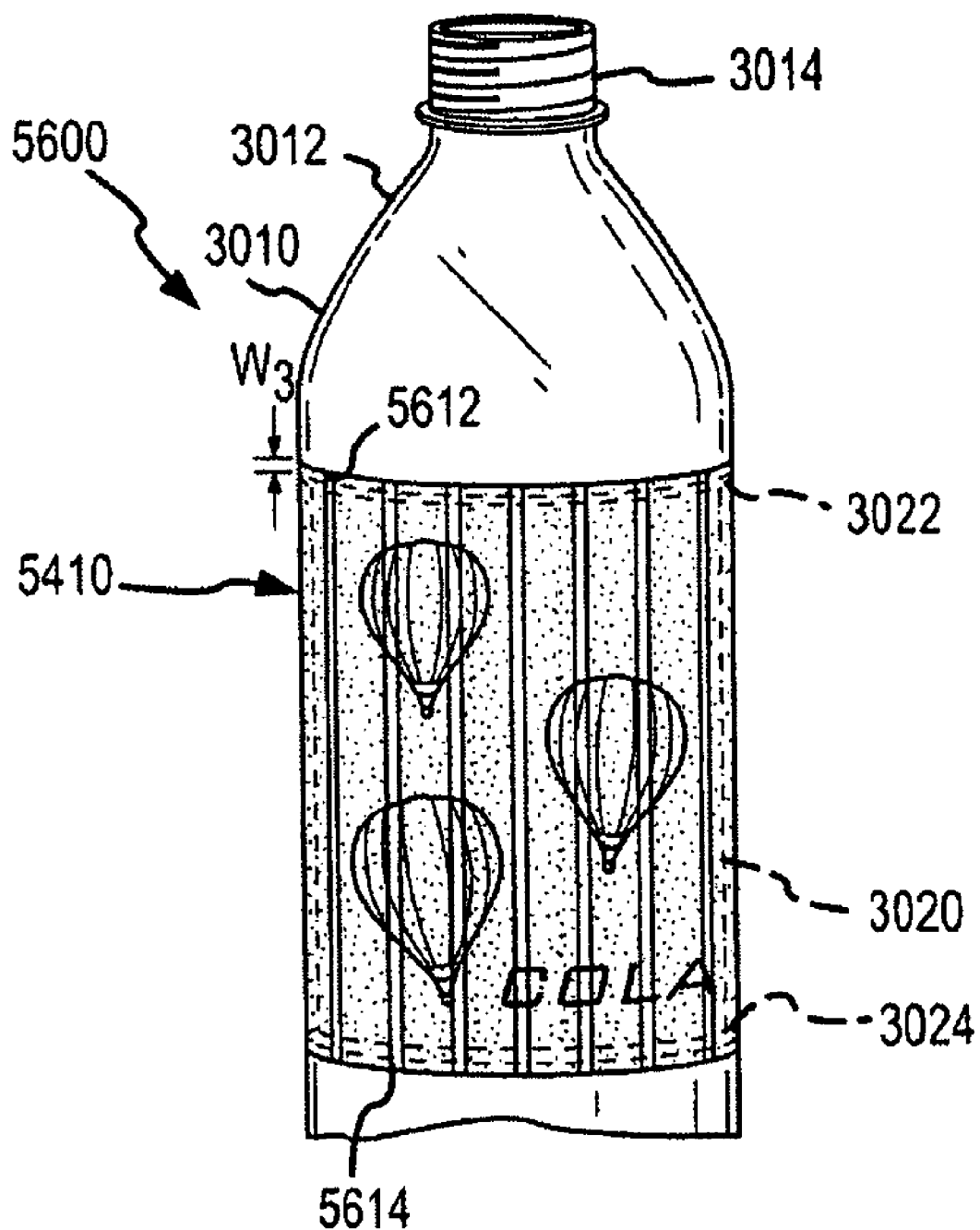
FIG. 56 illustrates a packaging system or packaged container of the present invention including the container of FIG. 30 upon which the two-part, wraparound label of FIGS. 54 and 55 has been attached (such as by adhesive) with the image portion contacting the recessed, registration surface and the block out grid portion enclosing the recessed surface and image portion by contacting surfaces of the wall 3010 adjacent or proximate the recessed surface.

The label 5410 may be placed on a variety of container or other objects having a recessed surface. For example, the container 3000 shown in FIG. 30 may be packaged with label 5410 to create a packaging system or packaged container 5600 as shown in FIG. 56.

Significant to "air gap" embodiments of the present invention, the side wall 3010 includes a recessed, registration surface 3020 extending about the circumference or periphery of the container 3000. The recessed surface 3020 has a diameter, $D_2$, that is less than the diameter, $D_1$, of the adjacent portions of the container 3000 as defined by the side wall 3010 (i.e., the diameter, $D_1$, of the container at the recessed surface 3020 is reduced by two times the depth, d, of the recessed surface 3020 relative to the side wall 3010). The depth, d, is established by upper and lower shoulders or shelves 3022, 3024, which are shown to be the same size in this embodiment but in some cases there will be a first and second depth associated with the shelves 3022, 3024 (e.g., the container 3000 may be smaller towards its neck 3014 than near the bottom wall 3016)

and such cases are within the breadth of this invention. The depth, d, is significant to the invention as it defines (along with the thickness of the image element 2812) the size or length of a focusing or air gap that is created when the label 5410 is applied to the container 3000.

The recessed, registration surface 3020 has a width as measured between the shelves 3022, 3024. It is useful for the image element 2812 and its image 2814 to be in a known or registered portion of the container 3000 to facilitate registration of the block out lines 5424 and viewing gaps 5426 with the image 2814. To this end, the width of the recessed surface 3020 is preferably about the width, $W_1$, of the image element 2812 such that the edges of the image element abut the shelves 3022, 3024. In other embodiments, though, the image element 2812 is thinner than the recessed surface 3020 and registration is controlled by application processes used to apply the label 5410 to the container 3000. As discussed above, the width, $W_2$, of the block out grid element 5420 is greater than the width of the recessed, registration surface 3020 such that when the label 5410 is applied the grid element 5420 is positioned so as to span over the surface 3020 and contact at least a portion of the sidewall 3010 on each side of the surface 3020 (e.g., side wall 3010 adjacent or proximate to shelves 3022, 3024 as shown by width, $W_3$, in FIG. 56), whereby the focusing or air gap is formed.

FIG. 56 illustrates a packaged container or packaging system 5600 according to one embodiment of the invention. The system 5600 includes the container 3000 with the label 5410 attached to the outer surfaces of the side wall 3010. As shown, a graphical image is visible from the exterior of the container, and, as will be explained, the label 5410 is applied such that the focal point of the lens system that includes block out lines 5424 and viewing gaps 5426 is on or proximate (e.g., accounting for the thickness, $t_1$, of the image element 2812) to the recessed surface 3020 so as to focus on the image 2814. In other words, the focal length from the viewing gaps 5426 is selected to be through the grid element 5420 (e.g., its thickness and accounting for its material and refractive index) and through the air in the focusing gap created between the web or back surface 5428 of the lens element 5420 and the image 2814 on the image element 2812 of the label 5410.

Figure 57:
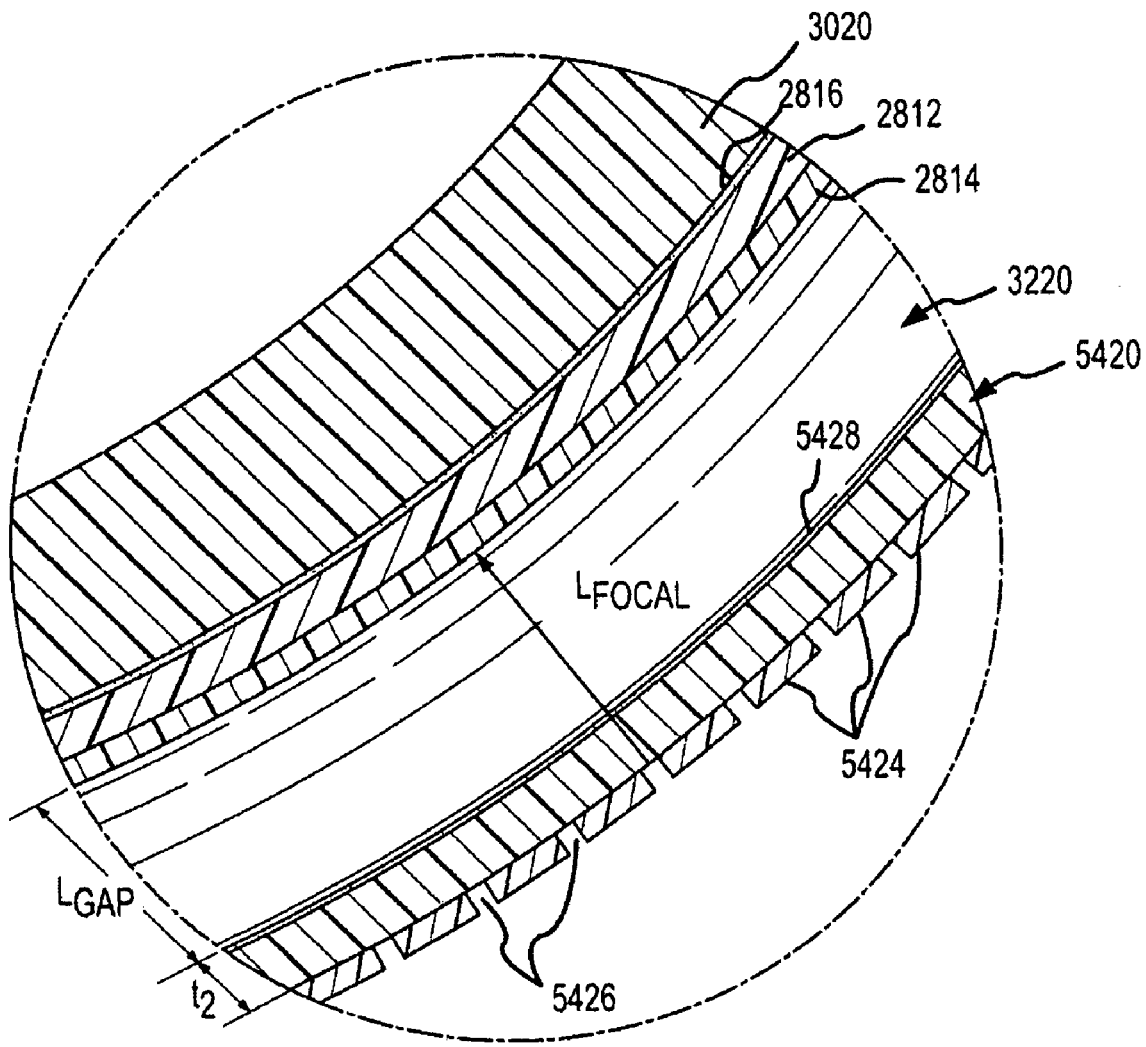
FIG. 57 is an enlarged view of a section of a cross section (similar to the view provided in FIG. 33) of the packaging system or packaged container of FIG. 56 showing in more detail the relative positioning of the image layer and image element body, the container wall, the block out grid element with its block out lines, and the air or spatial gap that is created or provided according to embodiments of the invention.

With reference also to FIG. 57, the label 5410 is typically applied to the container side wall 3010 using standard application practices such as heat shrinking and more preferably rolling processes with adhesives (e.g., hot glue). It will be understood that the cross sectional view of FIG. 57 and in other figures is not to scale with the bottle or container 3000 shown smaller relative to the thicknesses of the wraparound label 5410 and the achieved air gap such that the various very thin layers (such as ink of grid element 5420) can be visualized with their relation to each other being shown.

The application process may be thought of as a single process or single roll that involves a "double wrap." Specifically, in one embodiment, a first end of the image element 2812 is applied to a starting or initiation point on the recessed surface 3020 between the registration shelves 3022, 3024, such as with adhesive (not shown) applied to the contact surface 2816 which is placed in contact with the surface 3020. Rolling of the label 5410 onto the container 3000 thus begins with application of the image element 2812 with the image 2814 facing outward from the container side wall 3010. In the illustrated embodiment, the image 2814 is printed or applied onto the same side of the label 5410 as the lines 5424 and gaps 5426, but, in some embodiments, the image 2814 is applied to the back side 2816 of the label 5410 so as to provide additional focusing space and materials (e.g., when the image element body is formed also of clear plastic or the like rather than a nontransparent paper or other material).

Application of the label 5410 continues until the image element 2812 is placed fully against the recessed surface 3020, with additional adhesive sometimes being applied during such application or at least at or near the end 2813 such that image element 2812 is retained in position against the recessed surface 3020. With the image element 2812 in place, the rolling or application of the label 5410 continues with the neck or extension portion 2818 extending outward from the recessed surface 3020 across the depth, d, to the shelves 3022, 3024. Then, the block out grid element 5420 contacts the sidewall adjacent the recessed surface 3020 at attachment surfaces 3112, 3114 of side wall 3010. As shown, only a relatively small portion of the grid element 5420 abuts the surfaces 3112, 3114 (such as 0.125 to 0.5 inch or more on each side of the recessed surface 3020). The rolling or application continues with the grid element 5420 being attached, e.g., glued or the like) to the surfaces 3112, 3114 of the side wall 3010 until it has been fully applied. At this point, the end 5423 of the grid element 5420 may be further attached to the container side wall 3010 and/or to itself. Typically, the length, $L_3$, of the grid element 5420 is such that it will extend about the container side wall 3010 at least once so as to fully enclose the image element 2812 and recessed surface 3020 (although this is not a requirement to practice the invention).

As shown in FIG. 57, the application of the label 5410 in this manner results in a focusing or spatial gap 3220 being created between the grid element 5420 and the image element 2812. In the illustrated embodiment, the length of this gap, $L_{GAP}$, is measured from the back surface or web 5428 of the grid element 5420 to the image 2814 on the image element 2812. This distance can typically be approximated as being equal to or slightly less than the depth, d, of the recessed surface 3020 minus the thickness, $t_1$, of the image element 2812. In standard manufacturing processes (such as typical application of a wrap around label onto a bottle or container), the gap 3220 is filled with air. Hence, determination of the proper shape and configuration for the block out lines 5424 and viewing gaps 5426 and their frequency (e.g., lines or gaps per inch) takes into account focusing through a thickness of air equal to the gap length, $L_{GAP}$, rather than just the thickness, $t_2$, of the grid element 5420.

As discussed in detail above, this is very beneficial for achieving high quality graphics with block out grids. In some embodiments, the thickness, $t_2$, can be kept below about 3 mils (or use standard wrap around materials and sheet thicknesses) rather than requiring 1/8-inch or more of material behind the block out grid lines and spaces. For example, the lines 5424 and gaps 5426 can be provided at less than 40 per inch (such as at 15 to 25 per inch), and the image 2814 can be interlaced with 20 or more frames or images (at 1/400 of an inch spacing or slices) that can be registered to the lines 5424 and/or gaps 5426 when an air gap or spacing thickness of 0.25 inches or less is achieved in the packaging system 5600. In one embodiment, 20 lines or gaps per inch is used to produce high quality graphics with 20 images when a 3/16-inch $L_{GAP}$ was provided in a packaged container 5600.

FIG. 57 provides an enlarged view of the various components and/or layers of the packaging system 5600. As shown, the container wall 3020 mates (such as with adhesive or shrink fitting) with the contact or inner surface 2816 of the image element 2812 (or element 2812 body), and, typically, there is little or no gap or spacing between these surfaces (except some air pocketing that may occur in standard labeling processes). The interlaced or printed image 2814 is provided on the opposite surface of the image element 2812. A spatial or focusing gap 3220 is provided that is typically filled with air (but other gases or fluids may be provided in such gap 3220 to achieve a specific effect or to obtain a desired index of refraction). The gap 3220 has a size or length, $L_{GAP}$, that is measured from the web or back surface 5428 of grid element 5420 to the printed image 2814 (or, more simplistically, to surface of element 2812). In one example, the thickness, $t_2$, of the grid element 5420 is less than 5 mils and more preferably between about 1.3 and 2 mils, and the gap length, $L_{GAP}$, is less than about 5/16-inch (with one embodiment being less than 3/16-inch). The focal length, $L_{FOCAL}$, is the sun of these two dimensions, which is typically much larger than could be obtained with just the use of a plastic wrap as stiffness, cost, and fabrication issues would make such thickness impractical.

FIGS. 48-57 illustrate embodiments in which the block out grid is provided in an outer layer and the interlaced image is provided on an inner surface. In other words, these systems direct a viewer's line of sight first through the viewing gaps in the block out grid and then onto the image slices. However, other embodiments of the invention call for the location of the block out grid and the interlaced image to be reversed from that shown in FIGS. 48-57 such that the block out grid is "behind" the interlaced image to visually appear to become part of the image. For example, the container 4800 may be modified such that location of the block out grid 4820 and the interlaced image are switched. Then, the cross sectional view of container 4800 in FIG. 49 would show the interlaced image 4832 adjacent the first or front portion of the container wall 4810 on the label 4830 near where block out grid 4820 is presently shown and would show the block out grid 4820 provided on the container wall 4810 near where the interlace image 4832 is presently shown. Similarly, in embodiments where both the grid and the image are provided on one or more labels, the positioning may be reversed. For example, in the packaged container 5100 of FIGS. 51-53, the grid 5120 may be provided on the label 5130 where the data element 5134 and image 5132 are presently provided and vice versa such that a viewer may typically have their line of sight directed first through the image 5132 and then to block out grid 5120. Yet further, in air gap embodiments, the interlaced image may be provided on the outer portion of the label while the block out grid is positioned on the inner surfaces such as on or contacting the container wall. For example, the label 5410 shown in FIG. 54 may be modified such that the block out grid element 5420 is provided in the narrower portion of label 5410 shown as containing image element 2812, and the image element 2812 may be provided in the wider portion of label 5410 shown to comprise the block out grid in FIG. 54. In this way, the block out lines or bars 5424 are positioned adjacent a container sidewall in the recessed surface while the interlace image is positioned on or near an exterior surface of the applied label.

We claim:

1. A method of fabricating a container adapted to produce a graphical image, comprising:
   providing a container comprising a container wall with a first portion and a second portion spaced apart from the first portion, the container wall comprising a substantially transparent material;
   providing a label;
   providing a block out grid on a first portion of the label, the block out grid including a plurality of lines blocking passage of light that are spaced apart by viewing gaps that allow at least some light to pass through the label;
   providing an interlaced image on a second portion of the label; and
   applying the label to the container wall, wherein the interlaced image is positioned proximal to the second portion of the container wall and the block out grid is positioned proximal to the first portion of the container wall and wherein at least a portion of the interlaced image is viewable through the block out grid and the label.

2. The method of claim 1, wherein the viewable portion of the interlaced image comprises a set of segments of the interlaced image and wherein each of the viewing gaps has a width selected to allow viewing of one of the segments at a time.

3. The method of claim 2, wherein the interlaced image includes a plurality of frames with each frame divided into a particular number of segments and wherein the set of segments corresponds to one of the frames, the block out lines having a width selected to block viewing of the segments associated with other ones of the frames.

4. The method of claim 1, wherein the providing of the block out grid and the interlaced image comprises printing ink onto the label.

5. The method of claim 4, wherein the block out grid is printed on a first side of the label and the interlaced image is printed on a second, opposite side of the label.

6. The method of claim 1, wherein the label has a thickness between about 2 and 16 mils.

7. The method of claim 1, wherein the applying comprises heat shrinking the label onto the container wall.

8. A container adapted for producing a graphical image observable by a viewer external to the container, comprising:
   a container wall having a front portion and a rear portion separated by a distance, the container wall defining an interior space for receiving a volume of a liquid;
   an interlaced image positioned proximate to the rear portion comprising a plurality of image segments; and
   a block out grid positioned proximate to the front portion comprising a plurality of elongated block out bars spaced apart by viewing gaps, the block out bars being wider than the viewing gaps which have a width corresponding to the width of one of the image segments, wherein the viewing gaps are at least translucent and the block out bars at least partially block light, whereby one of a plurality of subsets of the image segments is viewable through the viewing gaps at a particular viewing angle.

9. The container of claim 8, further comprising a label extending about the entire circumference of the container with an inner surface contacting an exterior surface of the rear portion and an exterior surface of the front portion of the container wall, wherein the label further comprises the block out grid.

10. The container of claim 9, wherein the label is applied to the container wall by heat shrinking the label, the block out grid being configured prior to the heat shrinking to produce the plurality of lenses with the focal point after distortion of material in the label created in the heat shrinking, whereby no adhesive is positioned between the block out grid and the container wall or between the printed image and the block out grid.

11. The container of claim 9, wherein the container has a circular cross section and the container wall defines a diameter of the container and wherein the label has a thickness between about 2 mils and about 16 mils.

12. The container of claim 9, wherein the interlaced image is printed on the interior surface of the label and the block out grid is printed on the exterior or the interior surface of the label.

13. A method of fabricating a container adapted to produce a graphical image, comprising:

providing a container comprising a container wall with a first portion and a second portion spaced apart from the first portion, the container wall comprising a substantially transparent material;

providing a flexible, wraparound label having a thickness between about 2 mils and about 16 mils;

providing a block out grid on a first portion of the label, the block out grid including a plurality of lines blocking passage of light that are spaced apart by viewing gaps that allow at least some light to pass through the label;

providing an interlaced image on a second portion of the label; and applying the label to the container wall, wherein the interlaced image is positioned proximal to the second portion of the container wall and the block out grid is positioned proximal to the first portion of the container wall and wherein at least a portion of the interlaced image is viewable through the block out grid and the label.

14. The method of claim 13, wherein the block out grid is printed on a first side of the label and the interlaced image is printed on a second, opposite side of the label.

15. The method of claim 13, wherein the applied label extends about the entire periphery of the container with an inner surface contacting an exterior surface of the first portion and an exterior surface of the second portion of the container wall.

* * * * *

UNITED STATES PATENT AND TRADEMARK OFFICE
CERTIFICATE OF CORRECTION

PATENT NO. : 7,443,592 B2
APPLICATION NO. : 11/467753
DATED : October 28, 2008
INVENTOR(S) : Raymond et al.

It is certified that error appears in the above-identified patent and that said Letters Patent is hereby corrected as shown below:

Column 27, line 5, delete "serface" and insert therefor --surface--.
Column 35, line 55, delete "availabel" and insert therefor --available--.
Column 40, line 23, delete "availabel" and insert therefor --available--.

Signed and Sealed this

Sixteenth Day of December, 2008

JON W. DUDAS
*Director of the United States Patent and Trademark Office*